US008773720B2

(12) United States Patent
Uchidate et al.

(10) Patent No.: US 8,773,720 B2
(45) Date of Patent: Jul. 8, 2014

(54) IMAGE PROCESSING USING HALFTONE IMAGE DATA

(75) Inventors: Hikaru Uchidate, Yokohama (JP); Tomoyuki Saiki, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 13/553,727

(22) Filed: Jul. 19, 2012

(65) Prior Publication Data

US 2013/0027751 A1 Jan. 31, 2013

(30) Foreign Application Priority Data

Jul. 29, 2011 (JP) ................................ 2011-167441

(51) Int. Cl.
*G06K 15/00* (2006.01)
*H04N 1/40* (2006.01)
*H04N 1/405* (2006.01)
*H04N 1/407* (2006.01)
*G06K 15/02* (2006.01)

(52) U.S. Cl.
CPC ........... *H04N 1/4053* (2013.01); *H04N 1/4074* (2013.01); *G06K 15/02* (2013.01)
USPC ........................................ 358/3.03; 358/3.06

(58) Field of Classification Search
CPC .... H04N 1/4053; H04N 1/4074; G06K 15/02
USPC ...................................... 358/3.03, 3.04, 3.05
See application file for complete search history.

(56) References Cited

U.S. PATENT DOCUMENTS

| | | | | |
|---|---|---|---|---|
| 2002/0186417 | A1* | 12/2002 | Inoue | 358/3.14 |
| 2008/0123147 | A1* | 5/2008 | Koase et al. | 358/3.13 |
| 2012/0050766 | A1 | 3/2012 | Saiki | |

FOREIGN PATENT DOCUMENTS

| | | | |
|---|---|---|---|
| JP | 1256870 | A | 10/1989 |
| JP | 9238259 | A | 9/1997 |
| JP | 2001-086355 | A | 3/2001 |
| JP | 2002-051214 | A | 2/2002 |

* cited by examiner

*Primary Examiner* — Douglas Tran
(74) *Attorney, Agent, or Firm* — Fitzpatrick, Cella, Harper & Scinto

(57) ABSTRACT

An image processing apparatus according to this invention performs the first halftone processing for input image data having the first number of gradations, generating halftone image data having the second number of gradations smaller than the first number of gradations. The image processing apparatus evaluates a pixel value difference between input image data and halftone image data, and calculates quantization error data representing a quantization error generated in the halftone image data owing to the first halftone processing. Then, the image processing apparatus performs the second halftone processing for the calculated quantization error data, generating correction data having the second number of gradations for correcting the quantization error generated by the first halftone processing. The image processing apparatus corrects the halftone image data using the correction data.

25 Claims, 48 Drawing Sheets

P1 P2

| | | | | | | | | | | | | | | | | | | | |
|---|---|---|---|---|---|---|---|---|---|---|---|---|---|---|---|---|---|---|---|
| 83 | 83 | 83 | 83 | 83 | 83 | 83 | 83 | 83 | 83 | 83 | 83 | 83 | 83 | 83 | 83 | 83 | 83 | 83 | 83 |
| 83 | 83 | 83 | 83 | 83 | 83 | 83 | 83 | 83 | 83 | 83 | 83 | 83 | 83 | 83 | 83 | 83 | 83 | 83 | 83 |
| 0 | 83 | 83 | 83 | 83 | 83 | 83 | 83 | 83 | 83 | 83 | 83 | 83 | 83 | 83 | 83 | 83 | 83 | 83 | 83 |
| 0 | 0 | 83 | 83 | 83 | 83 | 83 | 83 | 83 | 83 | 83 | 83 | 83 | 83 | 83 | 83 | 83 | 83 | 83 | 83 |
| 0 | 0 | 0 | 83 | 83 | 83 | 83 | 83 | 83 | 83 | 83 | 83 | 83 | 83 | 83 | 83 | 83 | 83 | 83 | 83 |
| 0 | 0 | 0 | 0 | 0 | 83 | 83 | 83 | 83 | 83 | 83 | 83 | 83 | 83 | 83 | 83 | 83 | 83 | 83 | 83 |
| 0 | 0 | 0 | 0 | 0 | 0 | 83 | 83 | 83 | 83 | 83 | 83 | 83 | 83 | 83 | 83 | 83 | 83 | 83 | 83 |
| 0 | 0 | 0 | 0 | 0 | 0 | 0 | 83 | 83 | 83 | 83 | 83 | 83 | 83 | 83 | 83 | 83 | 83 | 83 | 83 |
| 0 | 0 | 0 | 0 | 0 | 0 | 0 | 0 | 0 | 83 | 83 | 83 | 83 | 83 | 83 | 83 | 83 | 83 | 83 | 83 |
| 0 | 0 | 0 | 0 | 0 | 0 | 0 | 0 | 0 | 0 | 83 | 83 | 83 | 83 | 83 | 83 | 83 | 83 | 83 | 83 |
| 0 | 0 | 0 | 0 | 0 | 0 | 0 | 0 | 0 | 0 | 0 | 83 | 83 | 83 | 83 | 83 | 83 | 83 | 83 | 83 |
| 0 | 0 | 0 | 0 | 0 | 0 | 0 | 0 | 0 | 0 | 0 | 0 | 0 | 83 | 83 | 83 | 83 | 83 | 83 | 83 |
| 0 | 0 | 0 | 0 | 0 | 0 | 0 | 0 | 0 | 0 | 0 | 0 | 0 | 0 | 83 | 83 | 83 | 83 | 83 | 83 |
| 0 | 0 | 0 | 0 | 0 | 0 | 0 | 0 | 0 | 0 | 0 | 0 | 0 | 0 | 0 | 83 | 83 | 83 | 83 | 83 |
| 0 | 0 | 0 | 0 | 0 | 0 | 0 | 0 | 0 | 0 | 0 | 0 | 0 | 0 | 0 | 0 | 0 | 83 | 83 | 83 |

P6 P3

F I G. 8A
P4
| | | | | | | | | | | | | | | | | | | | |
|---|---|---|---|---|---|---|---|---|---|---|---|---|---|---|---|---|---|---|---|
| 2 | 0 | 0 | 0 | 1 | 2 | 0 | 0 | 0 | 1 | 2 | 0 | 0 | 0 | 1 | 2 | 0 | 0 | 0 | 1 |
| 0 | 1 | 2 | 0 | 0 | 0 | 1 | 2 | 0 | 0 | 0 | 1 | 2 | 0 | 0 | 0 | 1 | 2 | 0 | 0 |
| 0 | 0 | 0 | 1 | 2 | 0 | 0 | 0 | 1 | 2 | 0 | 0 | 0 | 1 | 2 | 0 | 0 | 0 | 1 | 2 |
| 0 | 0 | 0 | 0 | 0 | 1 | 2 | 0 | 0 | 0 | 1 | 2 | 0 | 0 | 0 | 1 | 2 | 0 | 0 | 0 |
| 0 | 0 | 0 | 2 | 0 | 0 | 0 | 1 | 2 | 0 | 0 | 0 | 1 | 2 | 0 | 0 | 0 | 1 | 2 | 0 |
| 0 | 0 | 0 | 0 | 0 | 2 | 0 | 0 | 0 | 1 | 2 | 0 | 0 | 0 | 1 | 2 | 0 | 0 | 0 | 1 |
| 0 | 0 | 0 | 0 | 0 | 0 | 1 | 2 | 0 | 0 | 0 | 1 | 2 | 0 | 0 | 0 | 1 | 2 | 0 | 0 |
| 0 | 0 | 0 | 0 | 0 | 0 | 0 | 0 | 1 | 2 | 0 | 0 | 0 | 1 | 2 | 0 | 0 | 0 | 1 | 2 |
| 0 | 0 | 0 | 0 | 0 | 0 | 0 | 0 | 0 | 0 | 1 | 2 | 0 | 0 | 0 | 1 | 2 | 0 | 0 | 0 |
| 0 | 0 | 0 | 0 | 0 | 0 | 0 | 0 | 0 | 0 | 0 | 0 | 1 | 2 | 0 | 0 | 0 | 1 | 2 | 0 |
| 0 | 0 | 0 | 0 | 0 | 0 | 0 | 0 | 0 | 0 | 0 | 0 | 0 | 0 | 1 | 2 | 0 | 0 | 0 | 1 |
| 0 | 0 | 0 | 0 | 0 | 0 | 0 | 0 | 0 | 0 | 0 | 0 | 0 | 0 | 0 | 0 | 1 | 2 | 0 | 0 |
| 0 | 0 | 0 | 0 | 0 | 0 | 0 | 0 | 0 | 0 | 0 | 0 | 0 | 0 | 2 | 0 | 0 | 0 | 1 | 2 |
| 0 | 0 | 0 | 0 | 0 | 0 | 0 | 0 | 0 | 0 | 0 | 0 | 0 | 0 | 0 | 1 | 2 | 0 | 0 | 0 |
| 0 | 0 | 0 | 0 | 0 | 0 | 0 | 0 | 0 | 0 | 0 | 0 | 0 | 0 | 0 | 0 | 0 | 1 | 2 | 0 |
P6 P3 P5
F I G. 8B
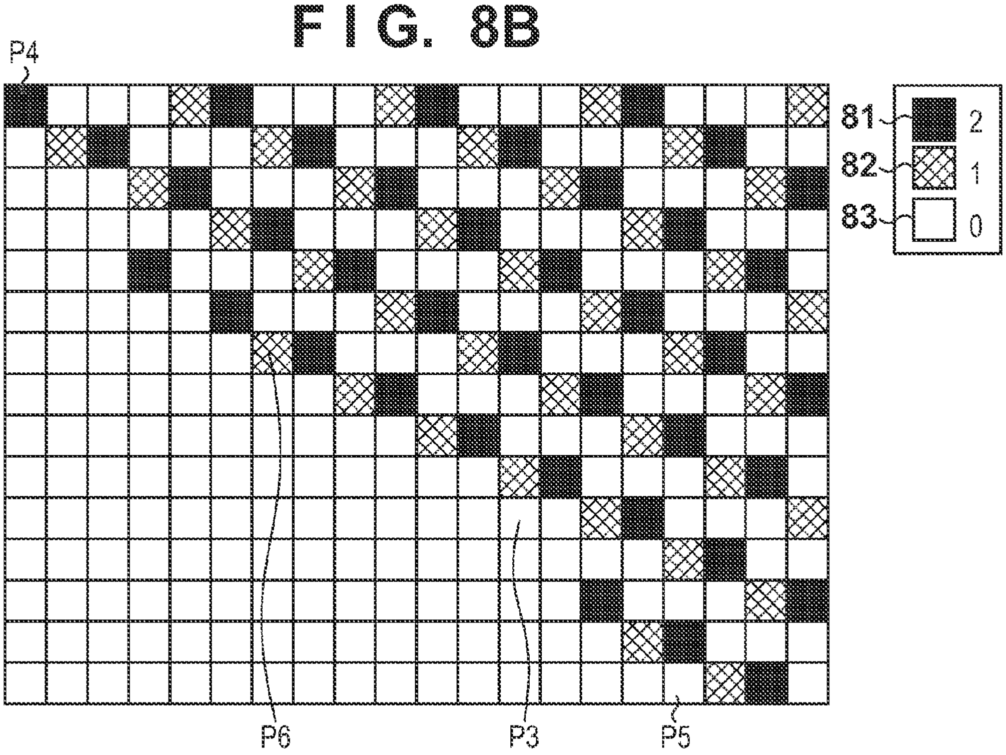

FIG. 10A

| | | | | | | | | | | | | | | | | | | | |
|---|---|---|---|---|---|---|---|---|---|---|---|---|---|---|---|---|---|---|---|
| 3 | 4 | 5 | 2 | 1 | 3 | 4 | 5 | 2 | 1 | 3 | 4 | 5 | 2 | 1 | 3 | 4 | 5 | 2 | 1 |
| 3 | 3 | 3 | 3 | 3 | 3 | 3 | 3 | 3 | 3 | 3 | 3 | 3 | 3 | 3 | 3 | 3 | 3 | 3 | 3 |
| 1 | 1 | 3 | 3 | 3 | 3 | 3 | 3 | 3 | 3 | 3 | 3 | 3 | 3 | 3 | 3 | 3 | 3 | 3 | 3 |
| 0 | 0 | 0 | 3 | 3 | 3 | 3 | 3 | 3 | 3 | 3 | 3 | 3 | 3 | 3 | 3 | 3 | 3 | 3 | 3 |
| 0 | 0 | 0 | 2 | 2 | 3 | 3 | 3 | 3 | 3 | 3 | 3 | 3 | 3 | 3 | 3 | 3 | 3 | 3 | 3 |
| 0 | 0 | 0 | 2 | 2 | 2 | 3 | 3 | 3 | 3 | 3 | 3 | 3 | 3 | 3 | 3 | 3 | 3 | 3 | 3 |
| 0 | 0 | 0 | 0 | 0 | 2 | 3 | 3 | 3 | 3 | 3 | 3 | 3 | 3 | 3 | 3 | 3 | 3 | 3 | 3 |
| 0 | 0 | 0 | 0 | 0 | 0 | 1 | 3 | 3 | 3 | 3 | 3 | 3 | 3 | 3 | 3 | 3 | 3 | 3 | 3 |
| 0 | 0 | 0 | 0 | 0 | 0 | 0 | 0 | 1 | 3 | 3 | 3 | 3 | 3 | 3 | 3 | 3 | 3 | 3 | 3 |
| 0 | 0 | 0 | 0 | 0 | 0 | 0 | 0 | 0 | 0 | 1 | 3 | 3 | 3 | 3 | 3 | 3 | 3 | 3 | 3 |
| 0 | 0 | 0 | 0 | 0 | 0 | 0 | 0 | 0 | 0 | 0 | 0 | 1 | 3 | 3 | 3 | 3 | 3 | 3 | 3 |
| 0 | 0 | 0 | 0 | 0 | 0 | 0 | 0 | 0 | 0 | 0 | 0 | 0 | 0 | 1 | 3 | 3 | 3 | 3 | 3 |
| 0 | 0 | 0 | 0 | 0 | 0 | 0 | 0 | 0 | 0 | 0 | 0 | 0 | 0 | 2 | 3 | 3 | 3 | 3 | 3 |
| 0 | 0 | 0 | 0 | 0 | 0 | 0 | 0 | 0 | 0 | 0 | 0 | 0 | 0 | 2 | 3 | 3 | 3 | 3 | 3 |
| 0 | 0 | 0 | 0 | 0 | 0 | 0 | 0 | 0 | 0 | 0 | 0 | 0 | 0 | 0 | 2 | 5 | 3 | 3 | 2 |

FIG. 10B

| | | | | | | | | | | | | | | | | | | | |
|---|---|---|---|---|---|---|---|---|---|---|---|---|---|---|---|---|---|---|---|
| 415 | 415 | 415 | 415 | 415 | 415 | 415 | 415 | 415 | 415 | 415 | 415 | 415 | 415 | 415 | 415 | 415 | 415 | 415 | 415 |
| 332 | 415 | 415 | 415 | 415 | 415 | 415 | 415 | 415 | 415 | 415 | 415 | 415 | 415 | 415 | 415 | 415 | 415 | 415 | 415 |
| 249 | 249 | 415 | 415 | 415 | 415 | 415 | 415 | 415 | 415 | 415 | 415 | 415 | 415 | 415 | 415 | 415 | 415 | 415 | 415 |
| 83 | 83 | 249 | 415 | 415 | 415 | 415 | 415 | 415 | 415 | 415 | 415 | 415 | 415 | 415 | 415 | 415 | 415 | 415 | 415 |
| 0 | 0 | 83 | 249 | 332 | 415 | 415 | 415 | 415 | 415 | 415 | 415 | 415 | 415 | 415 | 415 | 415 | 415 | 415 | 415 |
| 0 | 0 | 0 | 83 | 166 | 166 | 415 | 415 | 415 | 415 | 415 | 415 | 415 | 415 | 415 | 415 | 415 | 415 | 415 | 415 |
| 0 | 0 | 0 | 0 | 0 | 83 | 249 | 415 | 415 | 415 | 415 | 415 | 415 | 415 | 415 | 415 | 415 | 415 | 415 | 415 |
| 0 | 0 | 0 | 0 | 0 | 0 | 83 | 249 | 332 | 415 | 415 | 415 | 415 | 415 | 415 | 415 | 415 | 415 | 415 | 415 |
| 0 | 0 | 0 | 0 | 0 | 0 | 0 | 83 | 166 | 249 | 415 | 415 | 415 | 415 | 415 | 415 | 415 | 415 | 415 | 415 |
| 0 | 0 | 0 | 0 | 0 | 0 | 0 | 0 | 0 | 83 | 249 | 415 | 415 | 415 | 415 | 415 | 415 | 415 | 415 | 415 |
| 0 | 0 | 0 | 0 | 0 | 0 | 0 | 0 | 0 | 0 | 83 | 249 | 332 | 415 | 415 | 415 | 415 | 415 | 415 | 415 |
| 0 | 0 | 0 | 0 | 0 | 0 | 0 | 0 | 0 | 0 | 0 | 83 | 166 | 249 | 415 | 415 | 415 | 415 | 415 | 415 |
| 0 | 0 | 0 | 0 | 0 | 0 | 0 | 0 | 0 | 0 | 0 | 0 | 0 | 83 | 249 | 415 | 415 | 415 | 415 | 415 |
| 0 | 0 | 0 | 0 | 0 | 0 | 0 | 0 | 0 | 0 | 0 | 0 | 0 | 0 | 83 | 249 | 332 | 415 | 415 | 415 |
| 0 | 0 | 0 | 0 | 0 | 0 | 0 | 0 | 0 | 0 | 0 | 0 | 0 | 0 | 0 | 166 | 249 | 332 | 415 | 415 |

| | | | | | | | | | | | | | | | | | | | |
|---|---|---|---|---|---|---|---|---|---|---|---|---|---|---|---|---|---|---|---|
| 7 | -19 | -45 | 32 | 58 | 7 | -19 | -45 | 32 | 58 | 7 | -19 | -45 | 32 | 58 | 7 | -19 | -45 | 32 | 58 |
| -10 | 7 | 7 | 7 | 7 | 7 | 7 | 7 | 7 | 7 | 7 | 7 | 7 | 7 | 7 | 7 | 7 | 7 | 7 | 7 |
| 24 | 24 | 7 | 7 | 7 | 7 | 7 | 7 | 7 | 7 | 7 | 7 | 7 | 7 | 7 | 7 | 7 | 7 | 7 | 7 |
| 17 | 17 | 50 | 7 | 7 | 7 | 7 | 7 | 7 | 7 | 7 | 7 | 7 | 7 | 7 | 7 | 7 | 7 | 7 | 7 |
| 0 | 0 | 17 | -1 | 15 | 7 | 7 | 7 | 7 | 7 | 7 | 7 | 7 | 7 | 7 | 7 | 7 | 7 | 7 | 7 |
| 0 | 0 | 0 | -34 | -18 | -1 | 7 | 7 | 7 | 7 | 7 | 7 | 7 | 7 | 7 | 7 | 7 | 7 | 7 | 7 |
| 0 | 0 | 0 | 0 | 0 | -34 | -27 | 7 | 7 | 7 | 7 | 7 | 7 | 7 | 7 | 7 | 7 | 7 | 7 | 7 |
| 0 | 0 | 0 | 0 | 0 | 0 | -9 | -27 | -10 | 7 | 7 | 7 | 7 | 7 | 7 | 7 | 7 | 7 | 7 | 7 |
| 0 | 0 | 0 | 0 | 0 | 0 | 0 | 17 | 8 | -27 | 7 | 7 | 7 | 7 | 7 | 7 | 7 | 7 | 7 | 7 |
| 0 | 0 | 0 | 0 | 0 | 0 | 0 | 0 | 0 | 17 | 24 | 7 | 7 | 7 | 7 | 7 | 7 | 7 | 7 | 7 |
| 0 | 0 | 0 | 0 | 0 | 0 | 0 | 0 | 0 | 0 | 17 | 50 | 41 | 7 | 7 | 7 | 7 | 7 | 7 | 7 |
| 0 | 0 | 0 | 0 | 0 | 0 | 0 | 0 | 0 | 0 | 0 | 17 | 33 | 50 | 7 | 7 | 7 | 7 | 7 | 7 |
| 0 | 0 | 0 | 0 | 0 | 0 | 0 | 0 | 0 | 0 | 0 | 0 | 0 | 17 | -1 | 7 | 7 | 7 | 7 | 7 |
| 0 | 0 | 0 | 0 | 0 | 0 | 0 | 0 | 0 | 0 | 0 | 0 | 0 | 0 | -34 | -27 | -10 | 7 | 7 | 7 |
| 0 | 0 | 0 | 0 | 0 | 0 | 0 | 0 | 0 | 0 | 0 | 0 | 0 | 0 | 0 | -18 | -78 | -10 | 7 | 32 |

P3

F I G. 15A
| | | | | | | | | | | | | | | | | | | | |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 1 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | −1 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
P6 P3
F I G. 15B
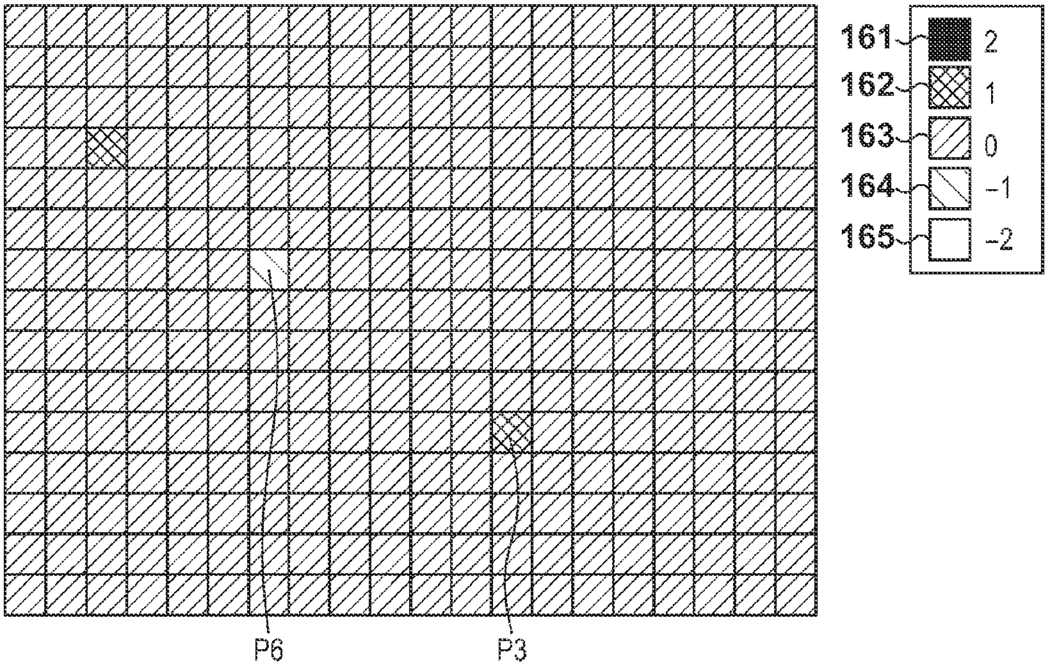

| | | | | | | | | | | | | | | | | | | | |
|---|---|---|---|---|---|---|---|---|---|---|---|---|---|---|---|---|---|---|---|
| 2 | 0 | 0 | 0 | 1 | 2 | 0 | 0 | 0 | 1 | 2 | 0 | 0 | 0 | 1 | 2 | 0 | 0 | 1 | 2 |
| 0 | 1 | 2 | 0 | 0 | 0 | 1 | 2 | 0 | 0 | 0 | 1 | 2 | 0 | 0 | 0 | 1 | 2 | 0 | 0 |
| 0 | 0 | 0 | 1 | 2 | 0 | 0 | 0 | 1 | 2 | 0 | 0 | 0 | 1 | 2 | 0 | 0 | 0 | 1 | 2 |
| 0 | 0 | 1 | 0 | 0 | 1 | 2 | 0 | 0 | 0 | 1 | 2 | 0 | 0 | 0 | 1 | 2 | 0 | 0 | 0 |
| 0 | 0 | 0 | 2 | 0 | 0 | 0 | 1 | 2 | 0 | 0 | 0 | 1 | 2 | 0 | 0 | 0 | 1 | 2 | 0 |
| 0 | 0 | 0 | 0 | 0 | 2 | 0 | 0 | 0 | 1 | 2 | 0 | 0 | 0 | 1 | 2 | 0 | 0 | 0 | 1 |
| 0 | 0 | 0 | 0 | 0 | 0 | 0 | 2 | 0 | 0 | 0 | 1 | 2 | 0 | 0 | 0 | 1 | 2 | 0 | 0 |
| 0 | 0 | 0 | 0 | 0 | 0 | 0 | 0 | 1 | 2 | 0 | 0 | 0 | 1 | 2 | 0 | 0 | 0 | 1 | 2 |
| 0 | 0 | 0 | 0 | 0 | 0 | 0 | 0 | 0 | 0 | 1 | 2 | 0 | 0 | 0 | 1 | 2 | 0 | 0 | 0 |
| 0 | 0 | 0 | 0 | 0 | 0 | 0 | 0 | 0 | 0 | 0 | 0 | 1 | 2 | 0 | 0 | 0 | 1 | 2 | 0 |
| 0 | 0 | 0 | 0 | 0 | 0 | 0 | 0 | 0 | 0 | 0 | 0 | 1 | 0 | 1 | 2 | 0 | 0 | 0 | 1 |
| 0 | 0 | 0 | 0 | 0 | 0 | 0 | 0 | 0 | 0 | 0 | 0 | 0 | 0 | 0 | 0 | 1 | 2 | 0 | 0 |
| 0 | 0 | 0 | 0 | 0 | 0 | 0 | 0 | 0 | 0 | 0 | 0 | 0 | 0 | 2 | 0 | 0 | 0 | 1 | 2 |
| 0 | 0 | 0 | 0 | 0 | 0 | 0 | 0 | 0 | 0 | 0 | 0 | 0 | 0 | 0 | 1 | 2 | 0 | 0 | 0 |
| 0 | 0 | 0 | 0 | 0 | 0 | 0 | 0 | 0 | 0 | 0 | 0 | 0 | 0 | 0 | 0 | 0 | 1 | 2 | 0 |

P6 P3

| | | | | | | | | | | | | | | | | | | | |
|---|---|---|---|---|---|---|---|---|---|---|---|---|---|---|---|---|---|---|---|
| 255 | -19 | -45 | 32 | 186 | 255 | -19 | -45 | 32 | 186 | 255 | -19 | -45 | 32 | 186 | 255 | -19 | -45 | 32 | 186 |
| 0 | 128 | 255 | 0 | 0 | 0 | 128 | 255 | 0 | 0 | 0 | 128 | 255 | 0 | 0 | 0 | 128 | 255 | 0 | 0 |
| 24 | 24 | 0 | 128 | 255 | 0 | 0 | 0 | 128 | 255 | 0 | 0 | 0 | 128 | 255 | 0 | 0 | 0 | 128 | 255 |
| 17 | 17 | 50 | 0 | 0 | 128 | 255 | 0 | 0 | 0 | 128 | 255 | 0 | 0 | 0 | 128 | 255 | 0 | 0 | 0 |
| 0 | 0 | 17 | 255 | 15 | 0 | 0 | 128 | 255 | 0 | 0 | 0 | 128 | 255 | 0 | 0 | 0 | 128 | 255 | 0 |
| 0 | 0 | 0 | -34 | -18 | 255 | 0 | 0 | 0 | 128 | 255 | 0 | 0 | 0 | 128 | 255 | 0 | 0 | 0 | 128 |
| 0 | 0 | 0 | 0 | 0 | -34 | 101 | 255 | 0 | 0 | 0 | 128 | 255 | 0 | 0 | 0 | 128 | 255 | 0 | 0 |
| 0 | 0 | 0 | 0 | 0 | 0 | 0 | -27 | 128 | 255 | 0 | 0 | 0 | 128 | 255 | 0 | 0 | 0 | 128 | 255 |
| 0 | 0 | 0 | 0 | 0 | 0 | 0 | 17 | 0 | -27 | 128 | 255 | 0 | 0 | 0 | 128 | 255 | 0 | 0 | 0 |
| 0 | 0 | 0 | 0 | 0 | 0 | 0 | 0 | 0 | 17 | 24 | 0 | 128 | 255 | 0 | 0 | 0 | 128 | 255 | 0 |
| 0 | 0 | 0 | 0 | 0 | 0 | 0 | 0 | 0 | 0 | 17 | 50 | 41 | 0 | 128 | 255 | 0 | 0 | 0 | 128 |
| 0 | 0 | 0 | 0 | 0 | 0 | 0 | 0 | 0 | 0 | 0 | 17 | 33 | 50 | 0 | 0 | 128 | 255 | 0 | 0 |
| 0 | 0 | 0 | 0 | 0 | 0 | 0 | 0 | 0 | 0 | 0 | 0 | 0 | 17 | 255 | 0 | 0 | 0 | 128 | 255 |
| 0 | 0 | 0 | 0 | 0 | 0 | 0 | 0 | 0 | 0 | 0 | 0 | 0 | 0 | -34 | 101 | 255 | 0 | 0 | 0 |
| 0 | 0 | 0 | 0 | 0 | 0 | 0 | 0 | 0 | 0 | 0 | 0 | 0 | 0 | 0 | -18 | -78 | 128 | 255 | 0 |

P6 P3 P5

FIG. 19A
| | | | | | | | | | | | | | | | | | | | |
|---|---|---|---|---|---|---|---|---|---|---|---|---|---|---|---|---|---|---|---|
| 0 | 0 | 0 | 32 | 58 | 0 | 0 | 0 | 32 | 58 | 0 | 0 | 0 | 32 | 58 | 0 | 0 | 0 | 32 | 58 |
| 0 | 0 | 0 | 0 | 0 | 0 | 0 | 0 | 0 | 0 | 0 | 0 | 0 | 0 | 0 | 0 | 0 | 0 | 0 | 0 |
| 24 | 24 | 0 | 0 | 0 | 0 | 0 | 0 | 0 | 0 | 0 | 0 | 0 | 0 | 0 | 0 | 0 | 0 | 0 | 0 |
| 17 | 17 | 50 | 0 | 0 | 0 | 0 | 0 | 0 | 0 | 0 | 0 | 0 | 0 | 0 | 0 | 0 | 0 | 0 | 0 |
| 0 | 0 | 17 | 0 | 15 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 17 | 0 | 0 | 0 | 0 | 0 | 0 | 0 | 0 | 0 | 0 | 0 | 0 |
| 0 | 0 | 0 | 0 | 0 | 0 | 0 | 0 | 0 | 17 | 24 | 0 | 0 | 0 | 0 | 0 | 0 | 0 | 0 | 0 |
| 0 | 0 | 0 | 0 | 0 | 0 | 0 | 0 | 0 | 0 | 17 | 50 | 41 | 0 | 0 | 0 | 0 | 0 | 0 | 0 |
| 0 | 0 | 0 | 0 | 0 | 0 | 0 | 0 | 0 | 0 | 0 | 17 | 33 | 50 | 0 | 0 | 0 | 0 | 0 | 0 |
| 0 | 0 | 0 | 0 | 0 | 0 | 0 | 0 | 0 | 0 | 0 | 0 | 0 | 17 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 32 |
FIG. 19B
| | | | | | | | | | | | | | | | | | | | |
|---|---|---|---|---|---|---|---|---|---|---|---|---|---|---|---|---|---|---|---|
| 0 | -19 | -45 | 0 | 0 | 0 | -19 | -45 | 0 | 0 | 0 | -19 | -45 | 0 | 0 | 0 | -19 | -45 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | -34 | -16 | 0 | 0 | 0 | 0 | 0 | 0 | 0 | 0 | 0 | 0 | 0 | 0 | 0 | 0 | 0 |
| 0 | 0 | 0 | 0 | 0 | -34 | -27 | 0 | 0 | 0 | 0 | 0 | 0 | 0 | 0 | 0 | 0 | 0 | 0 | 0 |
| 0 | 0 | 0 | 0 | 0 | 0 | 0 | -27 | 0 | 0 | 0 | 0 | 0 | 0 | 0 | 0 | 0 | 0 | 0 | 0 |
| 0 | 0 | 0 | 0 | 0 | 0 | 0 | 0 | 0 | -27 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | -34 | -27 | 0 | 0 | 0 | 0 |
| 0 | 0 | 0 | 0 | 0 | 0 | 0 | 0 | 0 | 0 | 0 | 0 | 0 | 0 | 0 | -18 | -78 | 0 | 0 | 0 |
FIG. 19C
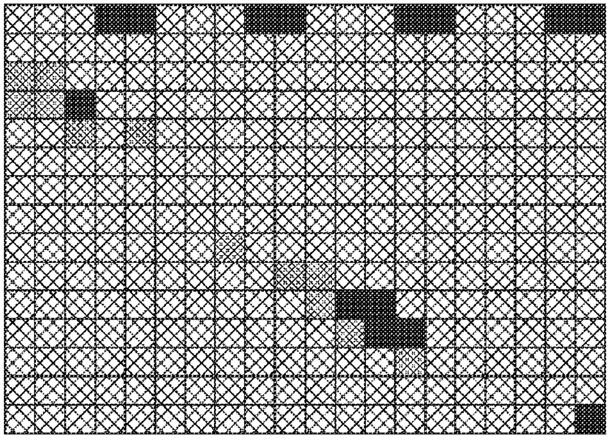
FIG. 19D
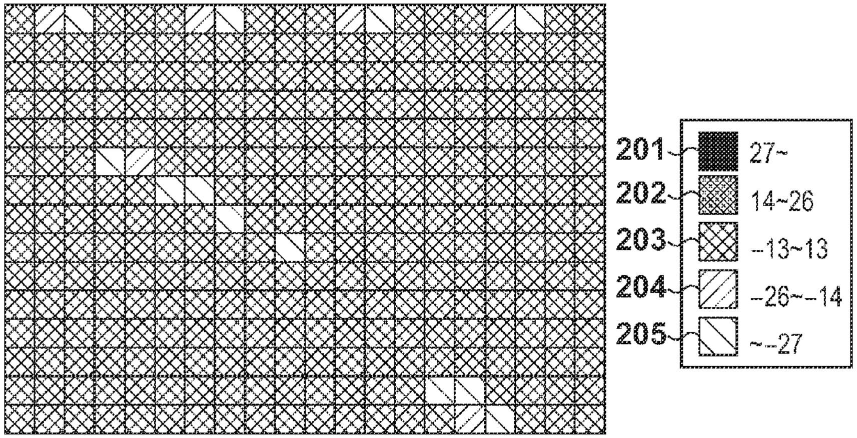

| | | | | | | | | | | | | | | | | | | | |
|---|---|---|---|---|---|---|---|---|---|---|---|---|---|---|---|---|---|---|---|
| 2 | 0 | 0 | 0 | 2 | 2 | 0 | 0 | 0 | 2 | 2 | 0 | 0 | 0 | 2 | 2 | 0 | 0 | 0 | 2 |
| 0 | 1 | 2 | 0 | 0 | 0 | 1 | 2 | 0 | 0 | 0 | 1 | 2 | 0 | 0 | 0 | 1 | 2 | 0 | 0 |
| 0 | 0 | 0 | 1 | 2 | 0 | 0 | 0 | 1 | 2 | 0 | 0 | 0 | 1 | 2 | 0 | 0 | 0 | 1 | 2 |
| 0 | 0 | 1 | 0 | 0 | 1 | 2 | 0 | 0 | 0 | 1 | 2 | 0 | 0 | 0 | 1 | 2 | 0 | 0 | 0 |
| 0 | 0 | 0 | 2 | 0 | 0 | 0 | 1 | 2 | 0 | 0 | 0 | 1 | 2 | 0 | 0 | 0 | 1 | 2 | 0 |
| 0 | 0 | 0 | 0 | 0 | 2 | 0 | 0 | 0 | 1 | 2 | 0 | 0 | 0 | 1 | 2 | 0 | 0 | 0 | 1 |
| 0 | 0 | 0 | 0 | 0 | 0 | 0 | 2 | 0 | 0 | 0 | 1 | 2 | 0 | 0 | 0 | 1 | 2 | 0 | 0 |
| 0 | 0 | 0 | 0 | 0 | 0 | 0 | 0 | 1 | 2 | 0 | 0 | 0 | 1 | 2 | 0 | 0 | 0 | 1 | 2 |
| 0 | 0 | 0 | 0 | 0 | 0 | 0 | 0 | 0 | 0 | 1 | 2 | 0 | 0 | 0 | 1 | 2 | 0 | 0 | 0 |
| 0 | 0 | 0 | 0 | 0 | 0 | 0 | 0 | 0 | 0 | 0 | 0 | 1 | 2 | 0 | 0 | 0 | 1 | 2 | 0 |
| 0 | 0 | 0 | 0 | 0 | 0 | 0 | 0 | 0 | 0 | 0 | 1 | 0 | 0 | 1 | 2 | 0 | 0 | 0 | 1 |
| 0 | 0 | 0 | 0 | 0 | 0 | 0 | 0 | 0 | 0 | 0 | 0 | 0 | 1 | 0 | 0 | 1 | 2 | 0 | 0 |
| 0 | 0 | 0 | 0 | 0 | 0 | 0 | 0 | 0 | 0 | 0 | 0 | 0 | 0 | 2 | 0 | 0 | 0 | 1 | 2 |
| 0 | 0 | 0 | 0 | 0 | 0 | 0 | 0 | 0 | 0 | 0 | 0 | 0 | 0 | 0 | 0 | 2 | 0 | 0 | 0 |
| 0 | 0 | 0 | 0 | 0 | 0 | 0 | 0 | 0 | 0 | 0 | 0 | 0 | 0 | 0 | 0 | 0 | 1 | 2 | 0 |

P7 P3 P8 P9

| | | | | | | | | | | | | | | | | | | | |
|---|---|---|---|---|---|---|---|---|---|---|---|---|---|---|---|---|---|---|---|
| 2 | 0 | 0 | 0 | 1 | 2 | 0 | 0 | 0 | 1 | 2 | 0 | 0 | 0 | 1 | 2 | 0 | 0 | 0 | 1 |
| 0 | 1 | 2 | 0 | 0 | 0 | 1 | 2 | 0 | 0 | 0 | 1 | 2 | 0 | 0 | 0 | 1 | 2 | 0 | 0 |
| 0 | 0 | 0 | 1 | 2 | 0 | 0 | 0 | 1 | 2 | 0 | 0 | 0 | 1 | 2 | 0 | 0 | 0 | 1 | 2 |
| 0 | 0 | 1 | 0 | 0 | 1 | 2 | 0 | 0 | 0 | 1 | 2 | 0 | 0 | 0 | 1 | 2 | 0 | 0 | 0 |
| 0 | 0 | 0 | 2 | 0 | 0 | 0 | 1 | 2 | 0 | 0 | 0 | 1 | 2 | 0 | 0 | 0 | 1 | 2 | 0 |
| 0 | 0 | 0 | 0 | 0 | 2 | 0 | 0 | 0 | 1 | 2 | 0 | 0 | 0 | 1 | 2 | 0 | 0 | 0 | 1 |
| 0 | 0 | 0 | 0 | 0 | 0 | 0 | 2 | 0 | 0 | 0 | 1 | 2 | 0 | 0 | 0 | 1 | 2 | 0 | 0 |
| 0 | 0 | 0 | 0 | 0 | 0 | 0 | 0 | 1 | 2 | 0 | 0 | 0 | 1 | 2 | 0 | 0 | 0 | 1 | 2 |
| 0 | 0 | 0 | 0 | 0 | 0 | 0 | 0 | 0 | 0 | 1 | 2 | 0 | 0 | 0 | 1 | 2 | 0 | 0 | 0 |
| 0 | 0 | 0 | 0 | 0 | 0 | 0 | 0 | 0 | 0 | 0 | 0 | 1 | 2 | 0 | 0 | 0 | 1 | 2 | 0 |
| 0 | 0 | 0 | 0 | 0 | 0 | 0 | 0 | 0 | 0 | 0 | 0 | 1 | 0 | 1 | 2 | 0 | 0 | 0 | 1 |
| 0 | 0 | 0 | 0 | 0 | 0 | 0 | 0 | 0 | 0 | 0 | 0 | 0 | 0 | 0 | 0 | 1 | 2 | 0 | 0 |
| 0 | 0 | 0 | 0 | 0 | 0 | 0 | 0 | 0 | 0 | 0 | 0 | 0 | 0 | 2 | 0 | 0 | 0 | 1 | 2 |
| 0 | 0 | 0 | 0 | 0 | 0 | 0 | 0 | 0 | 0 | 0 | 0 | 0 | 0 | 0 | 1 | 2 | 0 | 0 | 0 |
| 0 | 0 | 0 | 0 | 0 | 0 | 0 | 0 | 0 | 0 | 0 | 0 | 0 | 0 | 0 | 0 | 0 | 1 | 2 | 0 |

| ROW NUMBER \ COLUMN NUMBER | 0 | 1 | 2 | 3 | 4 |
|---|---|---|---|---|---|
| 0 | 0 | 2 | 4 | 3 | 1 |
| 1 | 3 | 1 | 0 | 2 | 4 |
| 2 | 2 | 4 | 3 | 1 | 0 |
| 3 | 1 | 0 | 2 | 4 | 3 |
| 4 | 4 | 3 | 1 | 0 | 2 |

| THRESHOLD NUMBER \ THRESHOLD | Th1 | Th2 | Th3 | Th4 |
|---|---|---|---|---|
| 0 | 12 | 24 | 85 | 97 |
| 1 | 36 | 49 | 109 | 121 |
| 2 | 61 | 73 | 134 | 146 |
| 3 | 158 | 170 | 182 | 231 |
| 4 | 194 | 206 | 219 | 243 |

| 0 ADDRESS | 0 |
| 1 ADDRESS | 2 |
| 2 ADDRESS | 4 |
| 3 ADDRESS | 3 |
| 4 ADDRESS | 1 |

| 5 ADDRESS | 3 |
| 6 ADDRESS | 1 |
| 7 ADDRESS | 0 |
| 8 ADDRESS | 2 |
| 9 ADDRESS | 4 |

| 20 ADDRESS | 4 |
| 21 ADDRESS | 3 |
| 22 ADDRESS | 1 |
| 23 ADDRESS | 0 |
| 24 ADDRESS | 2 |

| 100 ADDRESS | 12 |
| 101 ADDRESS | 24 |
| 102 ADDRESS | 85 |
| 103 ADDRESS | 97 |

| 104 ADDRESS | 36 |
| 105 ADDRESS | 49 |
| 106 ADDRESS | 109 |
| 107 ADDRESS | 121 |

| 116 ADDRESS | 194 |
| 117 ADDRESS | 200 |
| 118 ADDRESS | 219 |
| 119 ADDRESS | 243 |

F I G. 25A
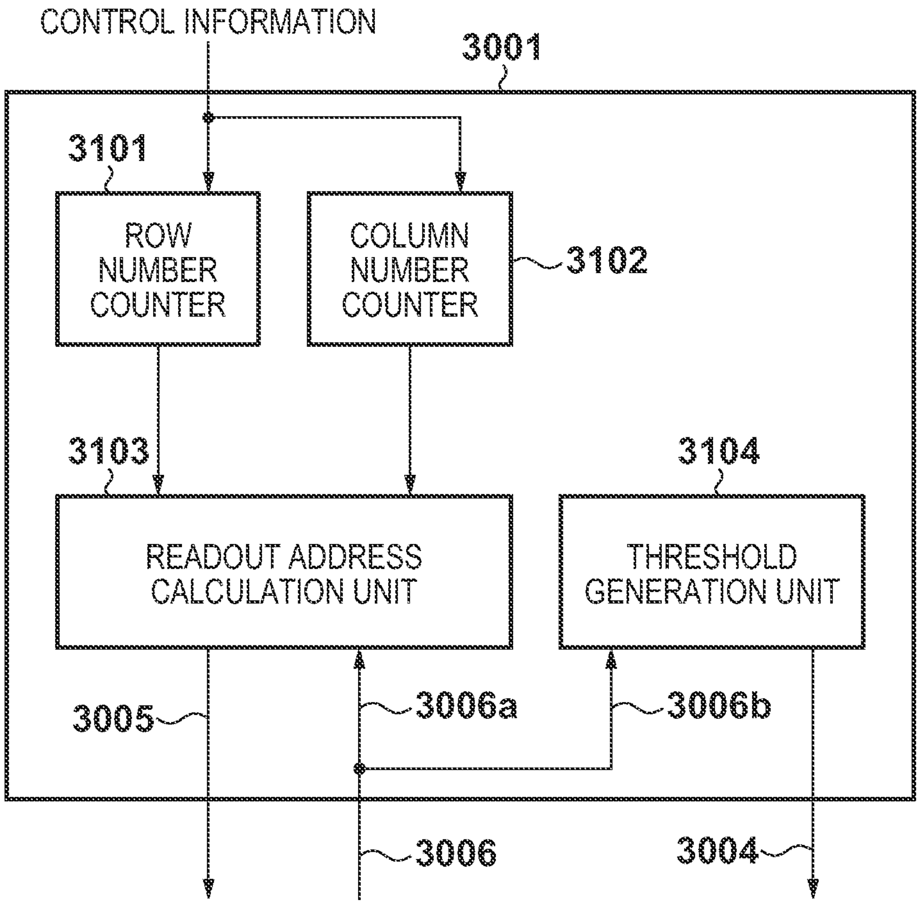

F I G. 25B
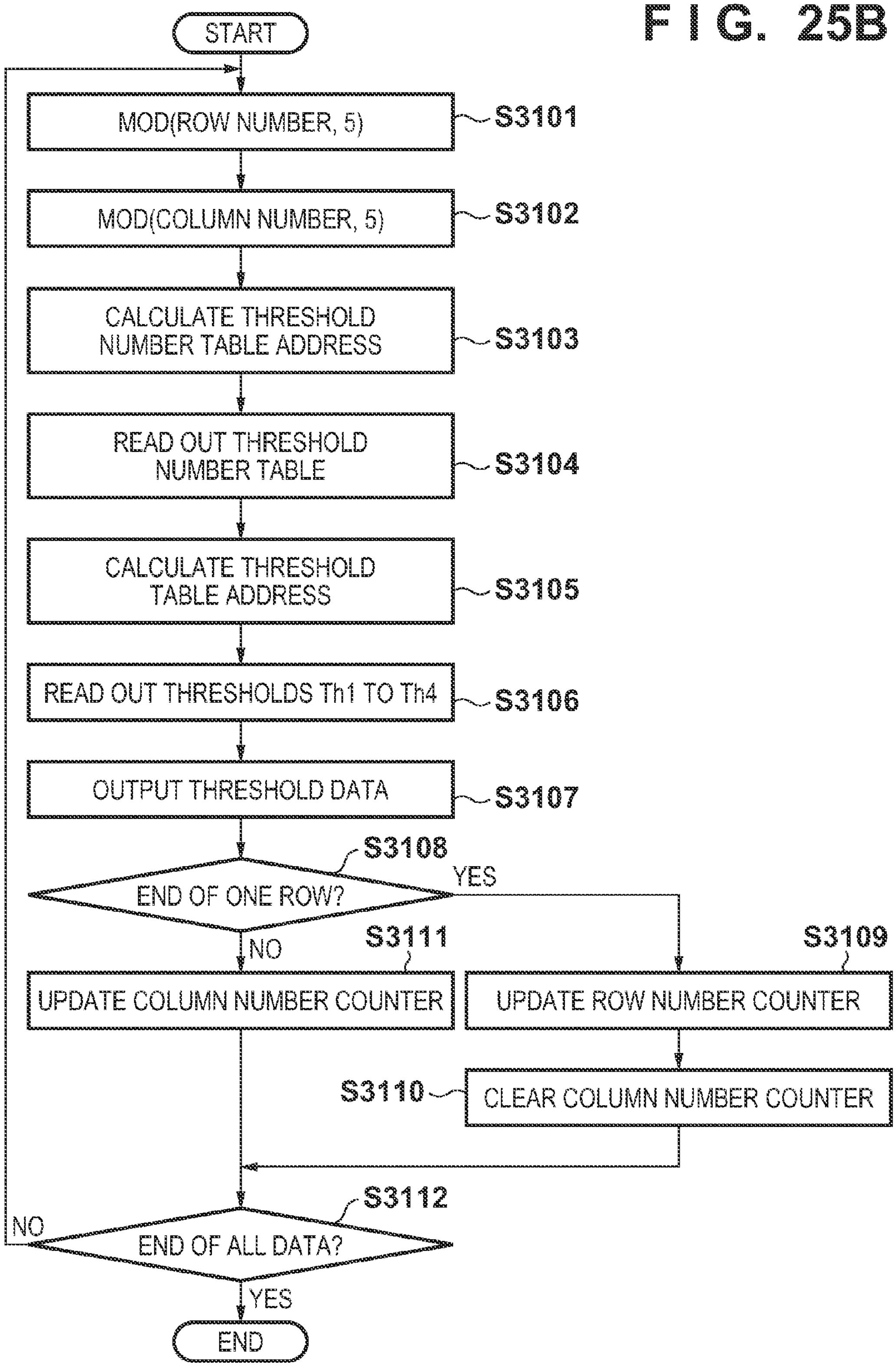

P1 P2

| | | | | | | | | | | | | | | | | | | | |
|---|---|---|---|---|---|---|---|---|---|---|---|---|---|---|---|---|---|---|---|
| 87 | 87 | 87 | 87 | 87 | 87 | 87 | 87 | 87 | 87 | 87 | 87 | 87 | 87 | 87 | 87 | 87 | 87 | 87 | 87 |
| 87 | 87 | 87 | 87 | 87 | 87 | 87 | 87 | 87 | 87 | 87 | 87 | 87 | 87 | 87 | 87 | 87 | 87 | 87 | 87 |
| 0 | 87 | 87 | 87 | 87 | 87 | 87 | 87 | 87 | 87 | 87 | 87 | 87 | 87 | 87 | 87 | 87 | 87 | 87 | 87 |
| 0 | 0 | 87 | 87 | 87 | 87 | 87 | 87 | 87 | 87 | 87 | 87 | 87 | 87 | 87 | 87 | 87 | 87 | 87 | 87 |
| 0 | 0 | 0 | 87 | 87 | 87 | 87 | 87 | 87 | 87 | 87 | 87 | 87 | 87 | 87 | 87 | 87 | 87 | 87 | 87 |
| 0 | 0 | 0 | 0 | 0 | 87 | 87 | 87 | 87 | 87 | 87 | 87 | 87 | 87 | 87 | 87 | 87 | 87 | 87 | 87 |
| 0 | 0 | 0 | 0 | 0 | 0 | 87 | 87 | 87 | 87 | 87 | 87 | 87 | 87 | 87 | 87 | 87 | 87 | 87 | 87 |
| 0 | 0 | 0 | 0 | 0 | 0 | 0 | 87 | 87 | 87 | 87 | 87 | 87 | 87 | 87 | 87 | 87 | 87 | 87 | 87 |
| 0 | 0 | 0 | 0 | 0 | 0 | 0 | 0 | 0 | 87 | 87 | 87 | 87 | 87 | 87 | 87 | 87 | 87 | 87 | 87 |
| 0 | 0 | 0 | 0 | 0 | 0 | 0 | 0 | 0 | 0 | 87 | 87 | 87 | 87 | 87 | 87 | 87 | 87 | 87 | 87 |
| 0 | 0 | 0 | 0 | 0 | 0 | 0 | 0 | 0 | 0 | 0 | 87 | 87 | 87 | 87 | 87 | 87 | 87 | 87 | 87 |
| 0 | 0 | 0 | 0 | 0 | 0 | 0 | 0 | 0 | 0 | 0 | 0 | 0 | 87 | 87 | 87 | 87 | 87 | 87 | 87 |
| 0 | 0 | 0 | 0 | 0 | 0 | 0 | 0 | 0 | 0 | 0 | 0 | 0 | 0 | 87 | 87 | 87 | 87 | 87 | 87 |
| 0 | 0 | 0 | 0 | 0 | 0 | 0 | 0 | 0 | 0 | 0 | 0 | 0 | 0 | 0 | 87 | 87 | 87 | 87 | 87 |
| 0 | 0 | 0 | 0 | 0 | 0 | 0 | 0 | 0 | 0 | 0 | 0 | 0 | 0 | 0 | 0 | 0 | 87 | 87 | 87 |

| | | | | | | | | | | | | | | | | | | | |
|---|---|---|---|---|---|---|---|---|---|---|---|---|---|---|---|---|---|---|---|
| 3 | 2 | 0 | 0 | 2 | 3 | 2 | 0 | 0 | 2 | 3 | 2 | 0 | 0 | 2 | 3 | 2 | 0 | 0 | 2 |
| 0 | 2 | 3 | 2 | 0 | 0 | 2 | 3 | 2 | 0 | 0 | 2 | 3 | 2 | 0 | 0 | 2 | 3 | 2 | 0 |
| 0 | 0 | 0 | 2 | 3 | 2 | 0 | 0 | 2 | 3 | 2 | 0 | 0 | 2 | 3 | 2 | 0 | 0 | 2 | 3 |
| 0 | 0 | 2 | 0 | 0 | 2 | 3 | 2 | 0 | 0 | 2 | 3 | 2 | 0 | 0 | 2 | 3 | 2 | 0 | 0 |
| 0 | 0 | 0 | 3 | 2 | 0 | 0 | 2 | 3 | 2 | 0 | 0 | 2 | 3 | 2 | 0 | 0 | 2 | 3 | 2 |
| 0 | 0 | 0 | 0 | 0 | 3 | 2 | 0 | 0 | 2 | 3 | 2 | 0 | 0 | 2 | 3 | 2 | 0 | 0 | 2 |
| 0 | 0 | 0 | 0 | 0 | 0 | 2 | 3 | 2 | 0 | 0 | 2 | 3 | 2 | 0 | 0 | 2 | 3 | 2 | 0 |
| 0 | 0 | 0 | 0 | 0 | 0 | 0 | 0 | 2 | 3 | 2 | 0 | 0 | 2 | 3 | 2 | 0 | 0 | 2 | 3 |
| 0 | 0 | 0 | 0 | 0 | 0 | 0 | 0 | 0 | 0 | 2 | 3 | 2 | 0 | 0 | 2 | 3 | 2 | 0 | 0 |
| 0 | 0 | 0 | 0 | 0 | 0 | 0 | 0 | 0 | 0 | 0 | 0 | 2 | 3 | 2 | 0 | 0 | 2 | 3 | 2 |
| 0 | 0 | 0 | 0 | 0 | 0 | 0 | 0 | 0 | 0 | 0 | 2 | 0 | 0 | 2 | 3 | 2 | 0 | 0 | 2 |
| 0 | 0 | 0 | 0 | 0 | 0 | 0 | 0 | 0 | 0 | 0 | 0 | 0 | 2 | 0 | 0 | 2 | 3 | 2 | 0 |
| 0 | 0 | 0 | 0 | 0 | 0 | 0 | 0 | 0 | 0 | 0 | 0 | 0 | 0 | 3 | 2 | 0 | 0 | 2 | 3 |
| 0 | 0 | 0 | 0 | 0 | 0 | 0 | 0 | 0 | 0 | 0 | 0 | 0 | 0 | 0 | 2 | 3 | 2 | 0 | 0 |
| 0 | 0 | 0 | 0 | 0 | 0 | 0 | 0 | 0 | 0 | 0 | 0 | 0 | 0 | 0 | 0 | 0 | 2 | 3 | 2 |

P10 P3 P11

FIG. 29A
| | | | | | | | | | | | | | | | | | | | |
|---|---|---|---|---|---|---|---|---|---|---|---|---|---|---|---|---|---|---|---|
| 0 | 0 | 0 | 0 | 36 | 23 | 0 | 0 | 0 | 36 | 23 | 0 | 0 | 0 | 36 | 23 | 0 | 0 | 0 | 36 |
| 0 | 0 | 0 | 0 | 0 | 0 | 0 | 0 | 0 | 0 | 0 | 0 | 0 | 0 | 0 | 0 | 0 | 0 | 0 | 0 |
| 26 | 26 | 0 | 0 | 0 | 0 | 0 | 0 | 0 | 0 | 0 | 0 | 0 | 0 | 0 | 0 | 0 | 0 | 0 | 0 |
| 17 | 17 | 26 | 0 | 0 | 0 | 0 | 0 | 0 | 0 | 0 | 0 | 0 | 0 | 0 | 0 | 0 | 0 | 0 | 0 |
| 0 | 0 | 0 | 0 | 5 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 17 | 9 | 0 | 0 | 0 | 0 | 0 | 0 | 0 | 0 | 0 | 0 | 0 |
| 0 | 0 | 0 | 0 | 0 | 0 | 0 | 0 | 0 | 17 | 26 | 0 | 0 | 0 | 0 | 0 | 0 | 0 | 0 | 0 |
| 0 | 0 | 0 | 0 | 0 | 0 | 0 | 0 | 0 | 0 | 17 | 26 | 18 | 0 | 0 | 0 | 0 | 0 | 0 | 0 |
| 0 | 0 | 0 | 0 | 0 | 0 | 0 | 0 | 0 | 0 | 0 | 0 | 9 | 26 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 23 |
FIG. 29B
| | | | | | | | | | | | | | | | | | | | |
|---|---|---|---|---|---|---|---|---|---|---|---|---|---|---|---|---|---|---|---|
| -2 | -27 | -40 | -2 | 0 | 0 | -27 | -40 | -2 | 0 | 0 | -27 | -40 | -2 | 0 | 0 | -27 | -40 | -2 | 0 |
| -19 | -2 | -2 | -2 | -2 | -2 | -2 | -2 | -2 | -2 | -2 | -2 | -2 | -2 | -2 | -2 | -2 | -2 | -2 | -2 |
| 0 | 0 | -2 | -2 | -2 | -2 | -2 | -2 | -2 | -2 | -2 | -2 | -2 | -2 | -2 | -2 | -2 | -2 | -2 | -2 |
| 0 | 0 | 0 | -2 | -2 | -2 | -2 | -2 | -2 | -2 | -2 | -2 | -2 | -2 | -2 | -2 | -2 | -2 | -2 | -2 |
| 0 | 0 | -8 | -11 | 0 | -2 | -2 | -2 | -2 | -2 | -2 | -2 | -2 | -2 | -2 | -2 | -2 | -2 | -2 | -2 |
| 0 | 0 | 0 | -20 | -28 | -11 | -2 | -2 | -2 | -2 | -2 | -2 | -2 | -2 | -2 | -2 | -2 | -2 | -2 | -2 |
| 0 | 0 | 0 | 0 | 0 | -20 | -37 | -2 | -2 | -2 | -2 | -2 | -2 | -2 | -2 | -2 | -2 | -2 | -2 | -2 |
| 0 | 0 | 0 | 0 | 0 | 0 | -8 | -11 | -19 | -2 | -2 | -2 | -2 | -2 | -2 | -2 | -2 | -2 | -2 | -2 |
| 0 | 0 | 0 | 0 | 0 | 0 | 0 | 0 | 0 | -11 | -2 | -2 | -2 | -2 | -2 | -2 | -2 | -2 | -2 | -2 |
| 0 | 0 | 0 | 0 | 0 | 0 | 0 | 0 | 0 | 0 | 0 | -2 | -2 | -2 | -2 | -2 | -2 | -2 | -2 | -2 |
| 0 | 0 | 0 | 0 | 0 | 0 | 0 | 0 | 0 | 0 | 0 | 0 | 18 | -2 | -2 | -2 | -2 | -2 | -2 | -2 |
| 0 | 0 | 0 | 0 | 0 | 0 | 0 | 0 | 0 | 0 | 0 | -8 | 0 | 0 | -2 | -2 | -2 | -2 | -2 | -2 |
| 0 | 0 | 0 | 0 | 0 | 0 | 0 | 0 | 0 | 0 | 0 | 0 | 0 | -8 | -11 | -2 | -2 | -2 | -2 | -2 |
| 0 | 0 | 0 | 0 | 0 | 0 | 0 | 0 | 0 | 0 | 0 | 0 | 0 | 0 | -20 | -37 | -19 | -2 | -2 | -2 |
| 0 | 0 | 0 | 0 | 0 | 0 | 0 | 0 | 0 | 0 | 0 | 0 | 0 | 0 | 0 | -16 | -49 | -45 | -2 | 0 |
FIG. 29C
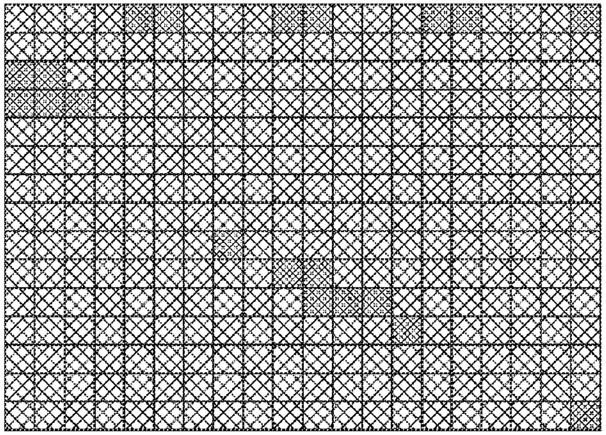
FIG. 29D
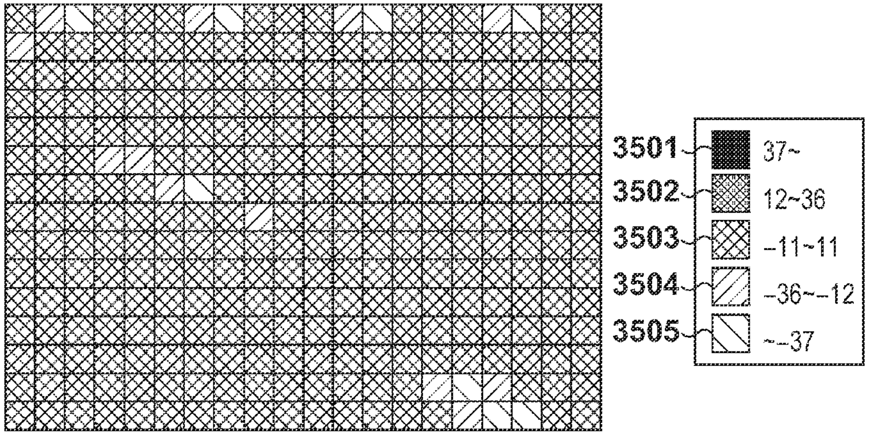

F I G. 32A
| | | | | | | | | | | | | | | | | | | | |
|---|---|---|---|---|---|---|---|---|---|---|---|---|---|---|---|---|---|---|---|
| 3 | 2 | 0 | 0 | 3 | 4 | 2 | 0 | 0 | 3 | 4 | 2 | 0 | 0 | 3 | 4 | 2 | 0 | 0 | 3 |
| 0 | 2 | 3 | 2 | 0 | 0 | 2 | 3 | 2 | 0 | 0 | 2 | 3 | 2 | 0 | 0 | 2 | 3 | 2 | 0 |
| 0 | 0 | 0 | 2 | 3 | 2 | 0 | 0 | 2 | 3 | 2 | 0 | 0 | 2 | 3 | 2 | 0 | 0 | 2 | 3 |
| 0 | 1 | 2 | 0 | 0 | 2 | 3 | 2 | 0 | 0 | 2 | 3 | 2 | 0 | 0 | 2 | 3 | 2 | 0 | 0 |
| 0 | 0 | 0 | 3 | 2 | 0 | 0 | 2 | 3 | 2 | 0 | 0 | 2 | 3 | 2 | 0 | 0 | 2 | 3 | 2 |
| 0 | 0 | 0 | 0 | 0 | 3 | 2 | 0 | 0 | 2 | 3 | 2 | 0 | 0 | 2 | 3 | 2 | 0 | 0 | 2 |
| 0 | 0 | 0 | 0 | 0 | 0 | 1 | 3 | 2 | 0 | 0 | 2 | 3 | 2 | 0 | 0 | 2 | 3 | 2 | 0 |
| 0 | 0 | 0 | 0 | 0 | 0 | 0 | 0 | 2 | 3 | 2 | 0 | 0 | 2 | 3 | 2 | 0 | 0 | 2 | 3 |
| 0 | 0 | 0 | 0 | 0 | 0 | 0 | 0 | 0 | 0 | 2 | 3 | 2 | 0 | 0 | 2 | 3 | 2 | 0 | 0 |
| 0 | 0 | 0 | 0 | 0 | 0 | 0 | 0 | 0 | 0 | 0 | 0 | 2 | 3 | 2 | 0 | 0 | 2 | 3 | 2 |
| 0 | 0 | 0 | 0 | 0 | 0 | 0 | 0 | 0 | 0 | 1 | 2 | 0 | 0 | 2 | 3 | 2 | 0 | 0 | 2 |
| 0 | 0 | 0 | 0 | 0 | 0 | 0 | 0 | 0 | 0 | 0 | 0 | 0 | 2 | 0 | 0 | 2 | 3 | 2 | 0 |
| 0 | 0 | 0 | 0 | 0 | 0 | 0 | 0 | 0 | 0 | 0 | 0 | 0 | 0 | 3 | 2 | 0 | 0 | 2 | 3 |
| 0 | 0 | 0 | 0 | 0 | 0 | 0 | 0 | 0 | 0 | 0 | 0 | 0 | 0 | 0 | 1 | 2 | 2 | 0 | 0 |
| 0 | 0 | 0 | 0 | 0 | 0 | 0 | 0 | 0 | 0 | 0 | 0 | 0 | 0 | 0 | 0 | 0 | 1 | 3 | 2 |
P10 P11
F I G. 32B
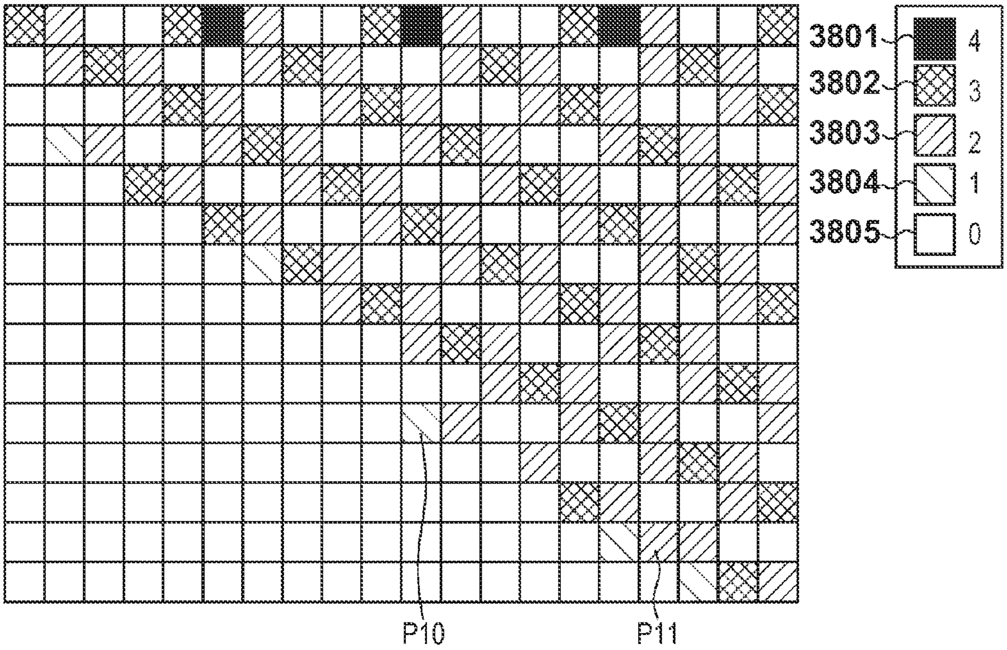

F I G. 37A
| | | | | | | | | | | | | | | | | | | | |
|---|---|---|---|---|---|---|---|---|---|---|---|---|---|---|---|---|---|---|---|
| 0 | 0 | 0 | 0 | 0 | 0 | 0 | 0 | -16 | 18 | 23 | -11 | -8 | 0 | 0 | 0 | 0 | 0 | 0 | 0 |
| 0 | 0 | 0 | 0 | 0 | 0 | 0 | 0 | -16 | -19 | -2 | -11 | -8 | 0 | 0 | 0 | 0 | 0 | 0 | 0 |
| 0 | 0 | 0 | 0 | 0 | 0 | 0 | -8 | 1 | -2 | -2 | 9 | 0 | 0 | 0 | 0 | 0 | 0 | 0 | 0 |
| 0 | 0 | 0 | 0 | 0 | 0 | 0 | -16 | -19 | -2 | -19 | -16 | 0 | 0 | 0 | 0 | 0 | 0 | 0 | 0 |
| 0 | 0 | 0 | 0 | 0 | 0 | -8 | 1 | -2 | -2 | 1 | -8 | 0 | 0 | 0 | 0 | 0 | 0 | 0 | 0 |
| 0 | 0 | 0 | 0 | 0 | 0 | -16 | -16 | -2 | -19 | -16 | 0 | 0 | 0 | 0 | 0 | 0 | 0 | 0 | 0 |
| 0 | 0 | 0 | 0 | 0 | 0 | 1 | -2 | -2 | 1 | -8 | 0 | 0 | 0 | 0 | 0 | 0 | 0 | 0 | 0 |
| 0 | 0 | 0 | 0 | 0 | -8 | -11 | -2 | -19 | -16 | 0 | 0 | 0 | 0 | 0 | 0 | 0 | 0 | 0 | 0 |
| 0 | 0 | 0 | 0 | 0 | 9 | 5 | -2 | 1 | -8 | 0 | 0 | 0 | 0 | 0 | 0 | 0 | 0 | 0 | 0 |
| 0 | 0 | 0 | 0 | -8 | -11 | -2 | -2 | -16 | 0 | 0 | 0 | 0 | 0 | 0 | 0 | 0 | 0 | 0 | 0 |
| 0 | 0 | 0 | 0 | 9 | 5 | -2 | 18 | 9 | 0 | 0 | 0 | 0 | 0 | 0 | 0 | 0 | 0 | 0 | 0 |
| 0 | 0 | 0 | 0 | -11 | -2 | -2 | 1 | 17 | 0 | 0 | 0 | 0 | 0 | 0 | 0 | 0 | 0 | 0 | 0 |
| 0 | 0 | 0 | 17 | 13 | -2 | 18 | 9 | 0 | 0 | 0 | 0 | 0 | 0 | 0 | 0 | 0 | 0 | 0 | 0 |
| 0 | 0 | 0 | -3 | 5 | -2 | 1 | 17 | 0 | 0 | 0 | 0 | 0 | 0 | 0 | 0 | 0 | 0 | 0 | 0 |
| 0 | 0 | 0 | 13 | 23 | 10 | 9 | 0 | 0 | 0 | 0 | 0 | 0 | 0 | 0 | 0 | 0 | 0 | 0 | 0 |
F I G. 37B
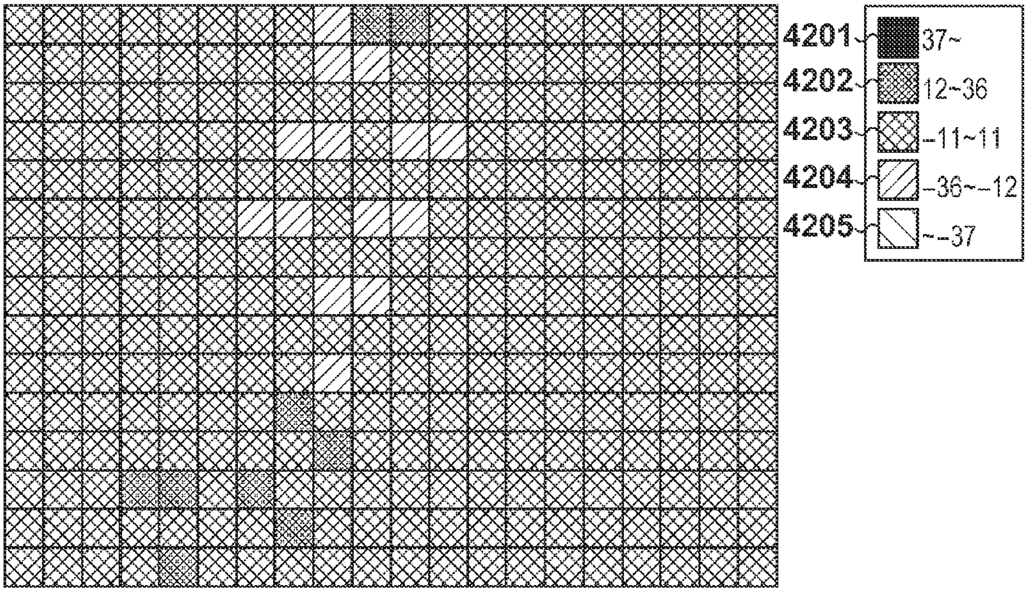

FIG. 38A
| | | | | | | | | | | | | | | | | | | | |
|---|---|---|---|---|---|---|---|---|---|---|---|---|---|---|---|---|---|---|---|
| 0 | 0 | 0 | 0 | 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 | 0 | 0 | 0 | 0 | 0 |
FIG. 38B
| | | | | | | | | | | | | | | | | | | | |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | -1 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | -1 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | -1 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | -1 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
FIG. 38C
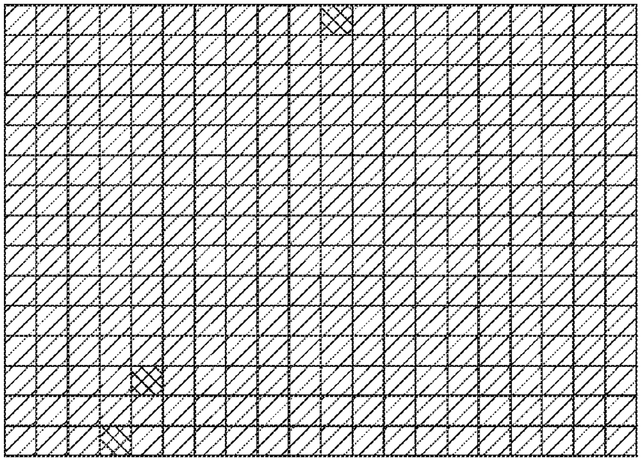
FIG. 38D
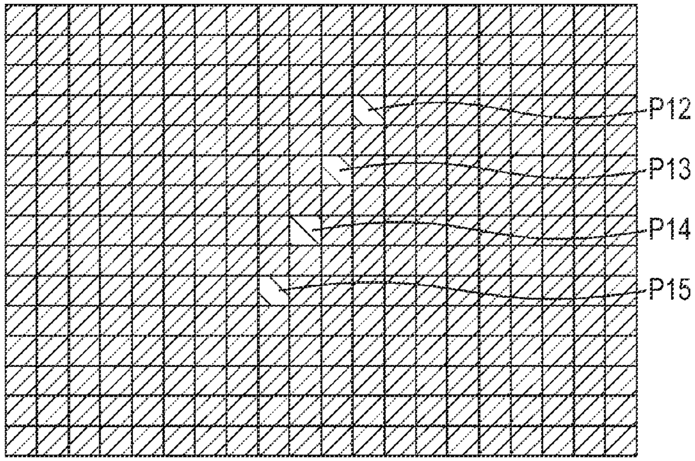
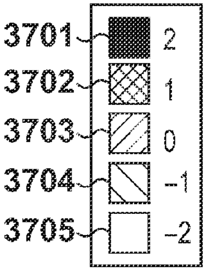

| | | | | | | | | | | | | | | | | | | | |
|---|---|---|---|---|---|---|---|---|---|---|---|---|---|---|---|---|---|---|---|
| 0 | 0 | 0 | 0 | 0 | 0 | 0 | 0 | 0 | 2 | 4 | 2 | 0 | 0 | 0 | 0 | 0 | 0 | 0 | 0 |
| 0 | 0 | 0 | 0 | 0 | 0 | 0 | 0 | 2 | 0 | 0 | 0 | 0 | 0 | 0 | 0 | 0 | 0 | 0 | 0 |
| 0 | 0 | 0 | 0 | 0 | 0 | 0 | 0 | 2 | 3 | 2 | 0 | 0 | 0 | 0 | 0 | 0 | 0 | 0 | 0 |
| 0 | 0 | 0 | 0 | 0 | 0 | 0 | 2 | 0 | 0 | 2 | −1 | 0 | 0 | 0 | 0 | 0 | 0 | 0 | 0 |
| 0 | 0 | 0 | 0 | 0 | 0 | 0 | 2 | 3 | 2 | 0 | 0 | 0 | 0 | 0 | 0 | 0 | 0 | 0 | 0 |
| 0 | 0 | 0 | 0 | 0 | 0 | 2 | 0 | 0 | 2 | −1 | 0 | 0 | 0 | 0 | 0 | 0 | 0 | 0 | 0 |
| 0 | 0 | 0 | 0 | 0 | 0 | 2 | 3 | 2 | 0 | 0 | 0 | 0 | 0 | 0 | 0 | 0 | 0 | 0 | 0 |
| 0 | 0 | 0 | 0 | 0 | 0 | 0 | 0 | 2 | −1 | 0 | 0 | 0 | 0 | 0 | 0 | 0 | 0 | 0 | 0 |
| 0 | 0 | 0 | 0 | 0 | 2 | 3 | 2 | 0 | 0 | 0 | 0 | 0 | 0 | 0 | 0 | 0 | 0 | 0 | 0 |
| 0 | 0 | 0 | 0 | 0 | 0 | 0 | 2 | −1 | 0 | 0 | 0 | 0 | 0 | 0 | 0 | 0 | 0 | 0 | 0 |
| 0 | 0 | 0 | 0 | 2 | 3 | 2 | 0 | 0 | 0 | 0 | 0 | 0 | 0 | 0 | 0 | 0 | 0 | 0 | 0 |
| 0 | 0 | 0 | 0 | 0 | 0 | 2 | 0 | 0 | 0 | 0 | 0 | 0 | 0 | 0 | 0 | 0 | 0 | 0 | 0 |
| 0 | 0 | 0 | 0 | 4 | 2 | 0 | 0 | 0 | 0 | 0 | 0 | 0 | 0 | 0 | 0 | 0 | 0 | 0 | 0 |
| 0 | 0 | 0 | 0 | 0 | 2 | 0 | 0 | 0 | 0 | 0 | 0 | 0 | 0 | 0 | 0 | 0 | 0 | 0 | 0 |
| 0 | 0 | 0 | 4 | 2 | 0 | 0 | 0 | 0 | 0 | 0 | 0 | 0 | 0 | 0 | 0 | 0 | 0 | 0 | 0 |

ROW/COLUMN NUMBER CONVERSION TABLE

| | ROW NUMBER | COLUMN NUMBER |
|---|---|---|
| SECOND THRESHOLD READOUT UNIT | 0 | 0 |
| THIRD THRESHOLD READOUT UNIT | 0 | 4 |

4100

FIG. 42A
| | | | | | | | | | | | | | | | | | | | |
|---|---|---|---|---|---|---|---|---|---|---|---|---|---|---|---|---|---|---|---|
| 0 | 0 | 0 | 0 | 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 | 0 | 0 | 0 | 0 | 0 |
FIG. 42B
| | | | | | | | | | | | | | | | | | | | |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | -1 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | -1 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | -1 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
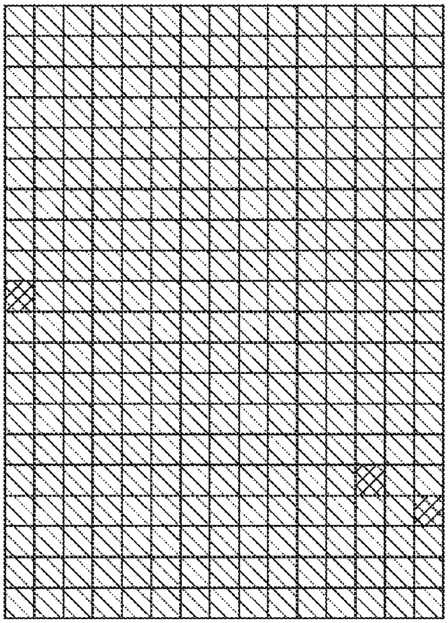
FIG. 42C
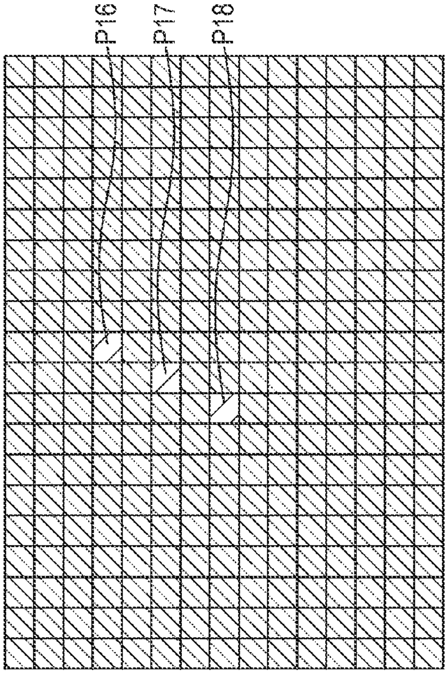
FIG. 42D
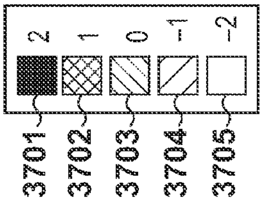

P16

| | | | | | | | | | | | | | | | | | | | |
|---|---|---|---|---|---|---|---|---|---|---|---|---|---|---|---|---|---|---|---|
| 0 | 0 | 0 | 0 | 0 | 0 | 0 | 0 | 0 | 2 | 4 | 2 | 0 | 0 | 0 | 0 | 0 | 0 | 0 | 0 |
| 0 | 0 | 0 | 0 | 0 | 0 | 0 | 0 | 2 | 0 | 0 | 0 | 0 | 0 | 0 | 0 | 0 | 0 | 0 | 0 |
| 0 | 0 | 0 | 0 | 0 | 0 | 0 | 0 | 2 | 3 | 2 | 0 | 0 | 0 | 0 | 0 | 0 | 0 | 0 | 0 |
| 0 | 0 | 0 | 0 | 0 | 0 | 0 | 2 | 0 | 0 | 1 | 0 | 0 | 0 | 0 | 0 | 0 | 0 | 0 | 0 |
| 0 | 0 | 0 | 0 | 0 | 0 | 0 | 2 | 3 | 2 | 0 | 0 | 0 | 0 | 0 | 0 | 0 | 0 | 0 | 0 |
| 0 | 0 | 0 | 0 | 0 | 0 | 2 | 0 | 0 | 1 | 0 | 0 | 0 | 0 | 0 | 0 | 0 | 0 | 0 | 0 |
| 0 | 0 | 0 | 0 | 0 | 0 | 2 | 3 | 2 | 0 | 0 | 0 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 0 | 0 | 0 | 0 | 0 | 0 |
| 0 | 0 | 0 | 0 | 0 | 2 | 3 | 2 | 0 | 0 | 0 | 0 | 0 | 0 | 0 | 0 | 0 | 0 | 0 | 0 |
| 0 | 0 | 0 | 0 | 0 | 0 | 0 | 2 | 0 | 0 | 0 | 0 | 0 | 0 | 0 | 0 | 0 | 0 | 0 | 0 |
| 0 | 0 | 0 | 0 | 2 | 3 | 2 | 0 | 0 | 0 | 0 | 0 | 0 | 0 | 0 | 0 | 0 | 0 | 0 | 0 |
| 0 | 0 | 0 | 0 | 0 | 0 | 2 | 0 | 0 | 0 | 0 | 0 | 0 | 0 | 0 | 0 | 0 | 0 | 0 | 0 |
| 0 | 0 | 0 | 0 | 4 | 2 | 0 | 0 | 0 | 0 | 0 | 0 | 0 | 0 | 0 | 0 | 0 | 0 | 0 | 0 |
| 0 | 0 | 0 | 0 | 0 | 2 | 0 | 0 | 0 | 0 | 0 | 0 | 0 | 0 | 0 | 0 | 0 | 0 | 0 | 0 |
| 0 | 0 | 0 | 4 | 2 | 0 | 0 | 0 | 0 | 0 | 0 | 0 | 0 | 0 | 0 | 0 | 0 | 0 | 0 | 0 |

P17

P18

IMAGE PROCESSING USING HALFTONE IMAGE DATA

BACKGROUND OF THE INVENTION

1. Field of the Invention

The present invention relates to an image processing apparatus and storage medium.

2. Description of the Related Art

Recently, it is a common practice to print an image on a recording material based on image data processed by a personal computer (PC), or display it on a display device. In print processing or display processing, when the number of gradations per pixel is compared before and after printing or display, the number of gradations expressible by the printing apparatus or display device is sometimes smaller than that of gradations expressing image data on the PC. Hence, when outputting image data to the printing apparatus or display device, halftone processing is often performed to convert image data of a large number of gradations into image data of a small number of gradations. However, halftone processing sometimes generates a jaggy at an edge portion contained in an image or disconnects a thin line, degrading the quality of a printed or displayed image.

As an example of halftone processing, there is known an ordered dither method of determining an output value (quantized value) by comparing a cyclically repeating threshold and an input value. It is known that when an input image contains a spatial frequency component close to a spatial frequency corresponding to the cycle of a threshold, the ordered dither method generates a moire corresponding to the difference from the spatial frequency of the threshold. At a portion containing a high spatial frequency component, such as a halftone character portion or the edge portion of a thin line, a quantization error is thus generated between an input image and an output image under the influence of quantization in halftone processing, decreasing the resolution of the appearance of the output image. This results in the jaggy of a character, line disconnection, or the like, degrading the image quality to obscure the contour of the character or the like.

As a technique for suppressing degradation of the image quality, for example, techniques in Japanese Patent Laid-Open Nos. 9-238259 and 2001-86355 have been proposed. Japanese Patent Laid-Open No. 9-238259 discloses a technique of detecting a moire component from the difference between input image data and image data having undergone halftone processing, and suppressing the detected moire component. In Japanese Patent Laid-Open No. 9-238259, difference data between input image data and image data having undergone halftone processing is obtained. Filter processing using a bandpass filter is performed for the obtained difference data, extracting a moire component. In accordance with the extracted moire component, the input image and the low frequency component signal of the input image are combined. Halftone processing is performed again for the obtained data, suppressing the moire component.

Japanese Patent Laid-Open No. 2001-86355 discloses a technique of detecting a moire component by performing filter processing based on visual characteristics for image data having undergone halftone processing. In Japanese Patent Laid-Open No. 2001-86355, filter processing based on visual characteristics is performed for each image data having undergone halftone processing, and image data obtained by shifting the phase of input image data by half and then performing halftone processing. After that, the difference between the obtained data is evaluated.

In some cases, an image or the like printed on a recording material based on image data having undergone halftone processing is copied. In other cases, an image is printed on a recording material by processing image data input by reading, by a scanner, an image or the like which is printed on a recording material after halftone processing. In these cases, image data input by reading a printed image by a copying apparatus, scanner, or the like has a lower resolution than that of image data before printing. Hence, it is difficult for the above-mentioned methods to detect only a moire from input image data at high accuracy. To solve this problem, for example, dot detection is executed by pattern detection or the like from input image data, a dot-detected portion is smoothed, and then halftone processing is performed.

However, when detecting dots from image data by pattern detection, patterns for pattern matching need to be prepared in accordance with the Lines Per Inch (LPI) or reading resolution, increasing the processing amount and circuit size. In pattern matching, a detection error or detection omission may occur. In this case, increasing the dot detection accuracy requires complicated processing including processing which refers to pixels in a wide range, isolated point processing, and expansion processing. Further, resolution conversion in smoothing processing decreases the image resolution in pixels containing high frequency components near the edge of an image or the like, degrading the image quality.

As another problem, when input image data contains a frequency component close to the frequency component of a moire component, it is hard for the conventional methods to discriminate a moire component generated by halftone processing from a component contained in the input image data.

SUMMARY OF THE INVENTION

The present invention has been made to solve the above problems. The present invention provides a technique to detect, at high accuracy, degradation of the image quality caused by halftone processing in image data having undergone halftone processing, and prevent the degradation of the image quality.

According to one aspect of the present invention, there is provided an image processing apparatus comprising: a halftone processing unit configured to perform first halftone processing for input image data having a first number of gradations, generating halftone image data having a second number of gradations smaller than the first number of gradations; a calculation unit configured to evaluate a pixel value difference between the input image data and the halftone image data, and calculate quantization error data representing a quantization error generated in the halftone image data owing to the first halftone processing; a generation unit configured to perform second halftone processing for the quantization error data calculated by the calculation unit, generating correction data having the second number of gradations for correcting the quantization error generated by the first halftone processing; and a correction unit configured to correct the halftone image data using the correction data generated by the generation unit.

According to another aspect of the present invention, there is provided an image processing apparatus comprising: a first halftone processing unit configured to perform first halftone processing for input image data having a first number of gradations, generating first halftone image data having a second number of gradations smaller than the first number of gradations; a calculation unit configured to evaluate a difference between the input image data and the first halftone image data, and calculate quantization error data representing a quantization error generated in the first halftone image data owing to the first halftone processing; a correction unit configured to correct the first halftone image data using the quantization error data calculated by the calculation unit as correction data for correcting the quantization error generated by the first halftone processing; and a second halftone processing unit configured to perform second halftone processing for the first halftone image data corrected by the correction unit, generating second halftone image data having the second number of gradations.

According to the present invention, degradation of the image quality caused by halftone processing in image data having undergone halftone processing can be detected at high accuracy, preventing degradation of the image quality.

Further features of the present invention will become apparent from the following description of exemplary embodiments (with reference to the attached drawings).

BRIEF DESCRIPTION OF THE DRAWINGS

FIGS. 8A and 8B are views exemplifying the first halftone image data by the ordered dither method;

FIGS. 10A and 10B are views exemplifying image data having undergone filter processing;

FIGS. 15A and 15B are views exemplifying halftone correction data;

FIGS. 19A to 19D are views exemplifying data obtained by separating the positive components and negative components of quantization error data;

FIGS. 24B and 24C are views exemplifying a halftone table;

FIG. 25A is a block diagram exemplifying the arrangement of a threshold readout unit 3001 according to the fourth embodiment;

FIG. 25B is a flowchart showing a processing sequence to be executed by the threshold readout unit 3001 according to the fourth embodiment;

FIGS. 29A to 29D are views exemplifying data obtained by separating the positive components and negative components of quantization error data according to the fourth embodiment;

FIGS. 32A and 32B are views exemplifying the second halftone image data according to the fourth embodiment;

FIGS. 37A and 37B are views exemplifying quantization error data according to the sixth embodiment;

FIGS. 38A to 38D are views showing the first example of data obtained by quantizing the positive components and negative components of quantization error data according to the sixth embodiment;

FIG. 41 is a view exemplifying a row/column number conversion table according to the sixth embodiment;

FIGS. 42A to 42D are views showing the second example of data obtained by quantizing the positive components and negative components of quantization error data according to the sixth embodiment.

DESCRIPTION OF THE EMBODIMENTS

Figure 1:
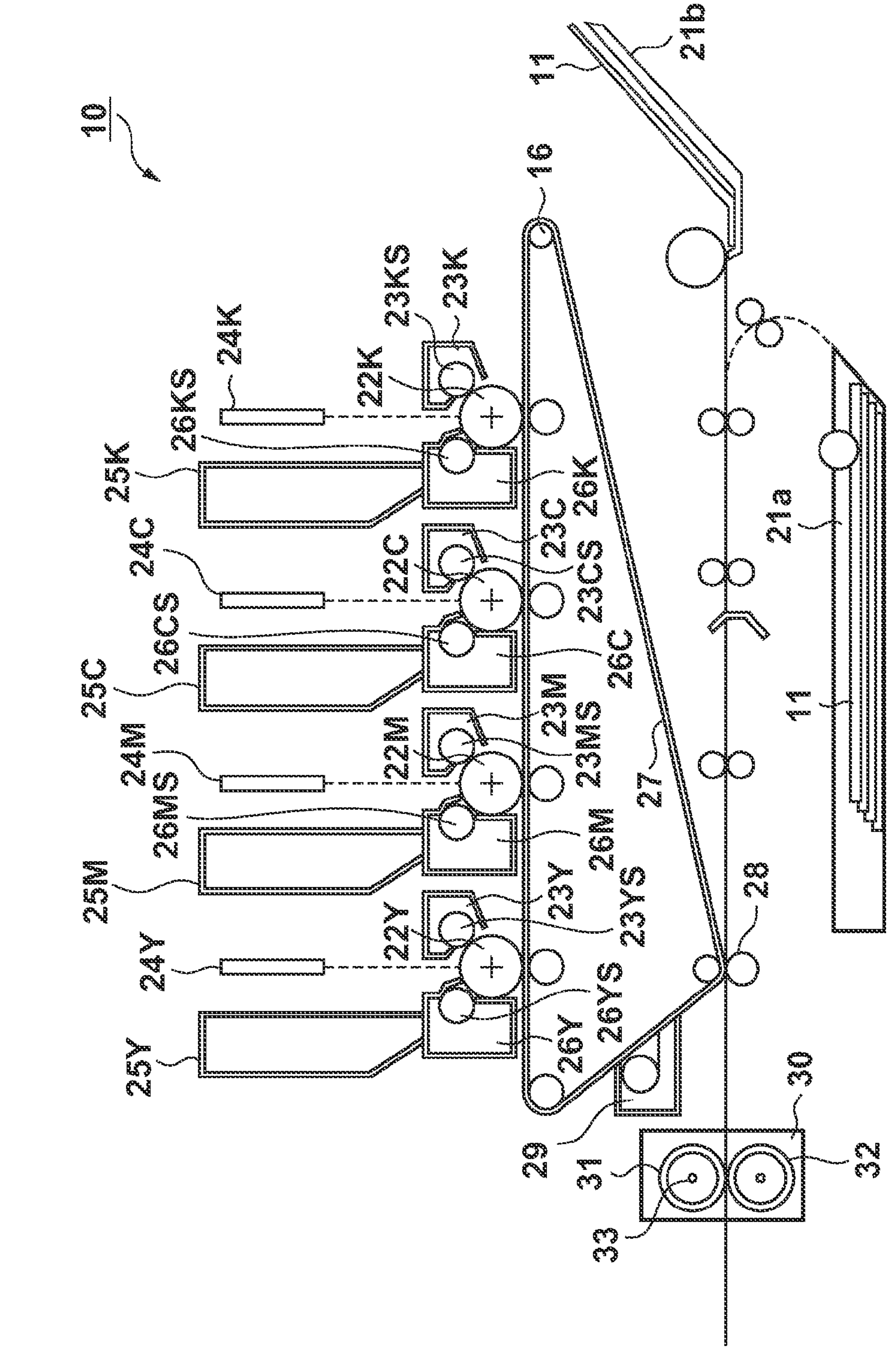
FIG. 1 is a view exemplifying the arrangement of an image forming unit in a printer 10.

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

The first embodiment will be described. In the embodiment, an electrophotographic tandem 4-drum full-color image forming apparatus employing an intermediate transfer belt will be explained as an application example of an image processing apparatus according to the present invention. As will be described below, the present invention can also be practiced by causing a host computer (host PC) to function as the image processing apparatus of the present invention.

<Arrangement of Printer 10>

First, the arrangement of an image forming apparatus (to be simply referred to as a "printer" hereinafter) 10 will be described with reference to FIG. 1. The printer 10 forms a multicolor (multiple-color) image on a recording material (recording medium) using four, yellow (Y), magenta (M), cyan (C), and black (K) color developing materials (toners) as color materials of a plurality of colors for forming an image on a recording material. In the printer 10, electrostatic latent images are respectively formed on the surfaces of photosensitive drums (photosensitive members) 22Y, 22M, 22C, and 22K by exposure based on exposure control signals generated by a pulse width modulation (PWM) processing unit 309 (shown in FIGS. 3A and 3B). These electrostatic latent images are developed using toners of the respective colors, forming mono-color (single-color) toner images on the surfaces of the photosensitive drums (photosensitive members) 22Y, 22M, 22C, and 22K. Finally, these toner images are transferred onto the surface of a recording material to overlap each other, forming a multicolor toner image on the surface of the recording material. An image forming operation to be executed by the printer 10 will be explained in more detail.

The printer 10 includes four image forming stations which form single-color toner images on the corresponding photosensitive drums 22Y, 22M, 22C, and 22K with toners of different colors. The four image forming stations include the photosensitive drums 22Y, 22M, 22C, and 22K, injection chargers 23Y, 23M, 23C, and 23K serving as primary chargers, and exposure units 24Y, 24M, 24C, and 24K, respectively. The four image forming stations further include toner cartridges 25Y, 25M, 25C, and 25K, and developing units 26Y, 26M, 26C, and 26K, respectively. The printer 10 includes an intermediate transfer member (intermediate transfer belt) 27 on which toner images formed on the photosensitive drums 22Y, 22M, 22C, and 22K in the four image forming stations are transferred.

The photosensitive drums 22Y, 22M, 22C, and 22K are rotated by the driving forces of different driving motors (not shown). The injection chargers 23Y, 23M, 23C, and 23K include sleeves 23YS, 23MS, 23CS, and 23KS, respectively, and charge the corresponding photosensitive drums 22Y, 22M, 22C, and 22K. The exposure units 24Y, 24M, 24C, and 24K expose the surfaces of the charged photosensitive drums 22Y, 22M, 22C, and 22K with laser beams, forming electrostatic latent images on the corresponding photosensitive drums. The developing units 26Y, 26M, 26C, and 26K include sleeves 26YS, 26MS, 26CS, and 26KS, respectively. The developing units 26Y, 26M, 26C, and 26K develop the electrostatic latent images on the photosensitive drums 22Y, 22M, 22C, and 22K using toners of the different colors supplied from the toner cartridges 25Y, 25M, 25C, and 25K, respectively. More specifically, the developing units 26Y, 26M, 26C, and 26K visualize the electrostatic latent images on the photosensitive drums 22Y, 22M, 22C, and 22K using Y, M, C, and K toners, respectively, thereby forming toner images of the respective colors on the surfaces of the photosensitive drums.

As shown in FIG. 1, the intermediate transfer member 27 is arranged at a position where it contacts the photosensitive drums 22Y, 22M, 22C, and 22K. In image formation, while rotating the intermediate transfer member 27 by the driving force of a driving roller 16, single-color toner images are sequentially transferred (primary transfer) from the photosensitive drums 22Y, 22M, 22C, and 22K onto the surface of the intermediate transfer member 27 to overlap each other. As a result, a multicolor toner image is formed on the surface of the intermediate transfer member 27. Note that the driving roller 16 is driven by a driving motor (not shown) for the intermediate transfer member 27.

The multicolor toner image formed on the intermediate transfer member 27 is conveyed to a nip between the intermediate transfer member and a transfer roller 28 along with rotation of the intermediate transfer member. In synchronism with the timing when the toner image is conveyed to the nip, a recording material 11 is fed from a paper feed unit 21*a* or 21*b*, and conveyed up to the nip through the conveyance path. At the nip, the transfer roller 28 abuts against the intermediate transfer member 27 via the conveyed recording material 11. While the transfer roller 28 abuts against the intermediate transfer member 27, the multicolor toner image formed on the intermediate transfer member 27 is transferred (secondary transfer) onto the recording material 11. Accordingly, the multicolor toner image is formed on the recording material 11. After the end of secondary transfer from the intermediate transfer member 27 to the recording material 11, the transfer roller 28 moves apart from the intermediate transfer member 27.

The recording material 11 bearing the multicolor toner image is conveyed to a fixing unit 30 through the conveyance path. The fixing unit 30 fuses the toner image on the recording material 11 conveyed through the conveyance path, and fixes it onto the recording material 11. The fixing unit 30 includes a fixing roller 31 for heating the recording material 11, and a press roller 32 for pressing the recording material 11 against the fixing roller 31. The fixing roller 31 and press roller 32 are hollow, and the fixing roller 31 incorporates a heater 33. While the fixing roller 31 and press roller 32 convey the recording material 11 bearing the multicolor toner image on its surface, the fixing unit 30 applies heat and pressure to the recording material 11, fixing the toner onto the surface of the recording material 11. After toner fixing, the recording material 11 is discharged to a discharge tray (not shown) by a discharge roller (not shown). Thereafter, the image forming operation on the recording material 11 ends.

A cleaning unit 29 arranged near the intermediate transfer member 27 includes a cleaner vessel. The cleaning unit 29 recovers toner (waste toner) remaining on the intermediate transfer member 27 after secondary transfer of the toner image onto the recording material 11. The cleaning unit 29 stores the recovered waste toner in the cleaner vessel. In this way, the cleaning unit 29 cleans the surface of the intermediate transfer member 27.

Note that the embodiment explains the printer 10 (FIG. 1) including the intermediate transfer member 27. However, the present invention is also applicable to a primary transfer printer which directly transfers toner images formed on the photosensitive drums 22Y, 22M, 22C, and 22K to a recording material. In this case, the intermediate transfer member 27 shown in FIG. 1 is replaced with a conveyance belt. Also, the embodiment adopts different driving systems for the respective photosensitive drums 22Y, 22M, 22C, and 22K. However, a common (single) motor may be used for all the photosensitive drums. The embodiment will be explained by exemplifying color image formation for forming a color image using four, yellow (Y), magenta (M), cyan (C), and black (K) color developing materials. However, the present invention is also applicable to a monochrome image forming apparatus which forms a monochrome image using, for example, one black (K) color developing material.

<System Configurations of Printer 10 and Host PC 210>

Figure 2:
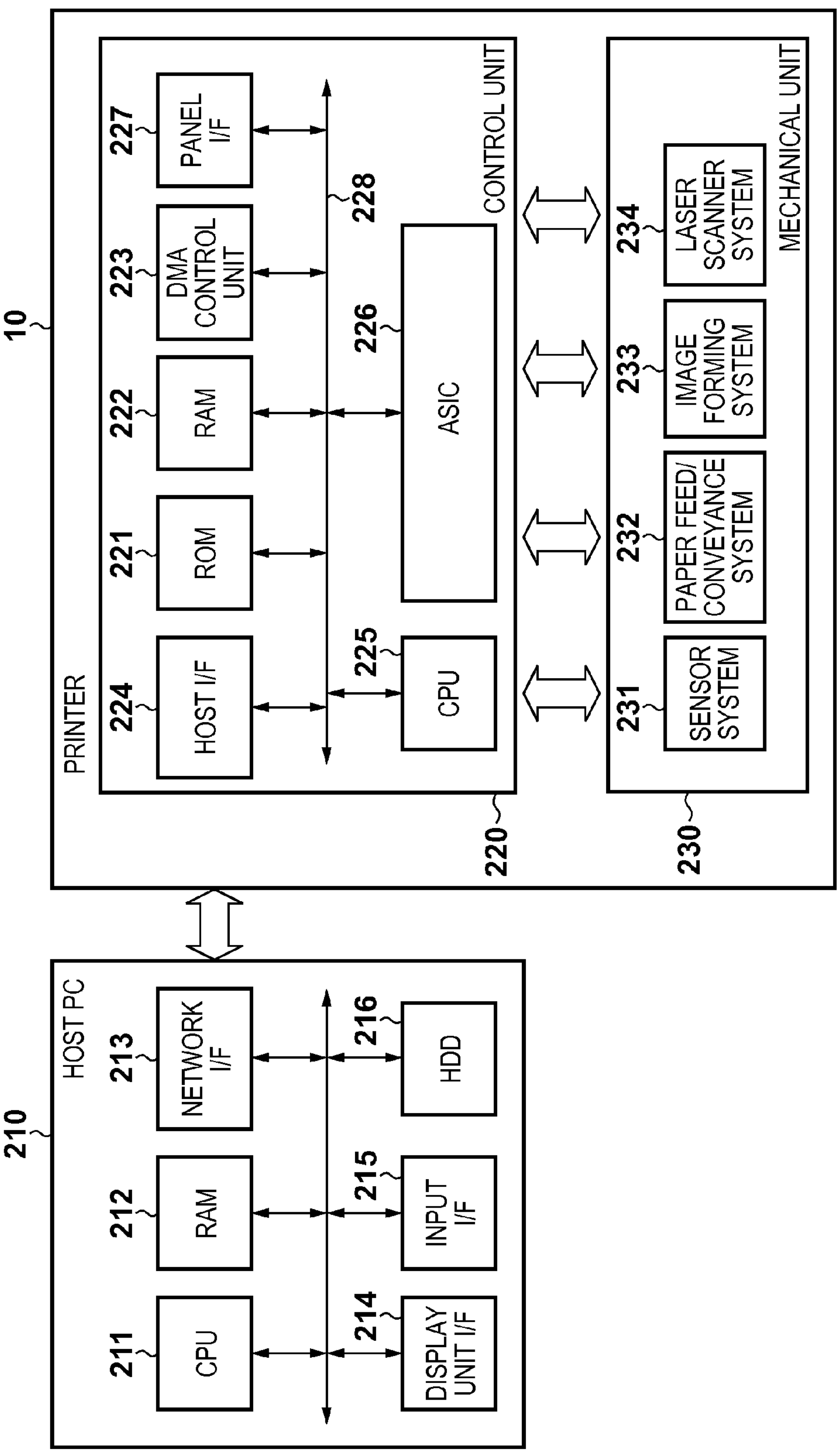
FIG. 2 is a block diagram exemplifying the system configuration of the printer 10.

Next, processing to be executed in image formation will be described with reference to the system configuration of the printer 10 shown in FIG. 2.

(System Configuration of Host PC 210)

A host PC 210 includes at least a CPU 211, a RAM 212, a network interface (I/F) 213, a display unit I/F 214, an input I/F 215, and a hard disk drive (HDD) 216 serving as an example of a nonvolatile storage device. The CPU 211 uses the RAM 212 as a main memory and work area. The CPU 211 reads out, to the RAM 212, various control programs stored in the HDD 216, and executes them to control the overall operation of the host PC 210. The HDD 216 also stores various applications and a printer driver, and the CPU 211 can read them into the RAM 212 and execute them. The network I/F 213 is connected to a network such as a LAN, and the host PC 210 is connected to the printer 10 via the network. Note that the host PC 210 may be directly connected to the printer 10 by another connection method such as USB connection without the mediacy of the network.

The host PC 210 transmits PDL (Page Description Language) job data to the printer 10 via the network I/F 213 using the application and printer driver. The PDL job data (print job data) includes drawing data serving as image data of an image to be formed, and control data for controlling an image forming operation using the drawing data. The display unit I/F 214 is an interface for presenting various displays on a display unit (not shown) such as a liquid crystal display. The input I/F 215 is an interface for accepting an input from an input device such as a keyboard or mouse.

(System Configuration of Printer 10)

The printer 10 roughly includes a control unit 220 and mechanical unit 230. The mechanical unit 230 operates in accordance with various instructions from the control unit 220. The mechanical unit 230 includes a sensor system 231, paper feed/conveyance system 232, image forming system 233, and laser scanner system 234. The laser scanner system 234 is formed from the exposure units 24Y, 24M, 24C, and 24K, and includes a laser emitting element, laser driver circuit, scanner motor, rotary polygon mirror, and scanner driver. The laser scanner system 234 exposes and scans the photosensitive drums 22Y, 22M, 22C, and 22K with laser beams in accordance with drawing data received from an ASIC 226, forming electrostatic latent images on the respective photosensitive drums.

The image forming system 233 forms toner images on a recording medium based on the electrostatic latent images which are formed on the photosensitive drums 22Y, 22M, 22C, and 22K by the laser scanner system 234. The image forming system 233 includes process elements such as the toner cartridges 25Y, 25M, 25C, and 25K, the intermediate transfer member 27, and the fixing unit 30, and a high-voltage power supply circuit which generates various biases (high voltages) in image formation. The image forming system 233 further includes a charge remover, the injection chargers 23Y, 23M, 23C, and 23K, the developing units 26Y, 26M, 26C, and 26K, and the photosensitive drums 22Y, 22M, 22C, and 22K. The paper feed/conveyance system 232 includes various conveyance system motors, the paper feed units 21_a_ and 21_b_, the discharge tray, and various conveyance rollers. The paper feed/conveyance system 232 feeds and conveys a recording material.

The sensor system 231 comprises a sensor group including a plurality of sensors. The sensors in the sensor group are used to collect information necessary to control the laser scanner system 234, image forming system 233, and paper feed/conveyance system 232 by a CPU 225 and the ASIC 226. The sensor group includes, for example, a temperature sensor for the fixing unit 30, a remaining toner amount detection sensor, a density sensor for detecting an image density, a paper size sensor for detecting a paper size, a paper leading end detection sensor for detecting the leading end of a recording medium, and a paper conveyance detection sensor. Pieces of information detected by these sensors are sent to the CPU 225, and used for print sequence control by the CPU 225. Note that these sensors may be arranged not in the sensor system 231 but in any one of the laser scanner system 234, image forming system 233, and paper feed/conveyance system 232.

The control unit 220 controls the mechanical unit 230. In the control unit 220, the CPU 225 uses a RAM 222 as a main memory and work area. The CPU 225 reads various control programs stored in a ROM 221 into the RAM 222, and executes them to control the mechanical unit 230. A system bus 228 includes an address bus and data bus. Building components in the control unit 220 are connected to the system bus 228, and can access each other via the system bus 228.

A host interface (I/F) 224 is an interface for exchanging data such as drawing data and control data with the host PC 210. Drawing data received as compressed data by the host I/F 224 is stored in the RAM 222. The CPU 225 decompresses the compressed data received by the host I/F 224 into drawing data, and stores the drawing data in the RAM 222. A DMA control unit 223 transfers the drawing data in the RAM 222 to the ASIC 226 in accordance with an instruction from the CPU 225. A panel I/F 227 functions as an interface for receiving, from a display panel arranged on the printer main body, settings and instructions which are input by the user using the display panel. The panel I/F 227 also functions as an interface for transmitting, to the display panel, data for displaying an operation screen or the like on the display device of the display panel. Note that the display panel includes a display device such as a liquid crystal display, hard keys, and an input device such as a touch panel arranged on the display device.

The CPU 225 and ASIC 226 drive the laser scanner system 234 in the mechanical unit 230 based on control data and drawing data input via the host I/F 224. The CPU 225 executes various print sequences by controlling the paper feed/conveyance system 232 and image forming system 233.

The CPU 225 drives the sensor system 231 to obtain sensor information necessary to control the paper feed/conveyance system 232 and image forming system 233.

When executing various print sequences, the ASIC 226 performs high-voltage power supply control in accordance with an instruction from the CPU 225 for the control bias, development bias, and the like of motors arranged in the mechanical unit 230. Further, the ASIC 226 performs color conversion processing, gamma correction processing, halftone processing, quantization error calculation processing, quantization error correction processing, PWM processing, and the like, which will be described later. Note that the ASIC 226 may execute some or all functions of the CPU 225. Alternatively, the CPU 225 may execute some or all functions of the ASIC 226. Another dedicated hardware may be arranged in the printer 10 to execute some functions of the CPU 225 and ASIC 226.

<Processes in Printer 10 and Host PC 210>

Figure 3A:
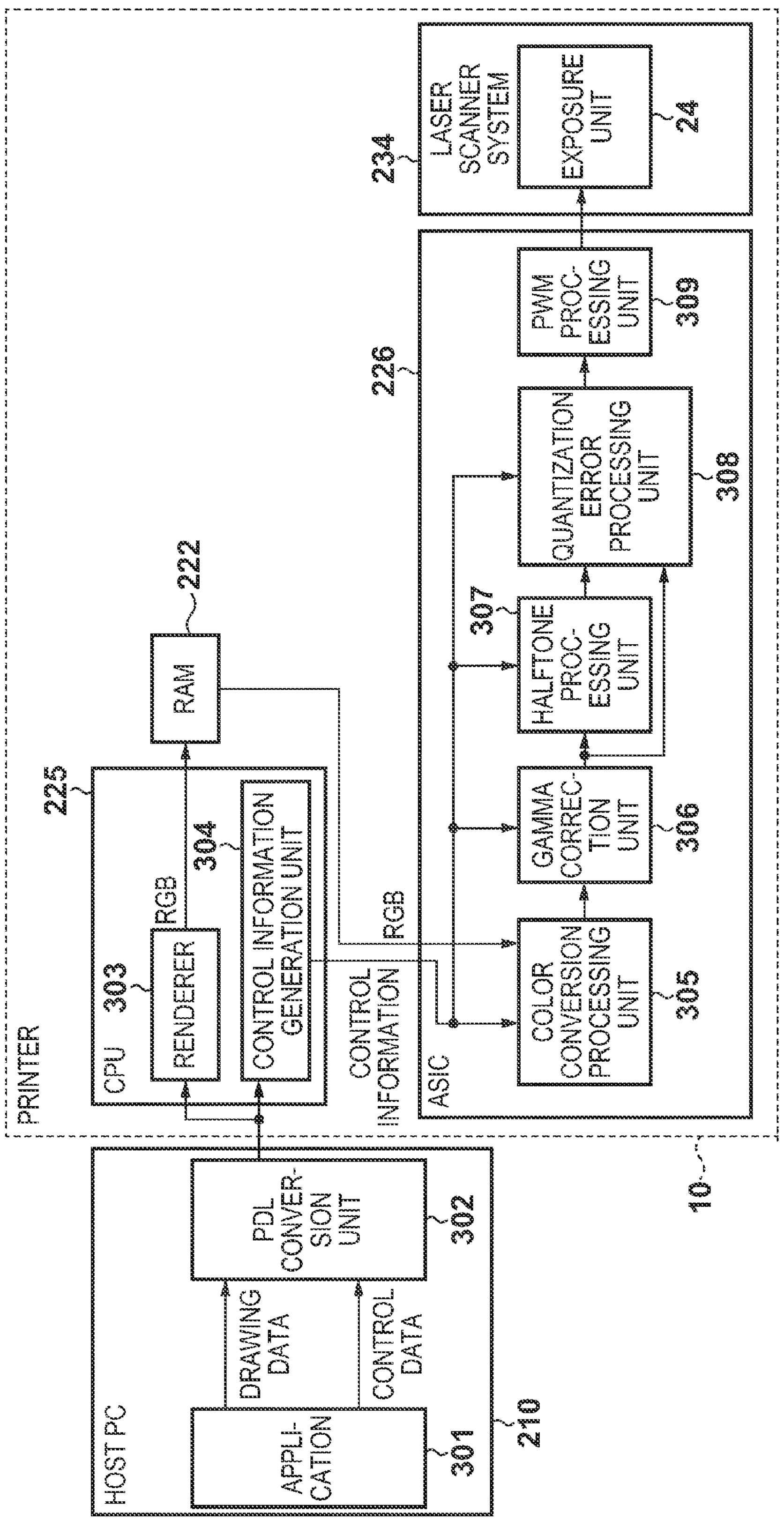
FIGS. 3A and 3B are block diagrams exemplifying the system configurations of a host PC and the printer 10.

Processes to be executed by the host PC 210 and the CPU 225, ASIC 226, and laser scanner system 234 in the printer 10 will be explained with reference to FIG. 3A.

An application 301 running in the host PC 210, such as document creation software or graphics drawing software, generates drawing data and control data for printing, and transmits the generated data to a PDL conversion unit 302 on the printer driver. The drawing data is, for example, data containing the pixel value (also called "gradation value") and attribute information of an image to be printed. The attribute information is information for identifying an image type (text data, graphics data, or image data). The control data is, for example, data containing the size setting of a recording material used in printing, and the copy count. The PDL conversion unit 302 converts the drawing data into compressed data, generates PDL data including the converted data and control data, and transmits the generated PDL data to the printer 10.

The CPU 225 of the printer 10 receives, via the host I/F 224, the PDL data transmitted from the host PC 210. The CPU 225 performs predetermined processing for the received PDL data based on the functions of a renderer 303 and control information generation unit 304, and temporarily stores the processed data in the RAM 222. The CPU 225 implements the functions of the renderer 303 and control information generation unit 304 by executing control programs.

More specifically, the renderer 303 decompresses the compressed data contained in the received PDL data into drawing data, and stores the drawing data in the RAM 222. In the embodiment, a gradation value in the drawing data is RGB data expressed in the RGB color space. The drawing data stored in the RAM 222 is transmitted to the ASIC 226 under the control of the DMA control unit 223. The control information generation unit 304 generates control information to be used in the ASIC 226 from the control data contained in the received PDL data. The control information generation unit 304 transmits the generated control information to the ASIC 226. In addition, the control information generation unit 304 extracts, from the ROM 221, another control information necessary for processing to be executed by the ASIC 226, and transmits it to the ASIC 226 together with the control information generated from the control data contained in the PDL data. Note that the control information stored in the ROM 221 includes, for example, a color conversion table, gamma correction table, halftone table, and filter table.

The control information received by the ASIC 226 is supplied to a color conversion processing unit 305, gamma correction unit 306, halftone processing unit 307, and quantization error processing unit 308. The drawing data (gradation values R, G, and B expressed in the RGB color space) received by the ASIC 226 is supplied as an input signal to the color conversion processing unit 305. The color conversion processing unit 305 converts the input gradation values R, G, and B serving as the input signal into gradation values $C_1$, $M_1$, $Y_1$, and $K_1$ expressed in the CMYK color space. Then, the color conversion processing unit 305 outputs the converted gradation values $C_1$, $M_1$, $Y_1$, and $K_1$ to the gamma correction unit 306.

The gamma correction unit 306 generates gradation values $C_2$, $M_2$, $Y_2$, and $K_2$ by correcting the gradation-density characteristics of the gradation values $C_1$, $M_1$, $Y_1$, and $K_1$ using the gamma correction table which is contained in the control information and used to correct the gradation-density characteristic of a printer. The gamma correction unit 306 outputs the generated gradation values $C_2$, $M_2$, $Y_2$, and $K_2$ to the halftone processing unit 307 and quantization error processing unit 308.

The halftone processing unit 307 converts the gradation values $C_2$, $M_2$, $Y_2$, and $K_2$ into gradation values $C_3$, $M_3$, $Y_3$, and $K_3$ after halftone processing by performing halftone processing based on dither processing (ordered dither processing) to be described later using a halftone table contained in the control information. The halftone processing unit 307 then outputs the gradation values $C_3$, $M_3$, $Y_3$, and $K_3$ after halftone processing to the quantization error processing unit 308.

The quantization error processing unit 308 performs quantization error calculation processing and quantization error correction processing using the filter table contained in the control information for data input from the gamma correction unit 306 and halftone processing unit 307, which will be described later. The quantization error processing unit 308 generates quantization error-corrected gradation values $C_4$, $M_4$, $Y_4$, and $K_4$ from the gradation values $C_2$, $M_2$, $Y_2$, and $K_2$ input from the gamma correction unit 306 and the gradation values $C_3$, $M_3$, $Y_3$, and $K_3$ input from the halftone processing unit 307. The quantization error processing unit 308 outputs the generated gradation values $C_4$, $M_4$, $Y_4$, and $K_4$ to the PWM processing unit 309.

The PWM processing unit 309 converts the input gradation values $C_4$, $M_4$, $Y_4$, and $K_4$ into exposure control signals $T_c$, $T_m$, $T_y$, and $T_k$ for controlling exposure by the laser emitting elements of the exposure units 24Y, 24M, 24C, and 24K. The exposure control signal corresponds to a laser emission width per dot, and the PWM processing unit 309 determines the laser emission width in accordance with an input gradation value. The PWM processing unit 309 outputs the determined exposure control signals $T_c$, $T_m$, $T_y$, and $T_k$ as exposure image data (PWM data) to the exposure units 24Y, 24M, 24C, and 24K. The exposure units 24Y, 24M, 24C, and 24K cause the corresponding laser emitting elements to emit beams in accordance with the exposure control signals $T_c$, $T_m$, $T_y$, and $T_k$.

Note that gradation values in the RGB color space and CMYK color space are expressible by an arbitrary number of bits. For example, to adjust the color reproduction range of the printer 10, the number of bits expressing each gradation value can be increased/decreased. The embodiment will exemplify a gradation value expressed by 8 bits.

Figure 3B:
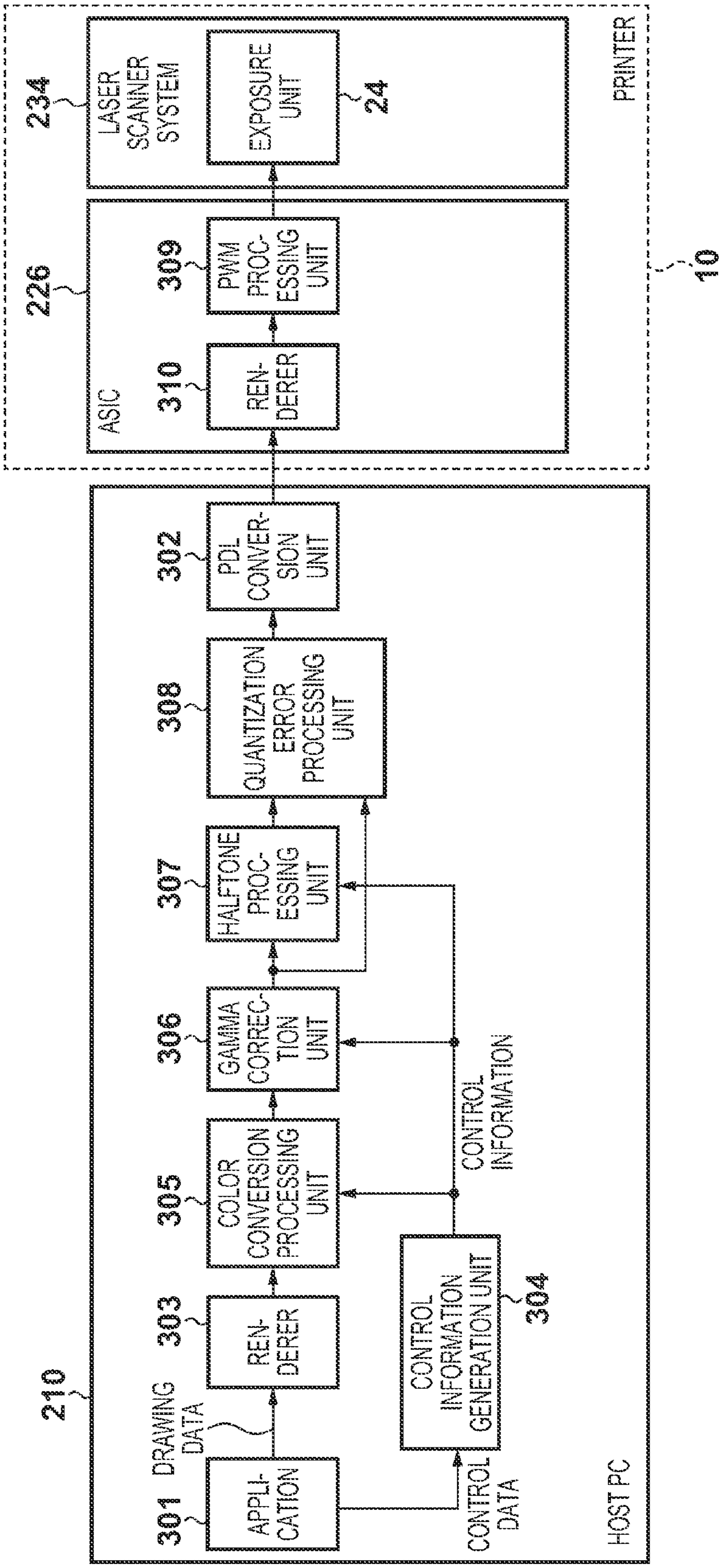

The processing in the ASIC 226 that has been described with reference to FIG. 3A may be implemented in the host PC 210, as shown in FIG. 3B. For example, software for implementing the above-described functions to be executed by the ASIC 226 in FIG. 3A is executed in the host PC 210. In FIG. 3B, the PDL conversion unit 302 has a function of converting the gradation values $C_4$, $M_4$, $Y_4$, and $K_4$ after quantization error correction processing by the quantization error processing unit 308 into PDL data as drawing data. The host PC 210 transmits the PDL data to the printer 10. In the printer 10, a renderer 310 converts the PDL data received from the host PC 210 into the original gradation values $C_4$, $M_4$, $Y_4$, and $K_4$, and outputs them to the PWM processing unit 309.

<Formation of Toner Image in Printer 10>

Figure 4:
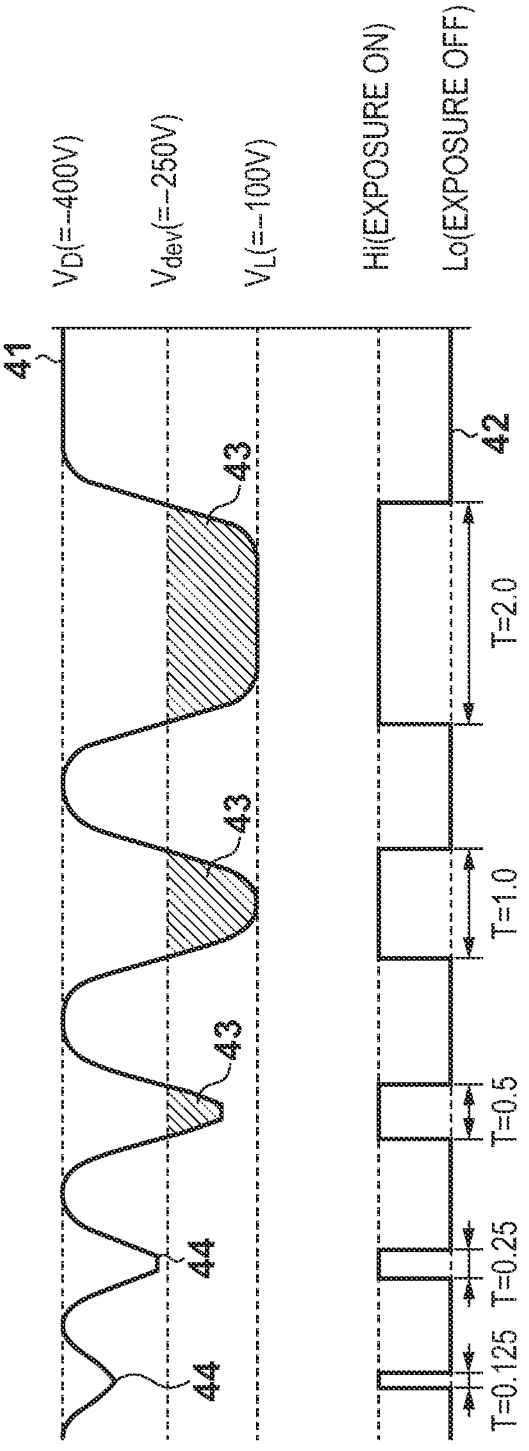
FIG. 4 is a chart showing a state in which a toner image is formed on the surface of a photosensitive drum.

A method of forming toner images using the exposure control signals $T_c$, $T_m$, $T_y$, and $T_k$ in the printer 10 will be explained with reference to FIG. 4. A case in which a K toner image is formed using the exposure unit 24K will be explained here. However, the following description also applies to a case in which C, M, and Y toner images are formed using the exposure units 24C, 24M, and 24Y, respectively. FIG. 4 exemplifies a potential distribution (surface potential 41) after the exposure unit 24K exposes the surface of the photosensitive drum 22K in accordance with the exposure control signal $T_k$ (pulse signal 42), and the exposure control signal $T_k$.

Before the start of exposure by the exposure unit 24K, the injection charger 23K charges the surface of the photosensitive drum 22K to a predetermined potential $V_D$. In this case, $V_D$ is set to −400 V. After charging the photosensitive drum 22K, the PWM processing unit 309 inputs the exposure control signal $T_k$ to the exposure unit 24K. The exposure control signal $T_k$ is a signal for controlling an exposure state by the exposure unit 24K. As shown in FIG. 4, the exposure control signal $T_k$ is represented by the pulse signal 42 which changes between Hi and Lo. When the exposure control signal $T_k$ is Hi, the exposure unit 24K turns on the laser emitting element (causes it to emit a beam) to irradiate the surface of the photosensitive drum 22K with a laser beam. When the exposure control signal $T_k$ is Lo, the exposure unit 24K turns off the laser emitting element. In this fashion, the exposure unit 24K switches the exposure state between the ON state and the OFF state in accordance with the input exposure control signal $T_k$ (pulse signal 42).

On the surface of the photosensitive drum 22K, a region irradiated (exposed) with the laser beam from the exposure unit 24K decreases the absolute value of the surface potential from $V_D$. The change amount of the surface potential by exposure depends on the time (exposure time T) of exposure by the exposure unit 24K. The exposure time T by the exposure unit 24K corresponds to the duration of Hi in the exposure control signal $T_k$. When the surface of the photosensitive drum 22K is exposed for a sufficient time, the surface potential in an exposed region on the surface of the photosensitive drum 22K changes from $V_D$ to $V_L$. In this case, $V_L$ is set to −100 V.

If the absolute value of the surface potential 41 becomes smaller than a development bias $V_{dev}$ on the surface of the photosensitive drum 22K as a result of exposure by the exposure unit 24K, K toner is attached upon development by the developing unit 26K. That is, in the region where the absolute value of the surface potential 41 becomes smaller than the development bias $V_{dev}$, a latent image is developed with toner, forming a toner image. In this case, $V_{dev}$ is set to −250 V. The amount of toner attached to the surface of the photosensitive drum 22K depends on the difference between the surface potential 41 and the development bias $V_{dev}$. As the difference becomes larger, the attached toner amount becomes larger. In FIG. 4, a toner image 43 is an example of a formed toner image, and represents that a toner image is formed with toner of an amount corresponding to the difference between the surface potential 41 and the development bias $V_{dev}$.

FIG. 4 also shows a change of the surface potential 41 of the photosensitive drum 22K depending on exposure corresponding to the exposure time T (duration of Hi in the pulse signal 42) in accordance with the exposure control signal $T_k$. The laser emitting element of the exposure unit 24K emits a laser beam in accordance with the pulse signal 42. Thus, the light power of laser beam irradiating the photosensitive drum 22K corresponds to the pulse signal (that is, the exposure time T). As the light power of laser beam irradiating the photosensitive drum 22K increases, the potential changes in a wider region on the surface of the photosensitive drum 22K.

However, as shown in FIG. 4, the distribution of the surface potential 41 of the photosensitive drum 22K after exposure does not coincide with the light power (corresponding to the pulse signal 42) of laser beam emitted by the exposure unit 24K, but is a distribution obtained by approximating the pulse signal 42 corresponding to the exposure control signal $T_k$ by a Gaussian shape. Owing to this characteristic of the photosensitive drum 22K, even if the surface of the photosensitive drum 22K is irradiated with a laser beam, no toner image may be formed. This problem will be explained in more detail with reference to FIG. 4.

In FIG. 4, T=1.0 corresponds to formation of one dot by a 600-dpi printer. T=0.5, 0.25, 0.125, and 2.0 correspond to formation of 0.5, 0.25, 0.125, and 2.0 dots by this printer. The surface potential of the photosensitive drum 22K changes in correspondence with the respective exposure times T shown in FIG. 4, as represented by the surface potential 41, thereby forming an electrostatic latent image on the surface of the photosensitive drum 22K. At this time, an electrostatic latent image is actually developed upon development by the developing unit 26K, forming a toner image in a region where the absolute value of the surface potential 41 of the photosensitive drum 22K is smaller than the development bias $V_{dev}$, as described above.

In the example shown in FIG. 4, the absolute value of the surface potential 41 becomes smaller than that of the development bias $V_{dev}$ only when the surface of the photosensitive drum 22K is exposed for T=0.5 or more, that is, exposure times T corresponding to 0.5 or more dots. As a result, the toner image 43 is formed in the exposed region. In contrast, when the surface of the photosensitive drum 22K is exposed for T=0.25 or less, that is, exposure times T corresponding to 0.25 or less dots, the absolute value of the surface potential 41 does not become smaller than that of the development bias $V_{dev}$. Hence, an electrostatic latent image (44 in FIG. 4) in the exposed region is not developed, and no toner image is formed in this region, as shown in FIG. 4.

As described above, to form a toner image on the surface of the photosensitive drum 22K, the photosensitive drum 22K needs to be continuously irradiated with a laser beam for a time enough to make the absolute value of the surface potential of the photosensitive drum 22K become smaller than that of the development bias $V_{dev}$. This exposure characteristic of the printer 10 needs to be considered when forming an image based on drawing data (image data) contained in PDL job data.

When a toner image is formed based on image data having undergone halftone processing by the halftone processing unit 307, its quality may degrade due to a quantization error by the halftone processing. To compensate for quality degradation caused by the quantization error, the quantization error processing unit 308 generates correction data based on image data before and after halftone processing, and corrects image data having undergone halftone processing by using the generated correction data. However, the quantization error correction effect using generated correction data may not be satisfactorily obtained depending on the aforementioned exposure characteristic of the printer 10, and no toner image may be appropriately formed on the photosensitive drum 22K, which will be described later.

In the embodiment, to satisfactorily obtain the quantization error correction effect, correction data is generated for input image data having undergone halftone processing. More specifically, the quantization error processing unit 308 evaluates the difference between input image data and input image data having undergone halftone processing, thereby generating quantization error data. The quantization error processing unit 308 performs appropriate halftone processing for the generated data, thereby generating correction data. By using the generated correction data, the quantization error processing unit 308 corrects the input image data having undergone halftone processing.

<Arrangements of Halftone Processing Unit 307 and Quantization Error Processing Unit 308>

Figure 5:
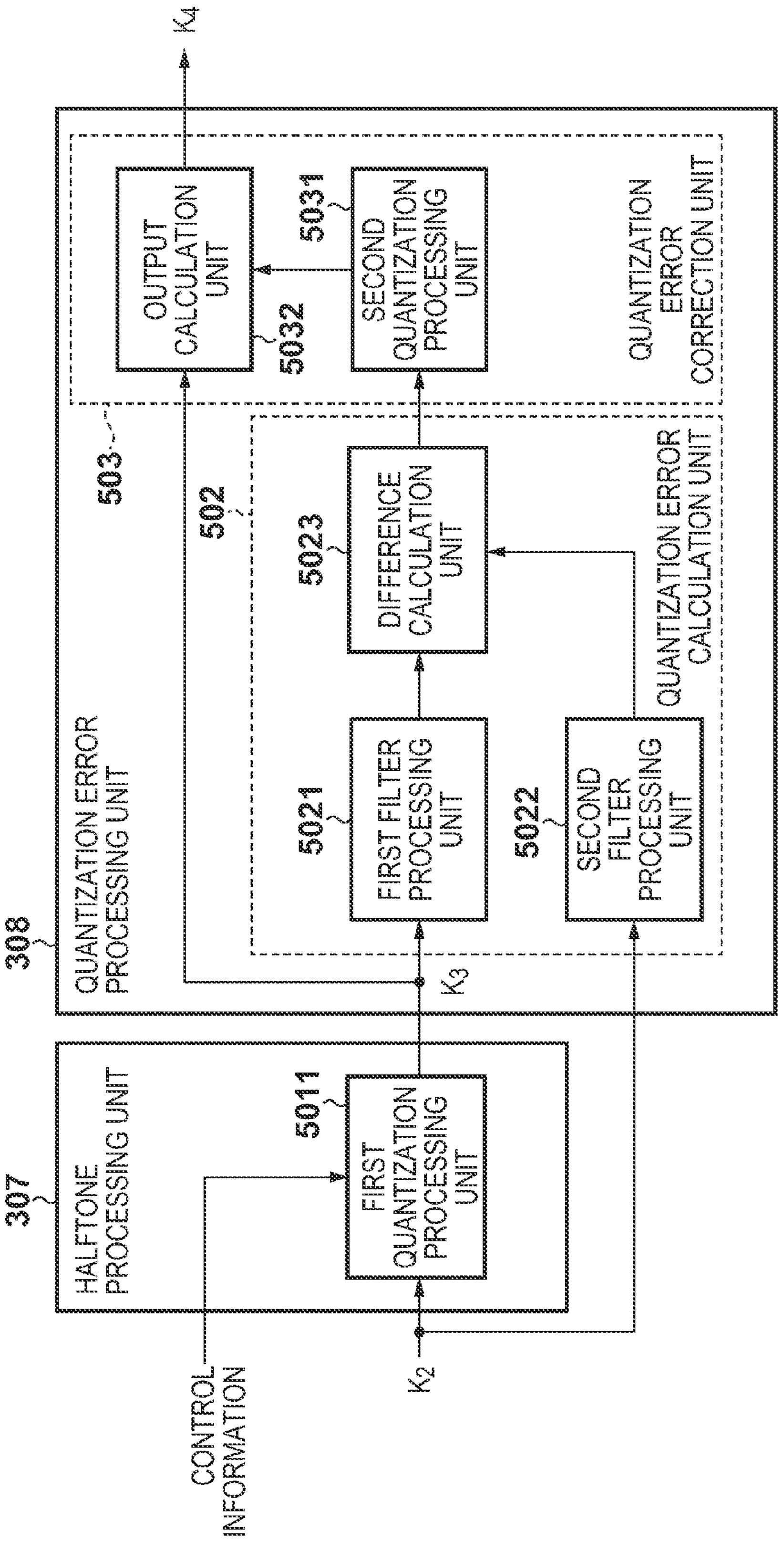
FIG. 5 is a block diagram exemplifying the arrangements of a halftone processing unit 307 and quantization error processing unit 308.

An example of the arrangements of the halftone processing unit 307 and quantization error processing unit 308, and an outline of processes to be executed by them will be explained with reference to FIG. 5. Processing regarding K color will be mainly described. However, the following description also applies to the remaining C, M, and Y colors.

(Halftone Processing Unit 307)

The halftone processing unit 307 includes a first quantization processing unit 5011. The first quantization processing unit 5011 performs halftone processing (first halftone processing) according to the ordered dither method for image data $K_2$ input from the gamma correction unit 306, generating first halftone image data $K_3$. The first quantization processing unit 5011 outputs the generated first halftone image data to the quantization error processing unit 308.

"Halftone processing" is processing of converting image data having the first number of gradations into image data having the second number of gradations smaller than the first number of gradations. In this specification, "halftone processing" will also be called "quantization processing".

(Quantization Error Processing Unit 308)

The quantization error processing unit 308 includes a quantization error calculation unit 502 and quantization error correction unit 503. The quantization error calculation unit 502 includes a first filter processing unit 5021, second filter processing unit 5022, and difference calculation unit 5023.

The first filter processing unit 5021 calculates the sum of the pixel values of a pixel of interest and pixels contained in a predetermined pixel group around the pixel of interest in the first halftone image data $K_3$ generated by the halftone processing unit 307. The second filter processing unit 5022 calculates the sum of the pixel values of a pixel of interest and pixels contained in a predetermined pixel group around the pixel of interest in the input image data $K_2$ from the gamma correction unit 306. Note that the first and second filter processing units 5021 and 5022 use, as calculation target pixels, pixels within a predetermined range in correspondence with the pixel of interest, that is, the pixel of interest and neighboring pixels contained in the same pixel group. Each of the first and second filter processing units 5021 and 5022 is formed as a finite impulse response filter.

The results of calculation by the first and second filter processing units 5021 and 5022 are input to the difference calculation unit 5023. The difference calculation unit 5023 functions as an example of a difference evaluation unit. The difference calculation unit 5023 evaluates the difference between the result of calculation by the first filter processing unit 5021 and that of calculation by the second filter processing unit 5022, detecting a quantization error (halftone quantization error) arising from halftone processing. The first halftone image data $K_3$ which is generated by the halftone processing unit 307 and used in calculation by the first filter processing unit 5021 has gradations the number of which is decreased from that of gradations in the input image data $K_2$. Thus, the difference calculation unit 5023 needs to evaluate the difference by taking account of the fact that the numbers of gradations of data input from the first and second filter processing units 5021 and 5022 are different.

For this reason, the difference calculation unit 5023 normalizes the calculation results of the first and second filter processing units 5021 and 5022, and calculates the difference between the normalized values, which will be described later. The difference calculation unit 5023 outputs the calculated difference value as the halftone quantization error to the quantization error correction unit 503.

The quantization error correction unit 503 includes a second quantization processing unit 5031 and output calculation unit 5032. The second quantization processing unit 5031 quantizes a halftone quantization error input from the difference calculation unit 5023 at a proper quantization width, and outputs the quantized value to the output calculation unit 5032. The halftone quantization error input to the second quantization processing unit 5031 can take positive and negative values. Hence, the quantized value output from the second quantization processing unit 5031 can take not only a positive value but also a negative value.

By using the result of processing by the second quantization processing unit 5031, the output calculation unit 5032 corrects the first halftone image data generated by the halftone processing unit 307. The output calculation unit 5032 outputs the corrected image data as output image data to the PWM processing unit 309. When the output from the second quantization processing unit 5031 is a positive quantized value, the output calculation unit 5032 performs addition processing corresponding to the quantized value for the gradation value of the first halftone image data. In contrast, when the output from the second quantization processing unit 5031 is a negative quantized value, the output calculation unit 5032 performs subtraction processing corresponding to the quantized value for the gradation value of the first halftone image data. In this way, the output calculation unit 5032 corrects a quantization error contained in the first halftone image data.

According to the embodiment, first, the quantization error calculation unit 502 calculates the halftone quantization error based on the input image data $K_2$ and first halftone image data $K_3$. Then, the quantization error correction unit 503 corrects the first halftone image data $K_3$ not by directly using the calculated halftone quantization error but by using the value obtained by properly quantizing the halftone quantization error. The quantization error correction unit 503 outputs the halftone quantization error-corrected data as the second halftone image data $K_4$.

The quantization error arising from halftone processing by the halftone processing unit 307 can be corrected stably, and the printer 10 can execute more proper halftone processing. Processes to be executed by the halftone processing unit 307, quantization error calculation unit 502, and quantization error correction unit 503 shown in FIG. 5 will be explained in more detail.

<Processing by Halftone Processing Unit 307>

The contents of processing by the halftone processing unit 307 will be described with reference to FIGS. 6 to 8B. The image data $K_2$ input to the halftone processing unit 307 is supplied to the first quantization processing unit 5011. The first quantization processing unit 5011 converts grayscale input image data of 256 gradations in which each pixel takes an integer pixel value of 0 to 255, into the first halftone image data of three gradations in which each pixel takes an integer pixel value of 0, 1, or 2. In input image data, white is expressed by a pixel value of 0, and black is expressed by a pixel value of 255. In the first halftone image data, white is expressed by a pixel value of 0, and black is expressed by a pixel value of 2. Note that the second halftone image data $K_4$ output upon correcting the quantization error of the first halftone image data $K_3$ by the quantization error processing unit 308 is also image data of three gradations, which will be described later.

The embodiment assumes that the first and second halftone image data and the exposure control signal $T_k$ output from the PWM processing unit 309 are expressed by the same number of gradations (=3). That is, the PWM processing unit 309 generates exposure control signals $T_k$ for setting the per-dot laser emission width of the exposure unit 24K to 0%, 50%, and 100% in correspondence with the gradation values of 0, 1, and 2 in the second halftone image data for respective pixels.

Note that grayscale image data of 256 gradations is converted into the first halftone image data expressed by three gradations per pixel in the embodiment, but may be converted into halftone image data expressed by a different number of gradations. As a matter of course, halftone processing can also be executed for color image data by executing the above processing not only for grayscale (K) image data but also for Y, M, and C image data.

Figure 6:
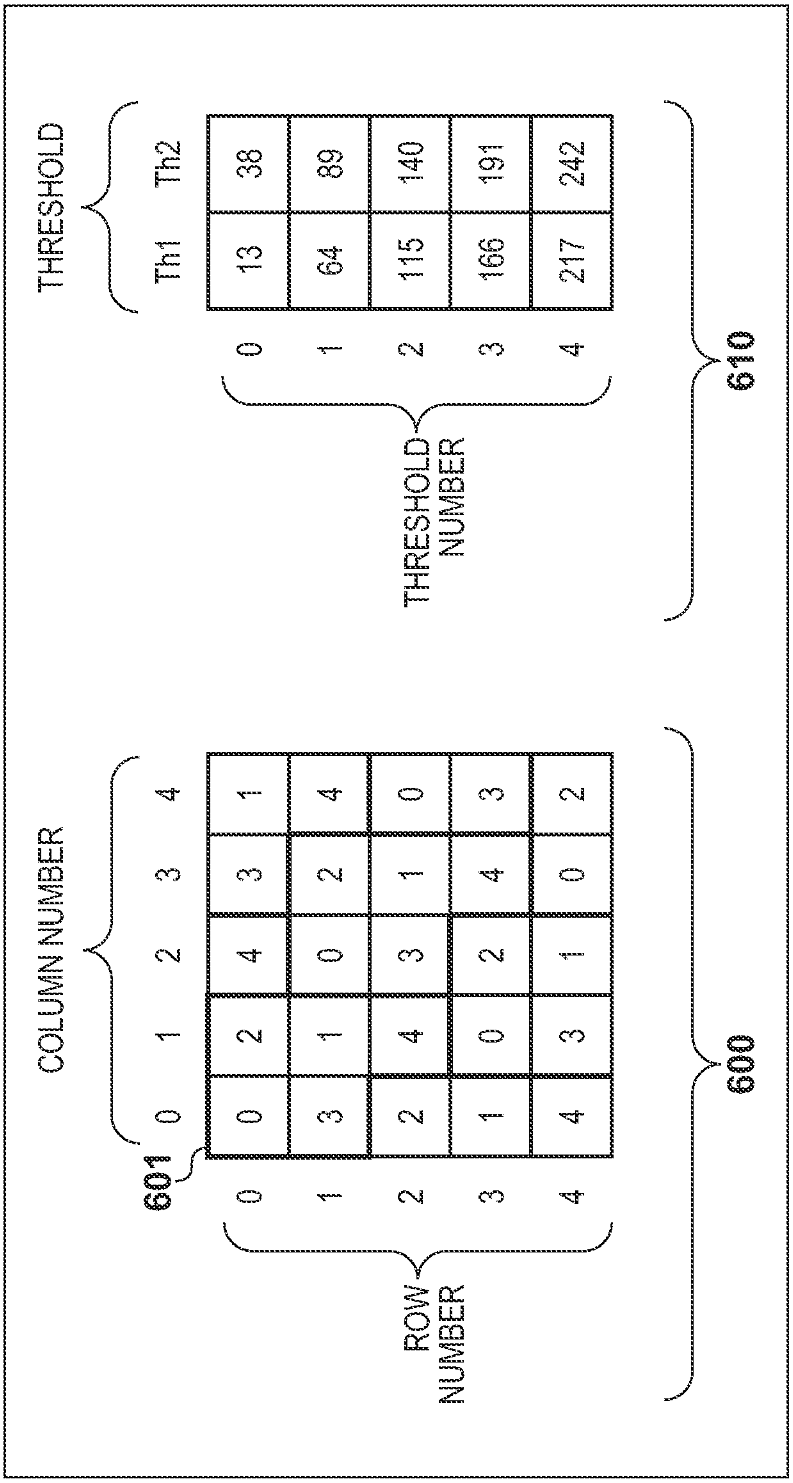
FIG. 6 is a view exemplifying a halftone table used in the ordered dither method.

Halftone processing (quantization) based on dither processing using the halftone table, which is executed by the first quantization processing unit 5011, will be exemplified by referring to an example of a halftone table shown in FIG. 6. The halftone table contains information about thresholds to be used when executing dither processing for each pixel in input image data. As shown in FIG. 6, the halftone table contains a threshold number table 600 and threshold table 610. For example, the threshold number table 600 and threshold table 610 are generated by the control information generation unit 304 of the CPU 225, and provided as control information to the halftone processing unit 307 (first quantization processing unit 5011).

The threshold number table 600 is a table (5×5 matrix) for associating each pixel contained in input image data with thresholds Th1 and Th2 to be used to quantize the pixel value of each pixel. The pixel values of the respective pixels contained in input image data are expressed by a matrix form, and each pixel in input image data is specified by row and column numbers. The threshold number table 600 defines threshold numbers (integers of 0 to 4) each corresponding to the two thresholds Th1 and Th2 to be used for a pixel specified by row and column numbers in input image data. The threshold table 610 defines the thresholds Th1 and Th2 corresponding to each threshold number contained in the threshold number table 600. In the embodiment, input image data of 256 gradations is quantized into halftone image data of three gradations. For this purpose, two paired thresholds Th1 and Th2 are used for each pixel. As shown in FIG. 6, Th1<Th2 in the embodiment.

The first quantization processing unit 5011 sets each pixel contained in input image data as a pixel of interest, and determines a threshold number based on the row and column numbers of the pixel of interest by looking up the threshold number table 600. By looking up the threshold table 610, the first quantization processing unit 5011 determines thresholds Th1 and Th2 corresponding to the determined threshold number as thresholds to be used for the pixel of interest.

More specifically, the first quantization processing unit 5011 selects a row and column in the threshold number table 600 in accordance with the remainders obtained by dividing the row and column numbers of the pixel of interest in input image data by 5 corresponding to each of the numbers of rows and columns of the threshold number table 600. For example, for a pixel on the fifth row, the same thresholds as those for a pixel on the 0th row are used. For a pixel on the sixth row, the same thresholds as those for a pixel on the first row are used. This also applies to a column. For example, for a pixel on the fifth column, the same thresholds as those for a pixel on the 0th column are used. For a pixel on the sixth column, the same thresholds as those for a pixel on the first column are used. In this way, the first quantization processing unit 5011 applies (thresholds Th1 and Th2 specified by) the threshold number table 600 shown in FIG. 6 to input image data repetitively for every five rows and every five columns.

The first quantization processing unit 5011 determines a quantized pixel value (halftone pixel value) by comparing the pixel value of a pixel of interest in input image data with each of the two thresholds Th1 and Th2, and outputs the halftone pixel value to the quantization error processing unit 308. More specifically, the first quantization processing unit 5011 determines and outputs, as the halftone pixel value, "0" when the pixel value of the pixel of interest is smaller than the threshold Th1, "1" when it is equal to or larger than the threshold Th1 and smaller than the threshold Th2, and "2" when it is equal to or larger than the threshold Th2.

As shown in FIG. 6, the threshold number table 600 has a form in which a single block is repetitively laid out using, as a minimum unit, a block 601 formed from five elements that define threshold numbers of 0 to 4 and correspond to five pixels. The gradation is changed for every element (pixel) within the block 601 contained in the threshold number table 600 to change the area ratio. Image data after halftone processing can therefore express a larger number of gradations. In the embodiment, the printer 10 can express three gradations per pixel, so halftone processing using the threshold number table 600 can express 5×2+1=11 gradations. That is, as the size of the block 601 increases, the quantization width (quantization step size) in halftone processing decreases, and a larger number of gradations can be expressed. However, when an input image to undergo halftone processing is an image which changes in a cycle larger than the size of the block 601, the resolution of the input image cannot be maintained as a result of halftone processing.

Figures 7A, 7B:
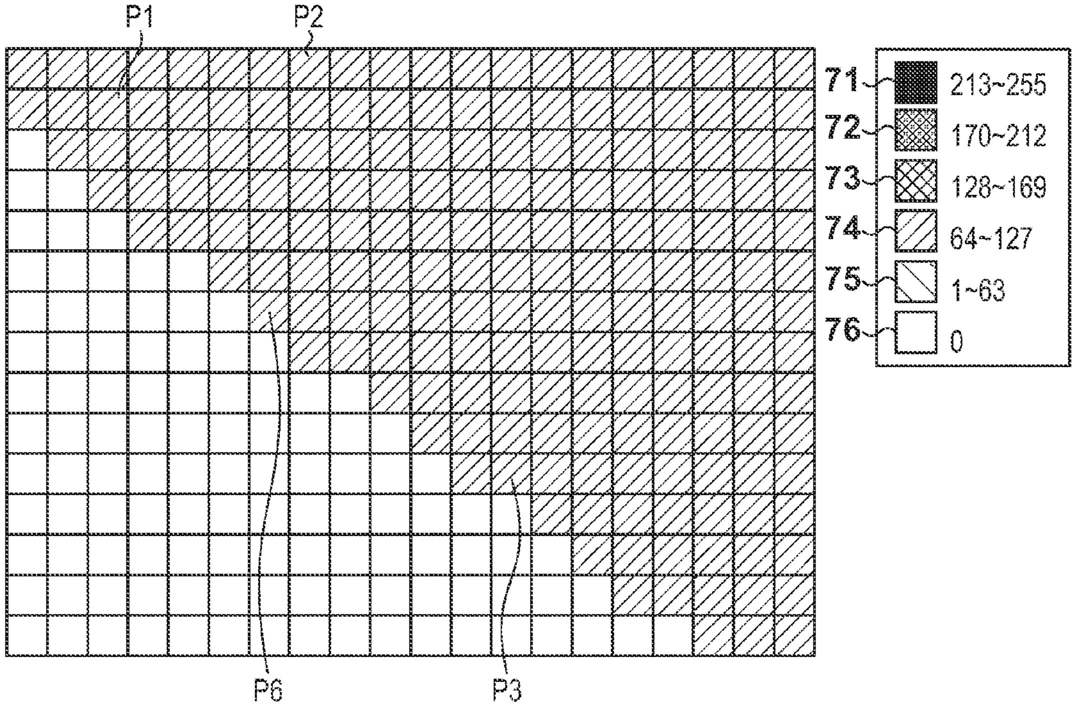
FIGS. 7A and 7B are views exemplifying input image data.

The operation of the first quantization processing unit 5011 will be exemplified with reference to FIGS. 7A and 7B. FIGS. 7A and 7B exemplify image data input to the first quantization processing unit 5011. The image data contains a flat portion and edge portion. FIG. 7A shows the pixel values of respective pixels contained in input image data, and FIG. 7B visually shows the input image data in FIG. 7A using pixel signs 71 to 76.

For example, a pixel P1 on the first row and second column has a pixel value "83", and the remainders obtained by dividing the row and column numbers by 5 are "1" and "2", respectively. By looking up the threshold number table 600, the first quantization processing unit 5011 obtains a threshold number "0" to be used for this pixel. Further, the first quantization processing unit 5011 obtains the threshold Th1=13 and Th2=38 corresponding to the threshold number "0" by looking up the threshold table 610, and compares the pixel value "83" with the obtained thresholds, obtaining a halftone pixel value "2".

For example, a pixel P2 on the 0th row and seventh column has a pixel value "83", similar to the pixel P1. However, the remainders obtained by dividing the row and column numbers by 5 are "0" and "2", respectively, and a threshold number "4" is obtained from the threshold number table 600. The first quantization processing unit 5011 obtains the threshold Th1=217 and Th2=247 corresponding to the threshold number "4" by looking up the threshold table 610, and compares the pixel value "83" with the obtained thresholds, obtaining a halftone pixel value "0".

The first quantization processing unit 5011 executes halftone processing based on the above-mentioned dither processing for all pixels contained in input image data, obtaining the first halftone image data shown in FIGS. 8A and 8B from the input image data shown in FIGS. 7A and 7B. FIG. 8A shows the pixel values of the respective pixels contained in the image data, and 8*b* visually shows the image data in 8*a* using pixel signs 81 to 83. In this manner, halftone processing by the first quantization processing unit 5011 converts input image data of 256 gradations shown in FIGS. 7A and 7B into the first halftone image data expressed by three gradations (0, 1, and 2) per pixel as shown in FIGS. 8A and 8B.

In the embodiment, dither processing is performed in a repetitive cycle defined by the block 601 using the thresholds Th1 and Th2 corresponding to a threshold number contained in the block 601. However, dither processing may be performed in a different repetitive cycle. The number of gradations after conversion of image data by dither processing is not limited to three, and may be different.

<Processing by Quantization Error Calculation Unit 502>

The contents of processing by the quantization error calculation unit 502 of the quantization error processing unit 308 will be explained with reference to FIGS. 7A to 11B. The quantization error processing unit 308 receives the first halftone image data (FIGS. 8A and 8B) obtained by halftone processing by the first quantization processing unit 5011. In the quantization error processing unit 308, the input first halftone image data is supplied to the first filter processing unit 5021 in the quantization error calculation unit 502 and the output calculation unit 5032 in the quantization error correction unit 503. In addition to the first halftone image data, the quantization error processing unit 308 receives the input image data (FIGS. 7A and 7B) from the gamma correction unit 306. The input image data is supplied to the second filter processing unit 5022 in the quantization error calculation unit 502.

(First Filter Processing Unit 5021)

Figure 9B:
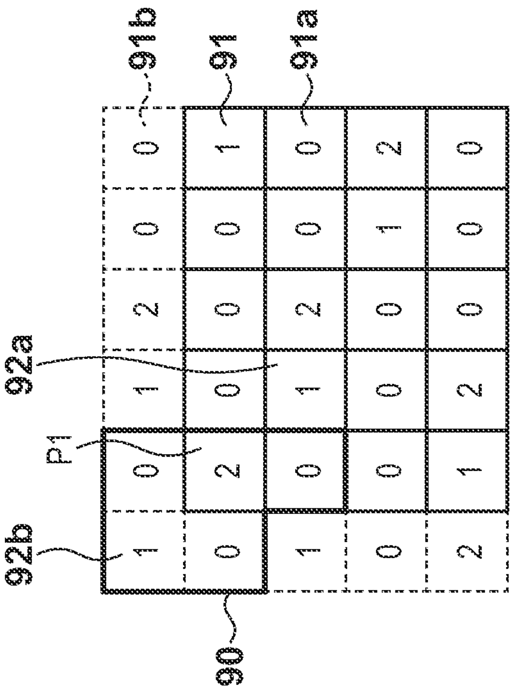
FIGS. 9A and 9B are views exemplifying a minimum cell in halftone processing and processing at the end of an image.
Figure 9A:
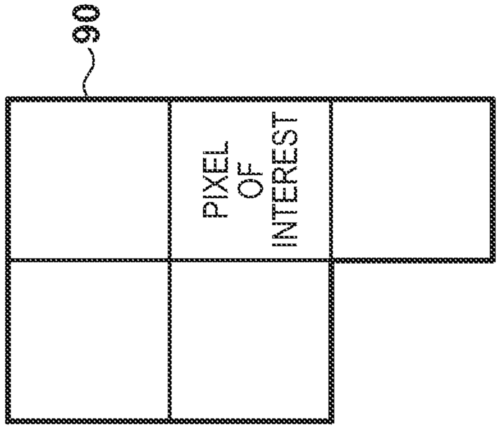

The first filter processing unit 5021 sets each pixel in the input first halftone image data (FIGS. 8A and 8B) as a pixel of interest, and calculates the sum of the pixel values of pixels in a filter region (region of interest) 90 containing the pixel of interest, as shown in FIG. 9A. The filter region 90 contains a pixel of interest and four pixels around it, that is, five pixels. The first filter processing unit 5021 performs filter processing for the first halftone image data by calculating the sum of the pixel values of pixels in the filter region 90 defined for the pixel of interest in the first halftone image data.

In the embodiment, the filter region 90 used in the first filter processing unit 5021 corresponds to the block 601 of the halftone table used in the first quantization processing unit 5011. More specifically, the size and shape of the filter region 90 are set so that the size of the filter region 90 becomes equal to the repetitive cycle of thresholds (size of the block 601) used in the first quantization processing unit 5011 for respective pixels. As a result, the filter order of the first filter processing unit 5021 is set to integer multiples of the repetitive cycle of thresholds used in halftone processing in each of the row and column directions. The first filter processing unit 5021 functions as a filter for removing ON/OFF of pixels in the halftone cycle. Note that the first filter processing unit 5021 can be skipped for halftone processing in which ON/OFF of the halftone cycle does not appear or image data is not expressed by only ON/OFF outputs.

However, for example, when a pixel P4 on the 0th row and 0th column in FIGS. 8A and 8B is set as a pixel of interest, the filter region 90 shown in FIG. 9A may not contain pixels of halftone image data to be processed. In this case, the first filter processing unit 5021 adds virtual pixels outside the halftone image data, as shown in FIG. 9B. The first filter processing unit 5021 gives pixel values to the added pixels by folding processing using a column and row at the end of halftone image data as the center.

FIG. 9B shows an example in which folded image data (broken part) is added to halftone image data (solid part) at an upper left portion in FIGS. 8A and 8B. For example, a virtual pixel 91*b* outside the halftone image data uses the pixel value of a pixel 91*a* at a position symmetrical about a pixel 91 positioned at the end of the halftone image data. Similarly, a virtual pixel 92*b* outside the halftone image data uses the pixel value of a pixel 92*a* at a position symmetrical about the pixel P1 positioned at the end of the halftone image data. In this way, for example, when the pixel P1 on the 0th row and 0th column is set as a pixel of interest in the halftone image data (FIGS. 8A and 8B), the first filter processing unit 5021 calculates the sum of the pixel values of pixels contained in the filter region 90 shown in FIG. 9B.

The first filter processing unit 5021 sets all pixels in the halftone image data (FIGS. 8A and 8B) as a pixel of interest, and calculates the sum of the pixel values of pixels contained in the filter region 90. That is, the first filter processing unit 5021 executes filter processing using filter coefficients corresponding to the filter region 90 for the first halftone image data generated by the first quantization processing unit 5011. Accordingly, the halftone image data (FIGS. 8A and 8B) input to the first filter processing unit 5021 is smoothed, obtaining image data (first filter processing image data) shown in FIG. 10A. The first filter processing unit 5021 outputs the obtained first filter processing image data to the difference calculation unit 5023.

(Second Filter Processing Unit 5022)

The second filter processing unit 5022 sets all pixels in the image data (FIGS. 7A and 7B) input from the gamma correction unit 306 as a pixel of interest, and calculates the sum of the pixel values of pixels contained in the filter region 90 shown in FIG. 9A. The second filter processing unit 5022 performs the same processing as that of the first filter processing unit 5021 except that image data to be processed is not halftone image data generated by the first quantization processing unit 5011 but input image data from the gamma correction unit 306. That is, the second filter processing unit 5022 executes filter processing using filter coefficients corresponding to the filter region 90 for input image data before undergoing halftone processing by the first quantization processing unit 5011. As a result, the input image data (FIGS. 7A and 7B) is smoothed, obtaining image data (second filter processing image data) shown in FIG. 10B. The second filter processing unit 5022 outputs the obtained second filter processing image data to the difference calculation unit 5023. The second filter processing unit 5022 functions as a filter for removing, from original image data, a high frequency component to be extracted so as to extract at high accuracy ON/OFF of an image higher in frequency than the block 601 that is ON/OFF of an image in a cycle generated by halftone processing. Note that the second filter processing unit 5022 can be skipped if original image data does not contain a high frequency component.

(Difference Calculation Unit 5023)

The difference calculation unit 5023 evaluates the difference between the first and second filter processing image data respectively input from the first and second filter processing units 5021 and 5022, and outputs the evaluation result as difference data (quantization error data) to the second quantization processing unit 5031. The quantization error data contains an error value indicating a halftone quantization error generated by halftone processing by the halftone processing unit 307 for each pixel of the halftone image data (FIGS. 8A and 8B).

The number of gradations of the first halftone image data serving as original data of the first halftone image data is three (minimum value: 0, maximum value: 2). In contrast, the number of gradations of input image data serving as original data of the second filter processing image data is 256 (minimum value: 0, maximum value: 255). These two image data to be used in calculation by the difference calculation unit 5023 differ in the number of gradations and the maximum value of the pixel value. For this reason, the difference calculation unit 5023 cannot simply compare the first and second filter processing image data. Thus, the difference calculation unit 5023 normalizes the pixel value of each pixel contained in each image data in the following way so that the maximum values per pixel in the first and the second filter processing image data become equal to each other.

For example, the difference calculation unit 5023 normalizes the maximum values of pixel values contained in the first and second filter processing image data to be 255, and then calculates the difference value of the pixel value of each pixel between these image data. In the embodiment, the maximum value is 255 as an example, but can be arbitrarily set. The difference calculation unit 5023 makes the numbers of gradations in input image data and first halftone image data (first and second filter processing image data) equal to each other, and then evaluates the difference of the pixel value between these image data.

First, the maximum value of each pixel value contained in the first filter processing image data is 10 (=2×5) because of addition of five pixels by the first filter processing unit 5021. Each pixel value is multiplied by ½ and then by 255, that is, by 25.5 (=25÷2÷5). To the contrary, the maximum value of each pixel value contained in the second filter processing image data is 1,275 (=255×5) upon addition of five pixels by the second filter processing unit 5022, so each pixel value is multiplied by ⅕. As a result, both the maximum values of pixel values contained in the first and second filter processing image data are normalized to 255.

Figures 11A, 11B:
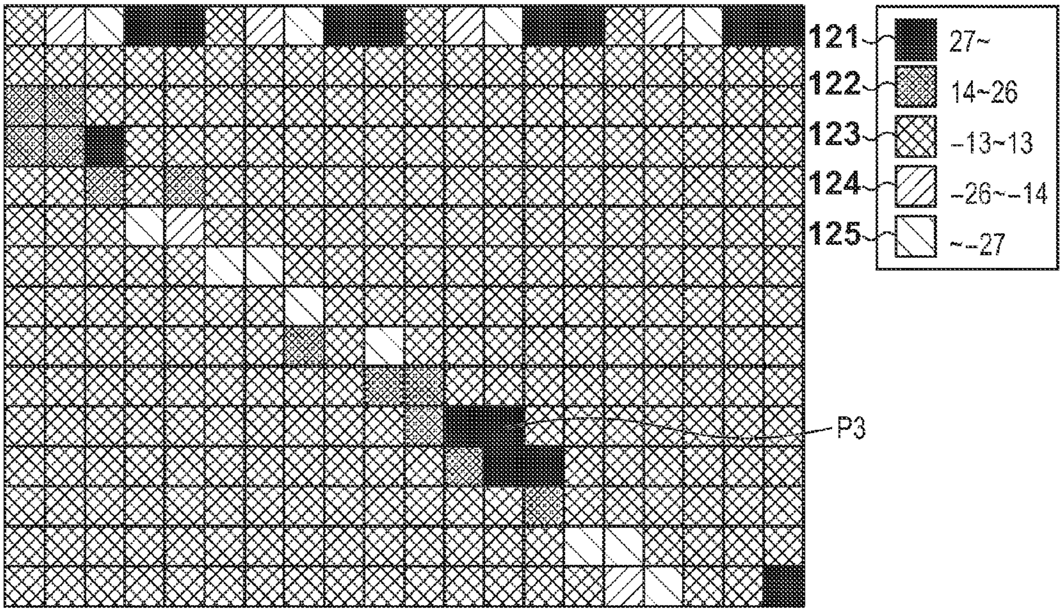
FIGS. 11A and 11B are views exemplifying quantization error data.

After that, the difference calculation unit 5023 calculates the difference value between the two image data by subtracting the pixel value of each pixel contained in the first filter processing image data from that of a corresponding pixel contained in the second filter processing image data. The difference value corresponds to a halftone quantization error, and can take an integer value of −255 to 255 because normalized pixel values in the first and second filter processing image data take an integer value of 0 to 255. As a result of processing by the difference calculation unit 5023, quantization error data as shown in FIG. 11A is obtained. The quantization error data corresponds to data representing an error arising from halftone processing (quantization) executed by the halftone processing unit 307 (first quantization processing unit 5011). FIG. 11B visually shows the quantization error data shown in FIG. 11A using pixel signs 121 to 125.

When the value (halftone quantization error) of an arbitrary pixel is positive in the quantization error data shown in FIGS. 11A and 11B, this represents that the pixel value of this pixel in the second filter processing image data is larger than that in the first filter processing image data. This means that the density of this pixel becomes lower than that of the input image owing to halftone processing. When the value (halftone quantization error) of an arbitrary pixel is negative in the quantization error data shown in FIGS. 11A and 11B, this represents that the pixel value of this pixel in the first filter processing image data is larger than that in the second filter processing image data. This means that the density of this pixel becomes higher than that of the input image owing to halftone processing.

The absolute value of each pixel in the quantization error data (FIGS. 11A and 11B) represents a density difference between an input image and an image obtained by performing halftone processing for the input image, in consideration of neighboring pixels. In the embodiment, the quantization error correction unit 503 corrects the density of the image having undergone halftone processing (first halftone image data) for each pixel in accordance with a quantization error data value, generating the second halftone image data. When the quantization error data value is positive for each pixel, addition processing is performed for the first halftone image data to correct the density to be high. When the quantization error data value is negative for each pixel, subtraction processing is performed for the first halftone image data to correct the density to be low.

Note that the difference calculation unit 5023 may subtract a pixel value in the second filter processing image data from a pixel value in the first filter processing image data, instead of subtracting a pixel value in the first filter processing image data from a pixel value in the second filter processing image data. In either case, the effects of the embodiment can be obtained.

In the quantization error data shown in 11A of FIGS. 11A and 11B, the absolute value of the pixel value (halftone quantization error) is small in a pixel at a flat portion where the density does not change in the input image (FIGS. 7A and 7B), and a predetermined value continues in adjacent pixels. In pixels near an edge portion where the density changes in a short cycle, relatively large negative and positive values each having an absolute value of more than 30 alternately appear along the edge portion. In the first halftone image data, portions much higher in density and portions much lower in density than in the input image data appear almost cyclically along the edge portion. When an image based on this image data is displayed or printed, density variations along the edge portion may appear as a jaggy or thin line disconnection.

For example, as shown in FIGS. 11A and 11B, a pixel P3 has a pixel value (halftone quantization error) of 41, which is positive by 27 or larger (pixel sign 121). This represents that the value in the second filter processing image data is larger than a pixel value in the first filter processing image data, and the density of the input image is higher than that of the first halftone image. When the density of the pixel P3 in the input image data (FIGS. 7A and 7B) is actually compared, a white spot is formed at the pixel P3 in the first halftone image data (FIGS. 8A and 8B) after halftone processing by the halftone processing unit 307.

In the printer 10 according to the embodiment, the number of gradations of input image data is 256, but the number of gradations of output image data (first halftone image data) after halftone processing by the halftone processing unit 307 is 11. When an input image is a flat image having a uniform density in different pixels, the maximum value (absolute value) of an error generated in an output image owing to quantization in halftone processing can be calculated to be 12.75 (=25÷10÷2). In any input image, the quantization error arising from halftone processing may occur at a maximum of about ±12.75. When an input image includes an edge portion where the density changes in a short cycle, the maximum value (absolute value) of a quantization error arising from halftone processing may exceed 12.75 at the edge portion.

In the embodiment, the quantization error correction unit 503 regards, as a flat portion, a pixel in which the absolute value of the halftone quantization error by halftone processing is equal to or smaller than a predetermined value (equal to or smaller than 13 in the embodiment), which will be described later. For this pixel, the quantization error correction unit 503 replaces the halftone quantization error obtained by the difference calculation unit 5023 with 0. When correcting a halftone quantization error generated by halftone processing, the low frequency region (flat portion) and high frequency portion (edge portion or thin line portion) of an image can be efficiently separated to properly correct the halftone quantization error. Note that the predetermined value is not uniquely determined, and is appropriately changeable based on the number of gradations of an input image, the number of gradations expressible by halftone processing, or the like.

As described above, in the quantization error calculation unit 502, the difference calculation unit 5023 calculates, for each pixel, the difference value between the first and second filter processing data obtained by the first and second filter processing units 5021 and 5022. The quantization error calculation unit 502 can obtain a halftone quantization error arising from halftone processing by the halftone processing unit 307, and outputs the obtained halftone quantization error to the quantization error correction unit 503.

The first halftone image data can be smoothed in the cycle of thresholds (cycle of the block 601) used in halftone processing to extract a density in a cycle other than the halftone processing cycle at high accuracy. Also, input image data can be smoothed in the cycle of thresholds (cycle of the block 601) used in halftone processing, preventing an extraction error of extracting, from original image data, a component of a frequency higher than the halftone processing cycle. By calculating the difference between these two densities, the amount of density variations caused by halftone processing is obtained. By using the density variation amount as a quantization error, the quantization error can be detected at high accuracy by a simple method regardless of the LPI or resolution.

<Processing by Quantization Error Correction Unit 503>

The contents of processing by the quantization error correction unit 503 of the quantization error processing unit 308 will be explained with reference to FIGS. 12 to 17B. The processing contents will be described by referring to even other drawings, as needed. The quantization error correction unit 503 receives the input image data (FIGS. 7A and 7B) generated by the halftone processing unit 307, and the quantization error data (FIGS. 11A and 11B) generated by the quantization error calculation unit 502 (difference calculation unit 5023). In the quantization error correction unit 503, the input image data is supplied to the output calculation unit 5032, and the quantization error data is supplied to the second quantization processing unit 5031.

(Second Quantization Processing Unit 5031)

Figure 12:
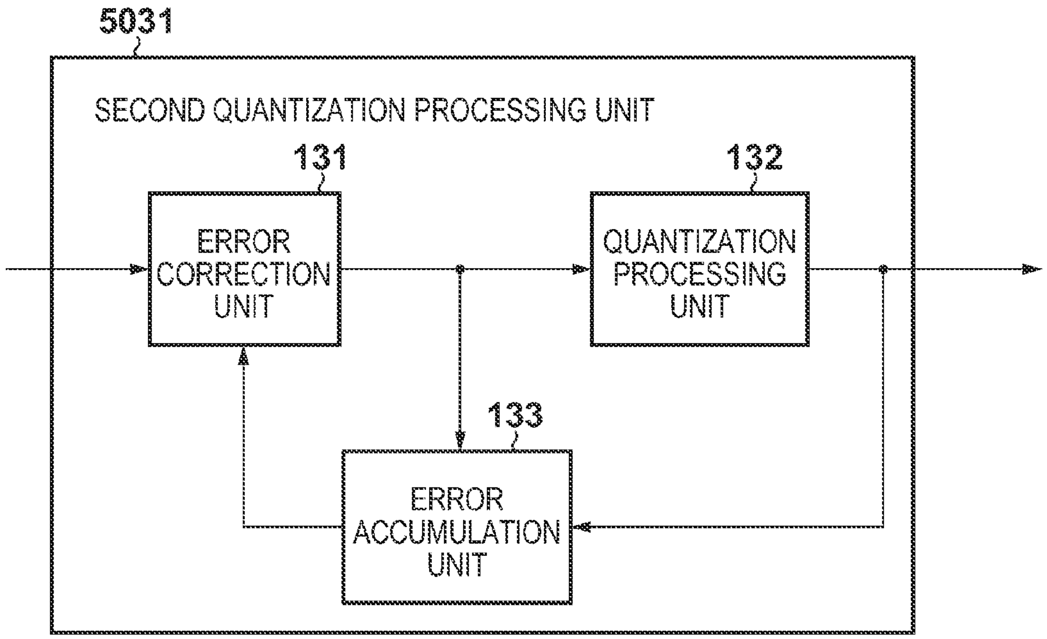
FIG. 12 is a block diagram exemplifying the arrangement of a second quantization processing unit 5031.

The second quantization processing unit 5031 performs halftone processing (second halftone processing) based on error diffusion processing for each pixel in the quantization error data input from the difference calculation unit 5023. FIG. 12 is a block diagram showing the arrangement of the second quantization processing unit 5031, and shows an arrangement for performing halftone processing (quantization processing) based on error diffusion processing for input quantization error data. The second quantization processing unit 5031 sets each pixel in the input quantization error data as a pixel of interest, performs error diffusion processing for all pixels to generate halftone correction data, and outputs the generated data to the output calculation unit 5032. Error diffusion processing to be executed by the second quantization processing unit 5031 will be described in detail with reference to FIG. 12.

The second quantization processing unit 5031 includes an error correction unit 131, quantization processing unit 132, and error accumulation unit 133. The quantization error data input to the second quantization processing unit 5031 is first supplied to the error correction unit 131. The error correction unit 131 sequentially receives the pixel values (halftone quantization errors) of respective pixels contained in the quantization error data. Every time a halftone quantization error is input, the error correction unit 131 sets a pixel corresponding to the input value as a pixel of interest, and executes error diffusion processing. As will be described later, the error correction unit 131 reads out, from the error buffer of the error accumulation unit 133, the quantization error values of pixels around the pixel of interest that are obtained by the quantization processing unit 132. Then, the error correction unit 131 adds a correction value calculated based on the readout values to the input value of the pixel of interest. This processing reduces a quantization error arising from halftone processing (quantization processing) by the second quantization processing unit 5031. The value output from the error correction unit 131 is input to the quantization processing unit 132 and error accumulation unit 133.

The quantization processing unit 132 outputs, as the output value of the second quantization processing unit 5031 to the output calculation unit 5032, a quantized value obtained by quantizing an input value from the error correction unit 131. As described above, the halftone quantization error of each pixel that is contained in quantization error data input from the difference calculation unit 5023 to the second quantization processing unit 5031 can take not only a positive value but also a negative value. In the second quantization processing unit 5031, when input quantization error data is corrected by the error correction unit 131 and then quantized by the quantization processing unit 132, either a positive or negative value is output as the quantized value. The embodiment assumes that the quantization processing unit 132 outputs one of five values (−2, −1, 0, 1, and 2) as a positive or negative quantized value.

The quantization processing unit 132 holds in advance thresholds smaller in number by one than quantized values (number of quantization levels). Since the embodiment adopts five quantized values, the quantization processing unit 132 holds four predetermined thresholds ETh1, ETh2, ETh3, and ETh4. The CPU 225 (control information generation unit 304) may provide these thresholds as control information. For example, ETh1=−192, ETh2=−64, ETh3=64, and ETh4=192. The quantization processing unit 132 compares an input value with the thresholds ETh1 to ETh4 held in advance, determining a quantized value obtained by quantizing the input value.

Figure 13:
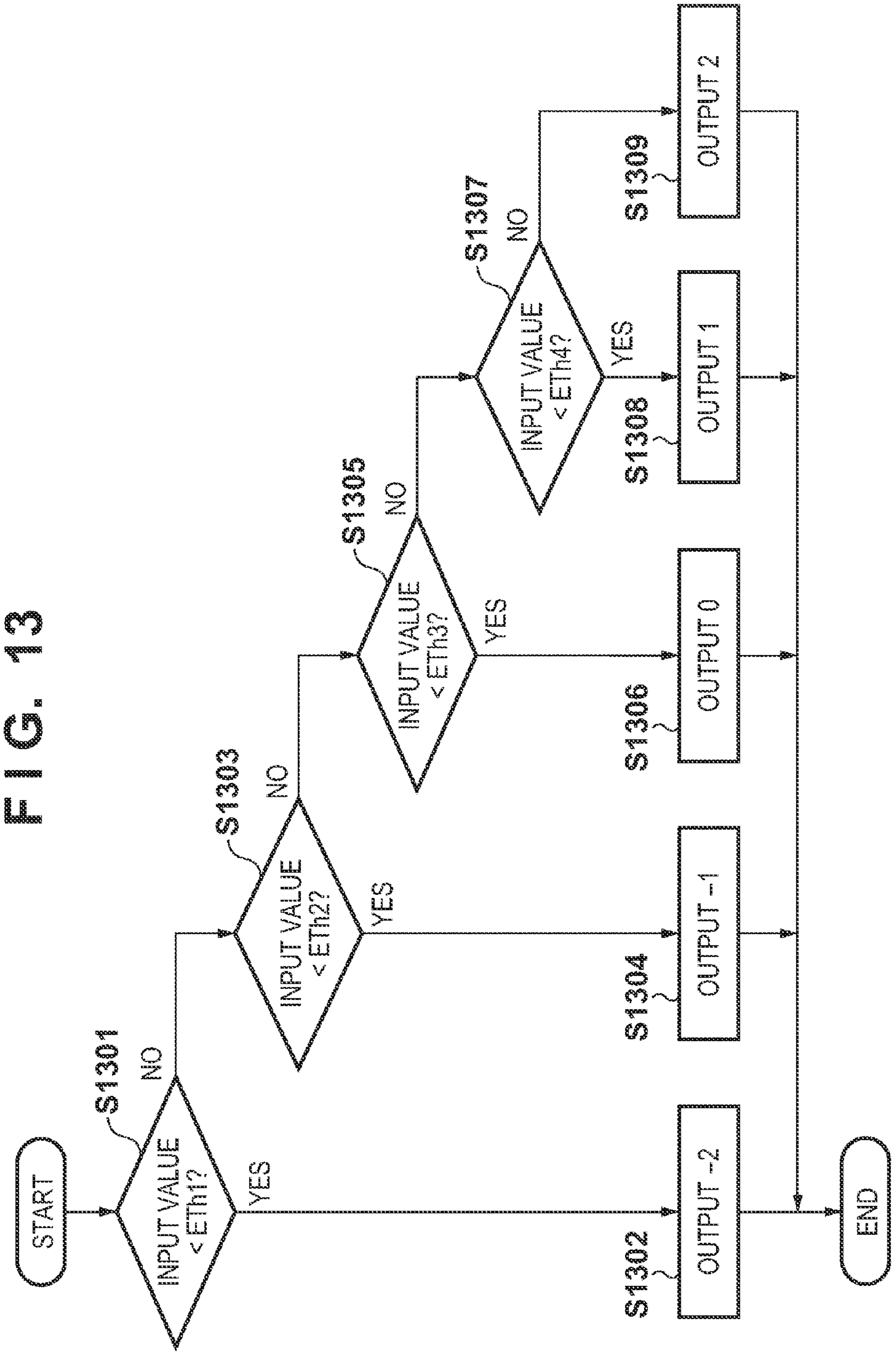
FIG. 13 is a flowchart showing a processing sequence to be executed by a quantization processing unit 132.

A quantization processing sequence by the quantization processing unit 132 will be explained with reference to the flowchart of FIG. 13. Every time the quantization processing unit 132 receives an output value from the error correction unit 131, it executes the processing shown in the flowchart of FIG. 13 for a pixel of interest while shifting the pixel of interest in the raster order.

First, the quantization processing unit 132 compares an input value for the pixel of interest with ETh1 (step S1301). If the input value is smaller than ETh1 as a result of the comparison, the quantization processing unit 132 outputs "−2" as a quantized value for the pixel of interest (step S1302). If the input value is equal to or larger than ETh1, the quantization processing unit 132 compares the input value with ETh2 (step S1303). If the input value is smaller than ETh2 as a result of the comparison, the quantization processing unit 132 outputs "−1" as a quantized value for the pixel of interest (step S1304). If the input value is equal to or larger than ETh2, the quantization processing unit 132 compares the input value with ETh3 (step S1305). If the input value is smaller than ETh3 as a result of the comparison, the quantization processing unit 132 outputs "0" as a quantized value for the pixel of interest (step S1306). If the input value is equal to or larger than ETh3, the quantization processing unit 132 compares the input value with ETh4 (step S1307). If the input value is smaller than ETh4 as a result of the comparison, the quantization processing unit 132 outputs "1" as a quantized value for the pixel of interest (step S1308). If the input value is equal to or larger than ETh4, the quantization processing unit 132 outputs "2" as a quantized value for the pixel of interest (step S1309). By executing quantization processing in this fashion, the quantization processing unit 132 outputs quantized values including not only positive values but also negative values.

While shifting the pixel of interest in the raster order, the error accumulation unit 133 calculates, for the pixel of interest, a quantization error arising from quantization processing by the quantization processing unit 132. The error accumulation unit 133 accumulates the calculated quantization error value in the error buffer for reference by the error correction unit 131. For each pixel, the error accumulation unit 133 receives an output value from the quantization processing unit 132 and an input value to the quantization processing unit 132 (output value from the error correction unit 131). The error accumulation unit 133 multiplies an output value from the quantization processing unit 132 by 255/2 to normalize it, making the maximum value (absolute value) of the output value equal to the maximum value (absolute value) of 255 before correction by the error correction unit 131. The output value from the quantization processing unit 132 is multiplied by 255/2 because the output value takes an integer value of −2 to 2 and the maximum value (absolute value) is 2, as described above. Then, the error accumulation unit 133 calculates the difference between the normalized output value of the quantization processing unit 132 and an input value to the quantization processing unit 132. The error accumulation unit 133 accumulates the calculated difference value as a quantization error value for the pixel of interest in the error buffer.

Every time the error correction unit 131 receives, from the difference calculation unit 5023, a halftone quantization error for the pixel of interest that is contained in the quantization error data (FIGS. 11A and 11B), it corrects the received halftone quantization error and outputs the corrected halftone quantization error while shifting the pixel of interest in the raster order. More specifically, the error correction unit 131 reads out the quantization error values of a plurality of pixels positioned around the pixel of interest from the error buffer of the error accumulation unit 133, and calculates the sum of values obtained by multiplying the readout values by predetermined distribution coefficients. This implements error diffusion processing in the second quantization processing unit 5031.

Figure 14:
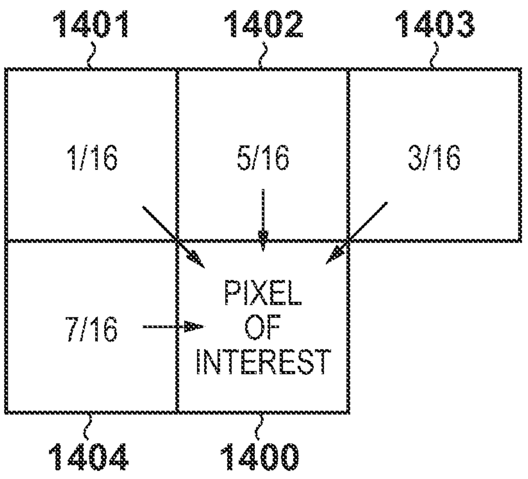
FIG. 14 is a table exemplifying a diffusion coefficient table in error diffusion processing.

FIG. 14 exemplifies the positional relationship between neighboring pixels 1401 to 1404 used in error diffusion processing for a pixel 1400 of interest in the embodiment, and distribution coefficients to be applied to the quantization error values of these neighboring pixels. For the pixel 1400 of interest, the error correction unit 131 reads out, from the error buffer of the error accumulation unit 133, quantization error values corresponding to the pixels 1401 to 1404 in the positional relationship shown in FIG. 14. The error correction unit 131 multiplies the respective readout values by the distribution coefficients shown in FIG. 14. More specifically, the error correction unit 131 multiplies quantization error values corresponding to the pixels 1401, 1402, 1403, and 1404 by distribution coefficients of 1/16, 5/16, 3/16, and 7/16, respectively. Further, the error correction unit 131 calculates the sum of the products obtained for the pixels 1401 to 1404, and uses the calculated value as a correction value for a quantization error arising from quantization processing in the quantization processing unit 132.

More specifically, the error correction unit 131 adds the calculated correction value to the halftone quantization error of the pixel of interest that is contained in quantization error data input to the second quantization processing unit 5031. Accordingly, the quantization error generated upon quantization by the quantization processing unit 132 is corrected in advance by error diffusion. The error correction unit 131 outputs the corrected halftone quantization error for the pixel of interest to the quantization processing unit 132. This output value is also supplied to the error accumulation unit 133, as described above. A quantization error generated by halftone processing can be satisfactorily reduced by using the corrected halftone quantization error for correction of the first halftone image data in the output calculation unit 5032.

The second quantization processing unit 5031 generates halftone correction data as correction data of the first halftone image data by performing halftone processing based on error diffusion processing for quantization error data. The second quantization processing unit 5031 provides the generated halftone correction data to the output calculation unit 5032.

FIG. 15A shows data quantized by error diffusion processing by the second quantization processing unit 5031 after replacing a halftone quantization error with 0 for a pixel in which the absolute value of the halftone quantization error shown in FIG. 11A is equal to or smaller than 13. FIG. 15B visually shows the respective pixel values shown in FIG. 15A using pixel signs 161 to 165. As shown in FIGS. 15A and 15B, for example, for the pixel P3, the second quantization processing unit can quantize data into a density correction value appropriate for the printer 10.

(Output Calculation Unit 5032)

The output calculation unit 5032 corrects the first halftone image data (FIGS. 8A and 8B) generated by the first quantization processing unit 5011 by using the halftone correction data (FIGS. 15A and 15B) generated by the second quantization processing unit 5031. More specifically, the output calculation unit 5032 corrects the first halftone image data by adding halftone correction data to the first halftone image data for each pixel, and outputs the corrected image data as the second halftone image data. When a pixel value in the halftone correction data is positive, the correction increases the pixel value of a corresponding pixel in the first halftone image data, and increases the density of the pixel. When a pixel value in the halftone correction data is negative, the correction decreases the pixel value of a corresponding pixel in the first halftone image data, and decreases the density of the pixel.

When the maximum value of each pixel value differs between the first halftone image data input from the first quantization processing unit 5011 and the halftone correction data input from the second quantization processing unit 5031, normalization processing is performed for each data to make the maximum values equal to each other. In the embodiment, the maximum value of each pixel value is equal between the first halftone image data and the halftone correction data (absolute value is 2 for both of the data), so normalization processing need not be performed.

<Result of Processing by Quantization Error Correction Unit 503>

Figures 16A, 16B:
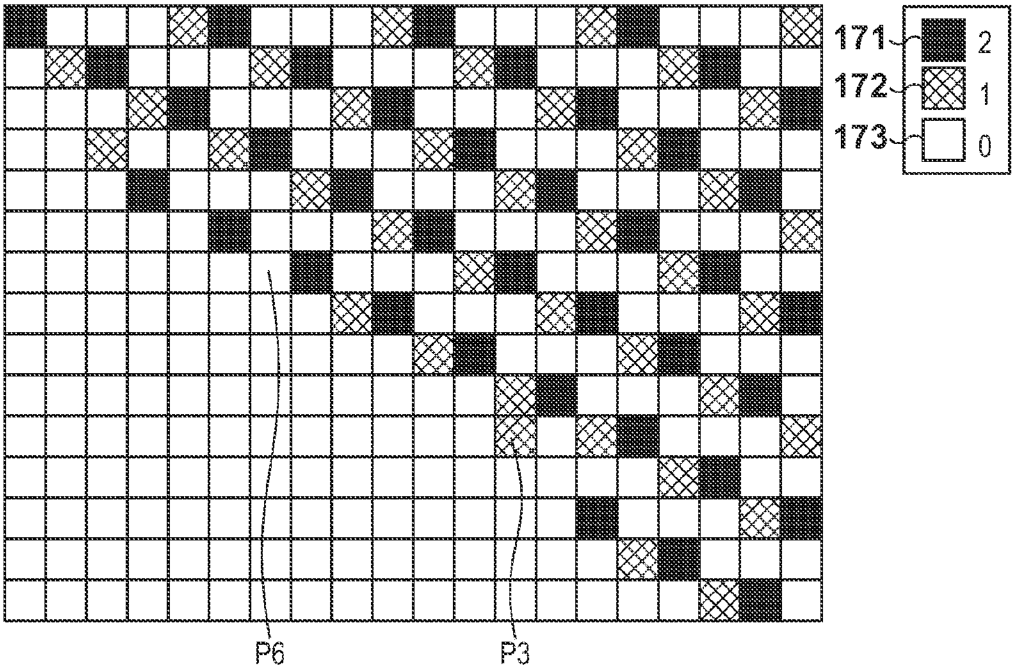
FIGS. 16A and 16B are views exemplifying image data corrected by an image processing apparatus according to the first embodiment.

FIGS. 16A and 16B show the second halftone image data obtained by adding the first halftone image data (FIGS. 8A and 8B) and the halftone correction data (FIGS. 15A and 15B) for each pixel. FIG. 16A shows the pixel values of respective pixels contained in the second halftone image data, and 16*b* visually shows the image data in 16*a* using pixel signs 171 to 173.

Figures 17A, 17B:
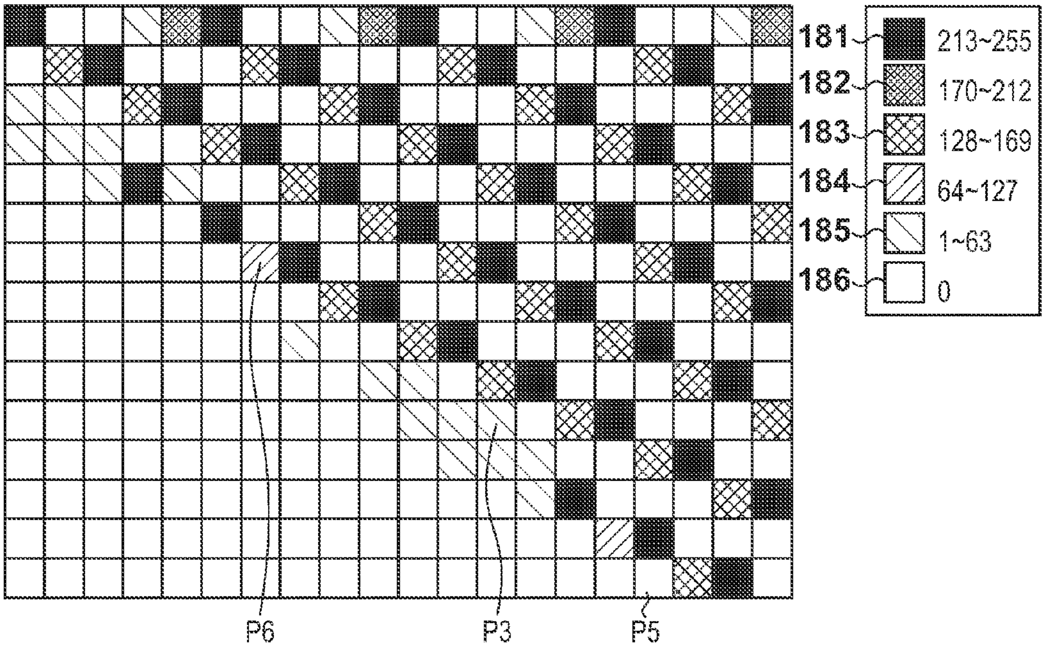
FIGS. 17A and 17B are views exemplifying the second halftone image data.

To examine the effectiveness of the embodiment, FIGS. 17A and 17B show, as a comparative example to FIGS. 16A and 16B, the result of directly using quantization error data from the quantization error calculation unit 502 for correction by the output calculation unit 5032 without performing processing by the second quantization processing unit 5031. In this comparative example, the quantization error data (FIGS. 11A and 11B) output from the quantization error calculation unit 502 is directly input to the output calculation unit 5032. The output calculation unit 5032 corrects the first halftone image data using the input quantization error data as correction data, and outputs the corrected halftone image data. FIG. 17A shows the pixel values of respective pixels contained in corrected halftone image data when the second quantization processing unit 5031 does not perform processing, and 17*b* visually shows the image data in 17*a* using pixel signs 181 to 186.

In this comparative example, the first halftone image data is data of three gradations (minimum: 0, maximum 2), and the quantization error data used as correction data is data of 256 gradations (minimum: 0, maximum 255). Since the maximum value of each pixel value is not equal between the first halftone image data and the correction data, normalization processing needs to be executed to make the maximum values equal to each other. In this comparative example, before correction processing, the output calculation unit 5032 multiplies each pixel value contained in the first halftone image data by 255/2 to normalize the maximum value of each pixel value to 255, making the maximum value equal to the maximum value of a pixel value contained in the correction data.

First, the value corresponding to a halftone quantization error is added in a pixel (for example, pixel P3) in which the density of the first halftone image (FIGS. 8A and 8B) is lower than that of the input image (FIGS. 7A and 7B), out of the pixels of the corrected halftone image shown in FIGS. 17A and 17B (comparative example). To the contrary, the value corresponding to a halftone quantization error is subtracted in a pixel (for example, P6) in which the density in the first halftone image (FIGS. 8A and 8B) is higher than that in the input image (FIGS. 7A and 7B). In FIG. 17A, a pixel (for example, pixel P5) in which the pixel value in the first halftone image data (FIGS. 8A and 8B) is 0 and the halftone quantization error is negative has a negative value ("−78" in the pixel P5). In this fashion, when a pixel value corrected using correction data becomes negative, the pixel value of the pixel is replaced with 0, as shown in FIG. 17B.

When the printer 10 forms a toner image based on the corrected halftone image data shown in FIGS. 17A and 17B, the toner image may not be formed depending on the value contained in the quantization error data (correction data) used in the output calculation unit 5032. As described with reference to FIG. 4, to form a toner image by exposing the surface of the photosensitive drum 22K, the surface of the photosensitive drum 22K needs to be continuously irradiated with a laser beam for a sufficient time. The pixel value (correction value) of the pixel P3 is "41" in the quantization error data (correction data) shown in FIGS. 11A and 11B. This correction value is converted into a per-dot laser emission width of 0.16 dot (=41/255) upon standardization using the maximum value "255" of the correction value. For pixels having positive correction values out of pixels positioned around the pixel P3, the correction values are "17 to 50". These correction values are converted into per-dot laser emission widths of 0.07 to 0.2 dots.

As described with reference to FIG. 4, even if the surface of the photosensitive drum 22K is continuously irradiated with a laser beam for an exposure time T corresponding to 0.25 dot or smaller, the absolute value of the surface potential does not change to be smaller than the absolute value of the development bias, and no toner image is formed. Therefore, even if the first halftone image data is corrected using a correction value corresponding to a laser emission width of 0.25 dot or smaller, the correction value is not reproduced as an image (does not appear as a toner image) in a correction value-applied pixel, and no correction effect is obtained. In other words, when quantization error data generated by the quantization error calculation unit 502 is directly used as correction data for the first halftone image data, a pixel to be corrected can be detected from the correction data, but no satisfactory correction effect may be obtained.

In the corrected halftone image shown in FIG. 17B in the comparative example, correction values for pixels indicated by pixel signs 185 and 186 correspond to laser emission widths of 0.25 dot or smaller, and thus no toner image is formed in image formation by the printer 10. Even if an image is formed based on the corrected halftone image data shown in FIGS. 17A and 17B, a jaggy generated along the edge portion contained in the first halftone image (FIGS. 8A and 8B) is not reduced, and it is difficult to improve the image quality.

Referring to FIGS. 16A and 16B in the embodiment, for example, the pixel value (=1) of the pixel P3 out of the pixels of the second halftone image increases from the pixel value (=0) in the first halftone image data (FIGS. 8A and 8B). This is because the pixel value (=1) of a corresponding pixel in the halftone correction data (FIGS. 15A and 15B) is positive. That is, the density of the pixel P3 increases upon correction by the output calculation unit 5032. In contrast, for example, the pixel value (=0) of the pixel P6 decreases from the pixel value (=x1) in the first halftone image data (FIGS. 8A and 8B). This is because the pixel value (=−1) of a corresponding pixel in the halftone correction data (FIGS. 15A and 15B) is negative. That is, the density of the pixel P6 decreases upon correction by the output calculation unit 5032.

A comparison between FIGS. 8A and 8B and FIGS. 16A and 16B reveals that a jaggy generated along the edge portion in the first halftone image (FIGS. 8A and 8B) is reduced in the second halftone image (FIGS. 16A and 16B).

As described above, according to the first embodiment, quantization error data representing a quantization error upon halftone processing is generated by calculating the difference between the local average of input image data and that of the first halftone image data. A pixel in which the image quality may degrade due to the quantization error upon halftone processing can be detected at high accuracy. Halftone correction data is generated by performing halftone processing (quantization processing) based on error diffusion processing for the generated quantization error data. By using the generated halftone correction data, the correction value is converted into a value more suitable for image formation in the image forming apparatus. As a result, a quantization error generated in the first halftone image upon halftone processing can be corrected more properly, and degradation of the quality of an output image in the image forming apparatus can be prevented.

Second Embodiment

The second embodiment of the present invention will be described. For simplicity, the difference from the first embodiment will be mainly described. In the first embodiment, halftone correction data is generated by performing halftone processing based on error diffusion processing by the second quantization processing unit 5031 for quantization error data. However, the quantization error data contains positive error values (positive data) and negative error values (negative data), so error values may cancel each other between adjacent pixels having different error value signs in error diffusion processing. Errors enough for quantization may not be accumulated in error diffusion processing.

It can be considered that if cancellation of error values upon error diffusion processing can be reduced, halftone correction data capable of more properly correcting a quantization error generated in the first halftone image data can be generated. From this, a quantization error processing unit 308 according to the second embodiment separates positive data and negative data of input quantization error data, and performs halftone processing based on error diffusion processing for the respective separated data. Data having undergone halftone processing are added to generate halftone correction data, further improving the correction effect for the first halftone image data.

An example of the arrangements of a halftone processing unit 307 and the quantization error processing unit 308 according to the second embodiment, and an outline of processes to be executed by them will be explained with reference to FIG. 18. Note that the halftone processing unit 307 and a quantization error calculation unit 502 are the same as those in the first embodiment (FIG. 5), and a description thereof will not be repeated.

Unlike the first embodiment (FIG. 5), a quantization error correction unit 503 according to the second embodiment includes a separation processing unit 1901, second quantization processing unit 1902, third quantization processing unit 1903, and addition processing unit 1904, in place of the second quantization processing unit 5031. The separation processing unit 1901 separates positive data having a positive sign and negative data having a negative sign in quantization error data input from the quantization error calculation unit 502. The separation processing unit 1901 outputs the separated positive data and negative data to the second and third quantization processing units 1902 and 1903, respectively. In the embodiment, quantization processing can be executed separately for the positive data and negative data contained in the quantization error data. The separation processing unit 1901 functions as a separation unit which separates positive pixel values and negative pixel values contained in quantization error data to generate the first quantization error data containing the positive pixel values and the second quantization error data containing the negative pixel values.

The separation processing unit 1901 determines the sign of the pixel value of each pixel contained in quantization error data input from the quantization error calculation unit 502. For a pixel (pixel value>0) for which it is determined that the pixel data is positive data, the separation processing unit 1901 outputs the pixel data to the second quantization processing unit 1902 and zero value data to the third quantization processing unit 1903. For a pixel (pixel value<0) for which it is determined that the pixel data is negative data, the separation processing unit 1901 outputs zero value data to the second quantization processing unit 1902 and the pixel data to the third quantization processing unit 1903. For a pixel (pixel value=0) for which it is determined that the pixel data is zero value data, the separation processing unit 1901 outputs zero value data to the second and third quantization processing units 1902 and 1903.

FIGS. 19A to 19D exemplify image data obtained by separating positive data and negative data contained in quantization error data shown in FIGS. 11A and 11B by the separation processing unit 1901. FIGS. 19A and 19C show image data (first quantization error data) obtained by separating positive data, and FIGS. 19B and 19D show image data (second quantization error data) obtained by separating negative data. Of pixels contained in the quantization error data, the pixel values of pixels in each of which the absolute value of the pixel value is equal to or smaller than 13 are replaced with 0, and the resultant quantization error data is input to the separation processing unit 1901. FIGS. 19C and 19D visually show the pixel values of the respective pixels shown in FIGS. 19A and 19B using pixel signs 201 to 205.

The second and third quantization processing units 1902 and 1903 perform error diffusion processing for the input image data, and output the resultant data. The embodiment assumes that the second quantization processing unit 1902 adopts error diffusion processing using three positive quantized values (0, 1, and 2), and the third quantization processing unit 1903 adopts error diffusion processing using three negative quantized values (−2, −1, and 0). Thus, the arrangements of the second and third quantization processing units 1902 and 1903 are the same as that of the second quantization processing unit 5031 (FIG. 12) in the first embodiment. As described above, the quantization error data contains pixel values of −255 to 255. The second quantization processing unit 1902 receives positive image data of 256 gradations (0 to 255), and the third quantization processing unit 1903 receives negative image data of 256 gradations (−255 to 0). The second and third quantization processing units 1902 and 1903 quantize the received image data into positive and negative image data each of three gradations, respectively, and output the quantized image data.

Figure 20A:
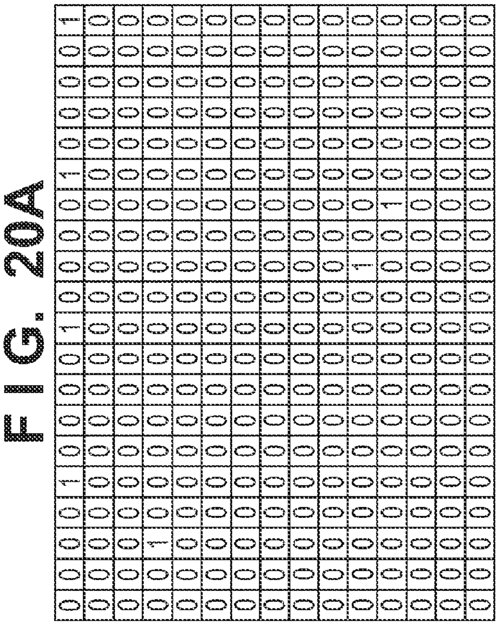
FIGS. 20A to 20D are views exemplifying data obtained by quantizing the positive components and negative components of quantization error data.
Figure 20B:
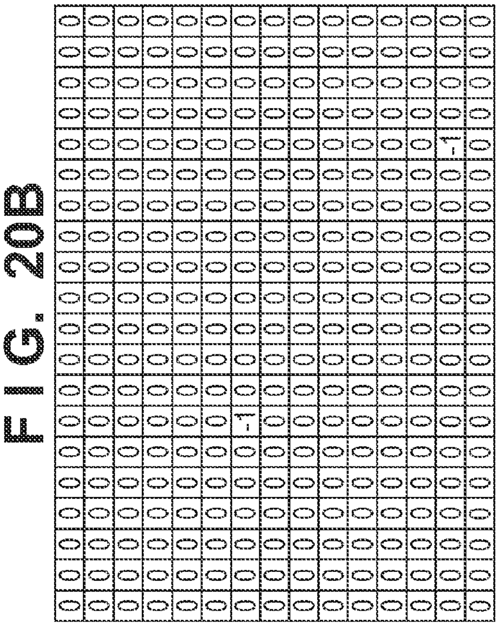
Figure 20C:
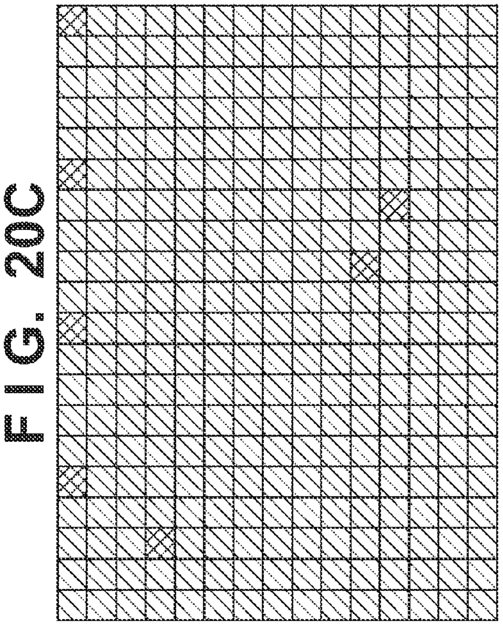
Figure 20D:
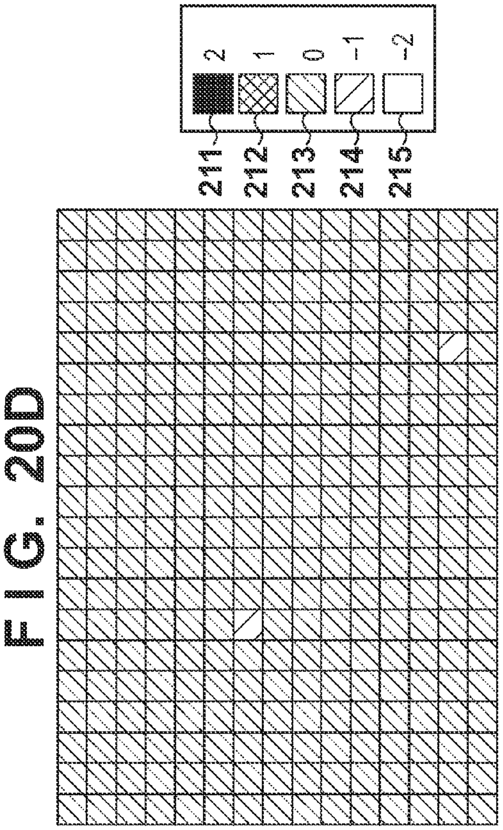

FIGS. 20A to 20D show image data obtained by performing quantization processing for the image data shown in FIGS. 19A to 19D by the second and third quantization processing units 1902 and 1903. FIGS. 20A and 20B show image data obtained by performing error diffusion processing by the second and third quantization processing units 1902 and 1903 for the image data shown in FIG. 19A and the image data shown in FIG. 19B. FIGS. 20C and 20D visually show the respective pixel values shown in FIGS. 20A and 20B using pixel signs 201 to 205.

The halftone correction data (FIGS. 15A and 15B) obtained by the second quantization processing unit 5031 in the first embodiment is compared with the image data (FIGS. 20A to 20D) obtained by the second and third quantization processing units 1902 and 1903 in the second embodiment. The comparison reveals that most pixel values near the edge portion where positive and negative values coexist in the quantization error data (FIGS. 11A and 11B) are quantized into 0 in the halftone correction data (FIGS. 15A and 15B) in the first embodiment. This is because positive and negative pixel values (error values) near the edge portion cancel each other owing to error diffusion processing by the second quantization processing unit 5031.

To the contrary, in the second embodiment, when quantization error data is separated into positive data and negative data, and the positive data and negative data are respectively quantized by error diffusion processing, the number of pixels quantized to non-zero values is larger than that in the first embodiment (FIGS. 15A and 15B), as shown in FIGS. 20A to 20D. This is because quantization error data is separated into positive data and negative data, and positive error values and negative error values are independently quantized without canceling each other in error diffusion processing. According to the second embodiment, pixel values (error values) contained in quantization error data tend to be quantized into non-zero values in error diffusion processing by the second and third quantization processing units 1902 and 1903.

Referring to FIG. 18 again, the addition processing unit 1904 adds an output value from the second quantization processing unit 1902 and that from the third quantization processing unit 1903 for each pixel, generating halftone correction data. The addition processing unit 1904 inputs the generated halftone correction data to an output calculation unit 5032. By using the input halftone correction data, the output calculation unit 5032 corrects the first halftone image data (FIGS. 8A and 8B) generated by a first quantization processing unit 5011. More specifically, similar to the first embodiment, the output calculation unit 5032 corrects the first halftone image data by adding halftone correction data to the first halftone image data for each pixel. The corrected image data is output as the second halftone image data.

Figures 21A, 21B:
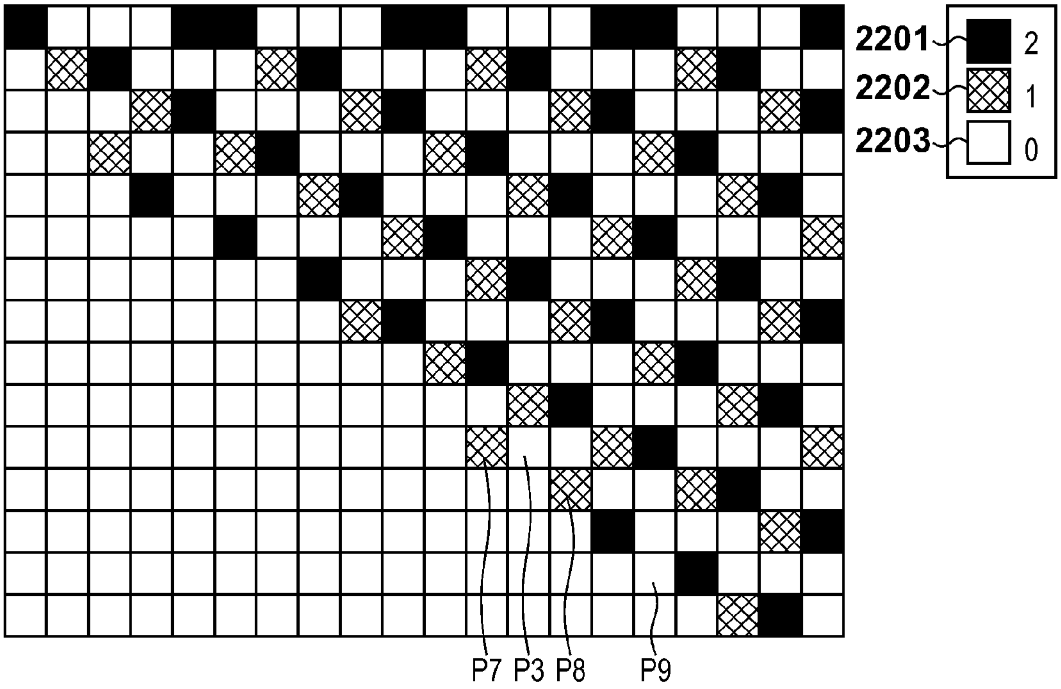
FIGS. 21A and 21B are views exemplifying the second halftone image data obtained by a printer 10 according to the second embodiment.

FIGS. 21A and 21B show the second halftone image data obtained by adding the first halftone image data (FIGS. 8A and 8B) and the halftone correction data output from the addition processing unit 1904 by the output calculation unit 5032 for each pixel. FIG. 21A shows the pixel values of respective pixels contained in the second halftone image data according to the second embodiment, and FIG. 21B visually shows the image data in FIG. 21A using pixel signs 2201 to 2203.

The effectiveness of the second embodiment will be examined by comparing the second halftone image data (FIGS. 16A and 16B) obtained in the first embodiment with the second halftone image data (FIGS. 21A and 21B) obtained in the second embodiment.

As described above, in the first embodiment, pixels quantized after error values contained in quantization error data cancel each other in quantization processing by the second and third quantization processing units 1902 and 1903 may be generated. When the second halftone image data shown in FIGS. 16A and 16B is referred to, correction values contained in the halftone correction data (FIGS. 15A and 15B) for the pixel P3 are added especially around the pixel P3. In contrast, when the second halftone image data shown in FIGS. 21A and 21B according to the second embodiment is referred to, correction values contained in halftone correction data output from the addition processing unit 1904 are added or subtracted in pixels P7, P8, and P9 around the pixel P3. Compared to the first embodiment, the second embodiment can execute correction processing at higher resolution.

As described above, according to the second embodiment, data representing a quantization error arising from halftone processing for input image data is separated into positive data and negative data, and quantization processing is performed independently for the positive data and negative data, generating halftone correction data. The first halftone image data having undergone halftone processing can be corrected at higher resolution, compared to the first embodiment. In particular, correction data are generated for the first halftone image data separately for pixels in which the density is to be increased by correction, and those in which the density is to be decreased. A quantization error arising from halftone processing can be corrected more properly.

Note that the second and third quantization processing units 1902 and 1903 perform error diffusion processing to quantize respective input data into positive and negative gradation values in the second embodiment, but may execute common error diffusion processing. In this case, positive data and negative data separated by the separation processing unit 1901 are stored in different buffers. Then, a common error diffusion processing circuit sequentially quantizes these data. As for negative data, the data polarity is inverted from negative to positive before error diffusion processing, and after error diffusion processing, inverted again from positive to negative. Even when this processing is employed, the same processing as processing having the above-described effects can be implemented, obtaining the same effects.

The second and third quantization processing units 1902 and 1903 may execute different halftone processes. For example, the second quantization processing unit 1902 may perform error diffusion processing, and the third quantization processing unit 1903 may perform processing according to the ordered dither method. When the ordered dither method is adopted, information about thresholds necessary for dither processing are supplied as control information from a control information generation unit 304 of a CPU 225 to the quantization error processing unit 308.

Third Embodiment

In the first and second embodiments, quantization error data based on halftone processing (first quantization) is not used directly as correction data for the first halftone image data, but data obtained by performing the second quantization is used as correction data. In the third embodiment, the first halftone image data is corrected using quantization error data, and then the second quantization is performed for the corrected data.

Figure 22:
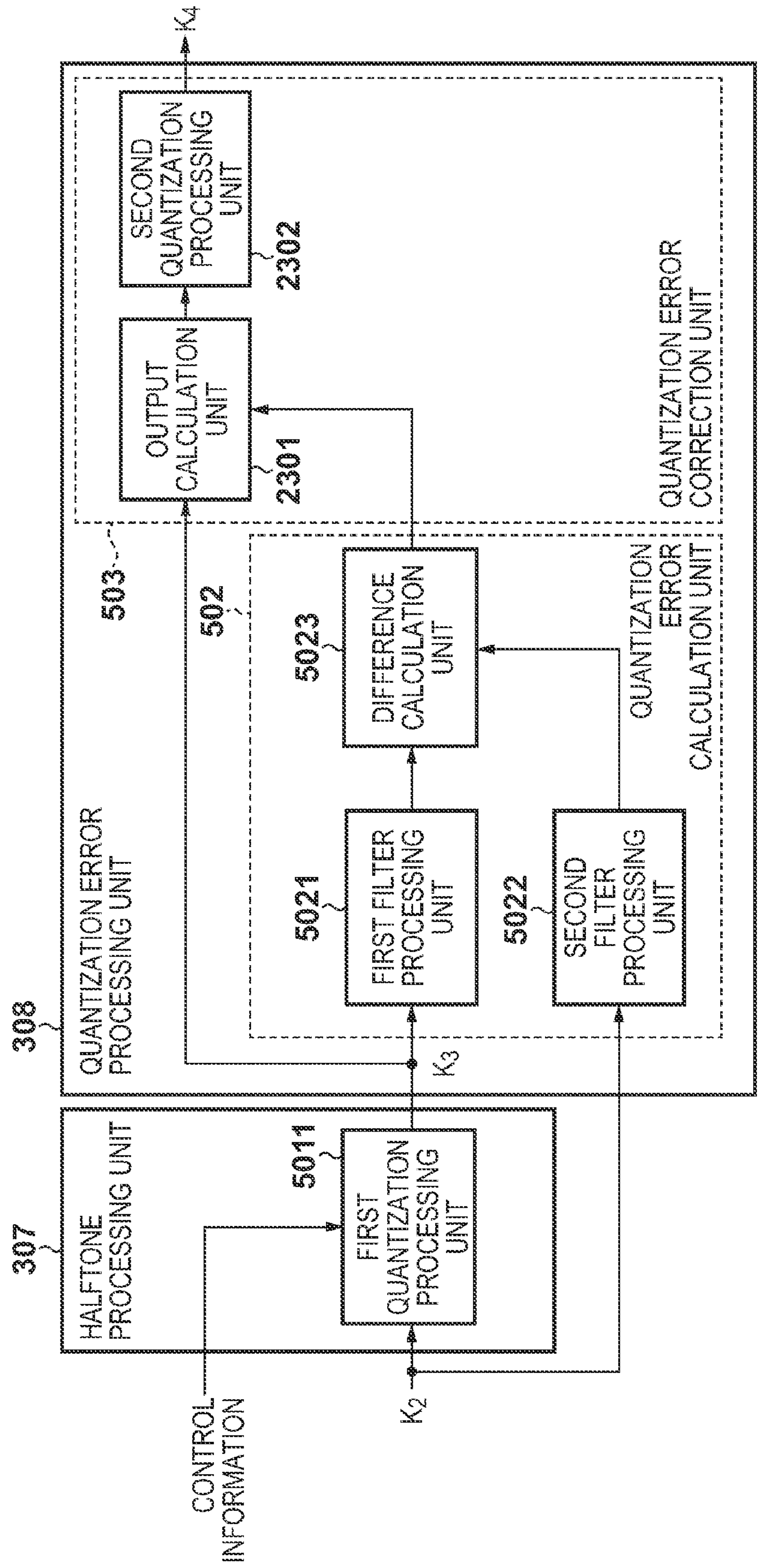
FIG. 22 is a block diagram exemplifying the arrangements of a halftone processing unit 307 and quantization error processing unit 308 according to the third embodiment.

An example of the arrangements of a halftone processing unit 307 and quantization error processing unit 308 according to the third embodiment, and an outline of processes to be executed by them will be explained with reference to FIG. 22. In the third embodiment, unlike the first embodiment (FIG. 5), quantization error data output from a quantization error calculation unit 502 is input to an output calculation unit 2301 before input to a second quantization processing unit 2302 in a quantization error correction unit 503. Note that the halftone processing unit 307 and quantization error calculation unit 502 are the same as those in the first embodiment (FIG. 5), and a description thereof will not be repeated.

The output calculation unit 2301 corrects a quantization error arising from halftone processing that is quantization error data input from the quantization error calculation unit 502 and is contained in the first halftone image data. More specifically, the output calculation unit 2301 corrects the first halftone image data by adding the quantization error data to the first halftone image data for each pixel. The first halftone image data is data of three gradations (minimum: 0, maximum: 2), and the quantization error data is data of 256 gradations (minimum: 0, maximum 255).

The output calculation unit 2301 normalizes the first halftone image data by multiplying each pixel value of the first halftone image data by 255/2 so that the maximum value becomes 255. Accordingly, the numbers of gradations of both the first halftone image data and quantization error data are adjusted to 256. Thereafter, the output calculation unit 2301 adds these two data.

Correction processing (addition processing) by the output calculation unit 2301 provides corrected halftone image data shown in FIGS. 17A and 17B. When a printer 10 forms a toner image based on this halftone image data, the correction value may not be reproduced as an image, and no correction effect may be obtained, as described in the first embodiment. That is, a toner image may not be formed satisfactorily.

To prevent this, in the third embodiment, the corrected halftone image data output from the output calculation unit 2301 is input to the second quantization processing unit 2302 and quantized. In the third embodiment, the number of quantized values (number of quantization levels) in the second quantization by the second quantization processing unit 2302 is set to be equal to the number of quantization levels in the first quantization by a first quantization processing unit 5011. For example, when the first quantization processing unit 5011 performs quantization at a quantization level number of 3, that is, three levels (0, 1, and 2), the second quantization processing unit 2302 also performs quantization at a quantization level number of 3, that is, three levels (0, 1, and 2).

Hence, the tonality of image data quantized by the first quantization can be maintained before and after correction by the quantization error correction unit 503. A flat image requiring no correction essentially can maintain granularity. In the third embodiment, the second quantization processing unit 2302 performs quantization processing based on error diffusion processing, and has the same arrangement as that of the second quantization processing unit 5031 (FIG. 12) in the first embodiment.

Figures 23A, 23B:
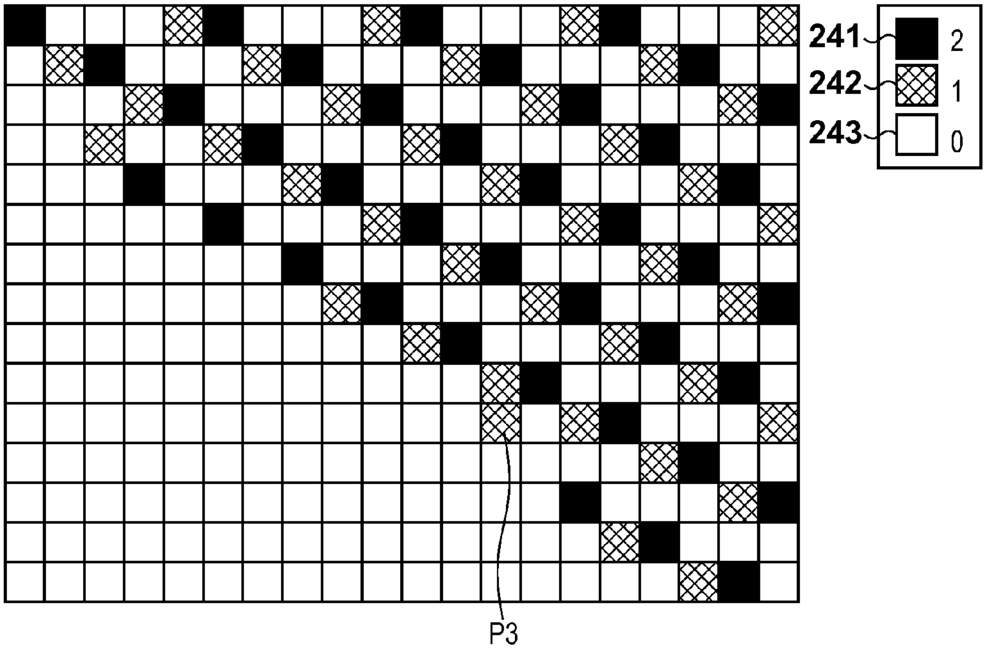
FIGS. 23A and 23B are views exemplifying the second halftone image data obtained by a printer 10 according to the third embodiment.

FIG. 23A shows image data obtained by performing quantization processing by the second quantization processing unit 2302 for the corrected halftone image data shown in FIGS. 17A and 17B that is output from the output calculation unit 2301. FIG. 23B visually shows the respective pixel values shown in FIG. 23A using pixel signs 241 to 243. In FIGS. 23A and 23B, for example, the pixel value of the pixel P3 changes from "0" to "1" upon quantization by the second quantization processing unit 2302. A quantization error arising from halftone processing by the halftone processing unit 307 has been corrected.

As described above, similar to the first embodiment, the third embodiment can stably correct a quantization error generated by halftone processing, and reduce image degradation such as a jaggy or thin line disconnection.

Fourth Embodiment

In the second embodiment, correction data for a halftone quantization error generated by halftone processing (first quantization) is quantized (second quantization) by error diffusion processing in the second and third quantization processing units 1902 and 1903. In the fourth embodiment, quantization in second and third quantization processing units 1902 and 1903 adopts the ordered dither method as a modification to the second embodiment. Also, the fourth embodiment will describe a more detailed arrangement and processing sequence of a first quantization processing unit 5011 which performs the first quantization for input image data.

The fourth embodiment is almost the same as the second embodiment except that the second quantization uses the ordered dither method and the first quantization quantizes input image data into halftone image data of not three gradations but five gradations. The fourth embodiment will mainly explain processing regarding K color. When executing processing regarding the remaining C, M, and Y colors, this can be implemented by the same processing as processing regarding K color. Processes to be executed by a halftone processing unit 307, quantization error calculation unit 502, and quantization error correction unit 503 will be described in order based on the arrangement shown in FIG. 18 that has been described in the second embodiment.

<Processing by Halftone Processing Unit 307>

An example of the arrangement of the first quantization processing unit 5011 in the halftone processing unit 307, and processing to be executed by the first quantization processing unit 5011 will be explained with reference to FIGS. 24A to 24D. In the fourth embodiment, the first quantization processing unit 5011 converts (quantizes) grayscale image data of 256 gradations input from a gamma correction unit 306 in which each pixel takes a pixel value of 0 to 255, into the first halftone image data at five gradations of 0 to 4. In input image data, white is expressed by a pixel value of 0, and black is expressed by a pixel value of 255. In the first halftone image data, white is expressed by a pixel value of 0, and black is expressed by a pixel value of 4. Similar to the second embodiment, the second halftone image data which is output by correcting the quantization error of the first halftone image by a quantization error processing unit 308 is also image data of five gradations.

The embodiment assumes that the first and second halftone image data and an exposure control signal $T_k$ output from a PWM processing unit 309 are expressed by the same number of gradations (=5). That is, the PWM processing unit 309 generates exposure control signals $T_k$ for setting the per-dot laser emission width of an exposure unit 24K to 0%, 25%, 50%, 75%, and 100% in correspondence with the gradation values of 0, 1, 2, 3, and 4 for respective pixels contained in the second halftone image data.

Note that grayscale image data of 256 gradations is converted into the first halftone image data expressed by five gradations per pixel in the embodiment, but may be converted into halftone image data expressed by a different number of gradations. Needless to say, halftone processing can be executed even for color image data by executing the same processing not only for grayscale (K) image data but also for Y, M, and C image data.

Figure 24A:
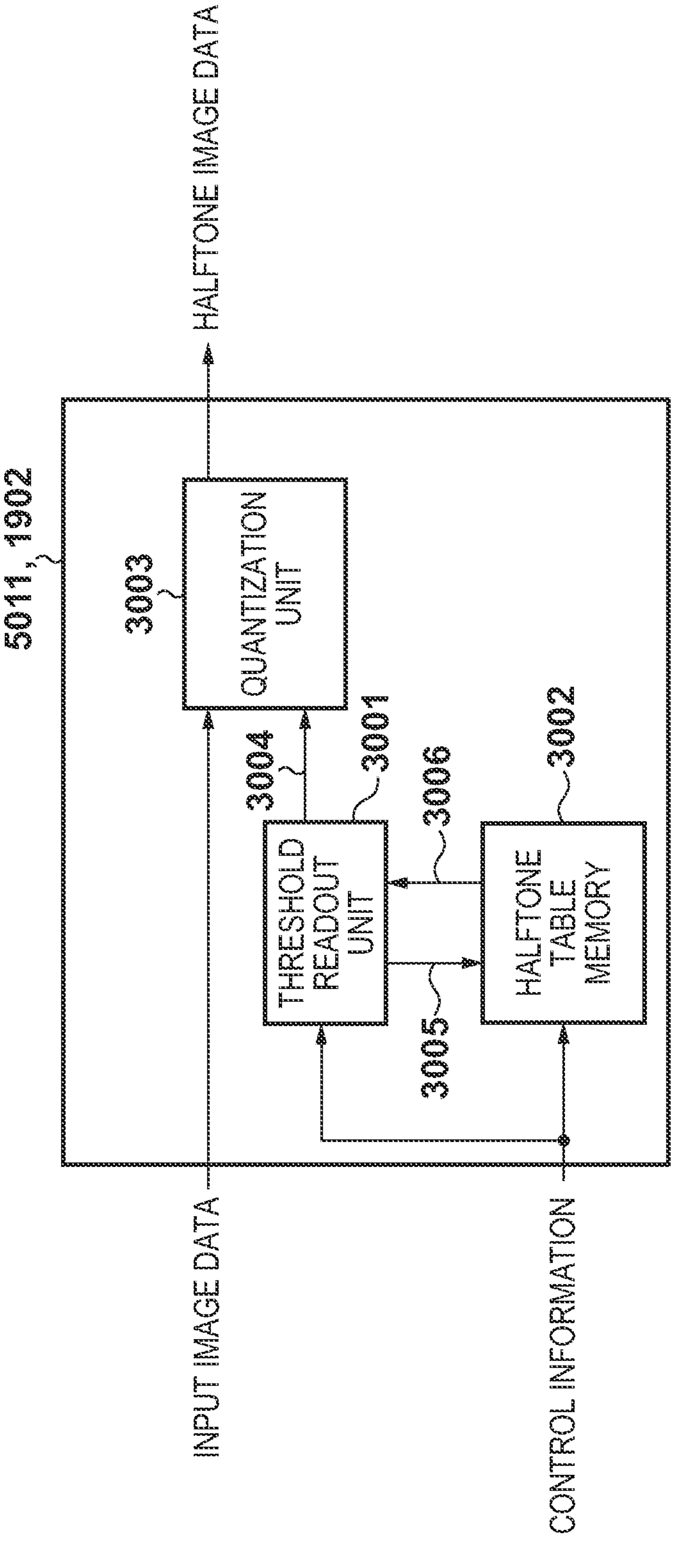
FIG. 24A is a block diagram exemplifying the arrangements of first and second quantization processing units 5011 and 1902 according to the fourth embodiment.

FIG. 24A exemplifies the arrangement of the first quantization processing unit 5011. The first quantization processing unit 5011 includes a threshold readout unit 3001, halftone table memory 3002, and quantization unit 3003. FIGS. 24B and 24C exemplify a halftone table used when the quantization processing unit 5011 performs quantization processing (dither processing). Similar to the first embodiment (FIG. 6), the halftone table contains information about thresholds to be used when executing dither processing for each pixel in input image data, and is formed from a threshold number table 3010 and threshold table 3020. The halftone table is stored in the halftone table memory 3002, read out by the threshold readout unit 3001, and used in quantization processing by the quantization unit 3003. Note that the halftone table is provided as control information from a CPU 225 to the quantization error processing unit 308.

As shown in FIG. 24B, the threshold number table 3010 contained in the halftone table has a form in which a single block is repetitively laid out using, as a minimum unit, a block 3011 formed from five elements that define threshold numbers of 0 to 4 and correspond to five pixels. Similar to the second embodiment, the gradation is changed for every element (pixel) within the block 3011 contained in the threshold number table 3010 to change the area ratio. Image data after halftone processing can express a larger number of gradations.

Figure 24D:
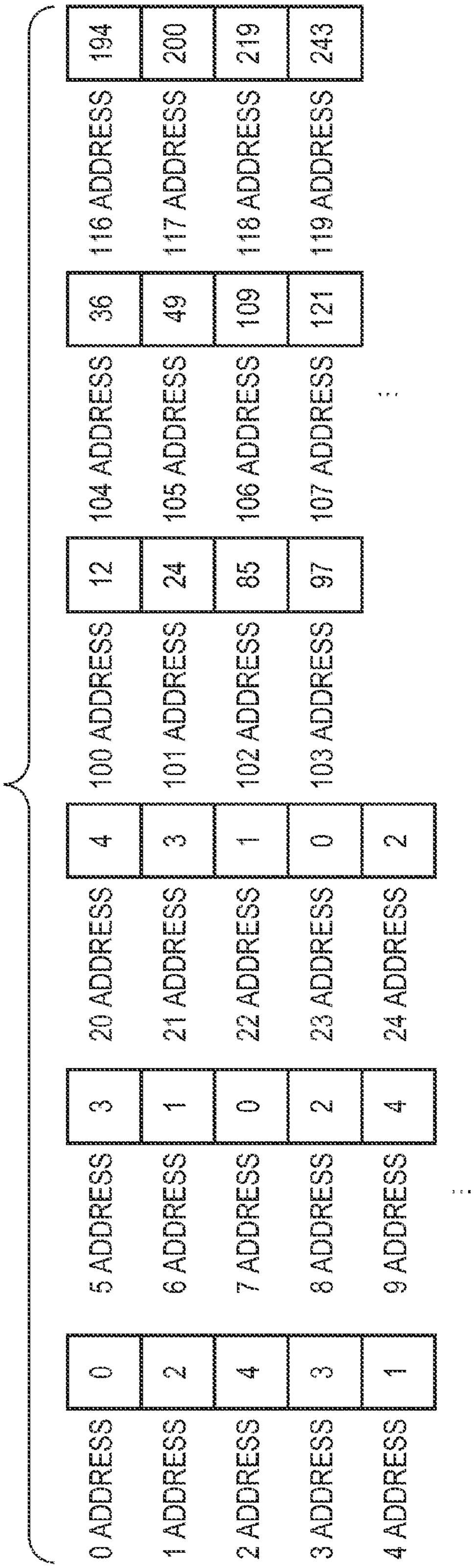
FIG. 24D is a view exemplifying a state in which the halftone table is stored in a halftone table memory 3002.

FIG. 24D exemplifies a state in which the halftone table memory 3002 stores the halftone table. As shown in FIG. 24D, in the halftone table memory 3002, data on the 0th row of the threshold number table 3010 are stored at addresses 0 to 4, data on the first row are stored at addresses 5 to 9, and data on the second to fourth rows are stored in the same way. Data on the 0th row of the threshold table 3020 are stored at addresses 100 to 103, data on the first row are stored at addresses 104 to 107, and data on the second to fourth rows are also stored in the same manner.

The threshold readout unit 3001 reads out threshold data 3004 containing the threshold number table 3010 and threshold table 3020 from the halftone table memory 3002, and outputs it to the quantization unit 3003. The quantization unit 3003 quantizes input image data based on the input threshold data 3004, and outputs the obtained image data as the first halftone image data. The quantization unit 3003 performs dither processing for the input image data using the block 3011 of the threshold number table 3010 as a minimum unit in a repetitive cycle defined by the block using thresholds corresponding to a threshold number in the block that are contained in the threshold table 3020. The quantization unit 3003 generates the first halftone image data from the input image data, and outputs it.

(Processing by Threshold Readout Unit 3001)

The threshold readout unit 3001 will be described with reference to FIGS. 25A and 25B. FIG. 25A is a block diagram showing the arrangement of the threshold readout unit 3001. FIG. 25B is a flowchart showing a processing sequence to be executed by the threshold readout unit 3001. The threshold readout unit 3001 includes a row number counter 3101, column number counter 3102, readout address calculation unit 3103, and threshold generation unit 3104. The row number counter 3101 and column number counter 3102 are counters for row and column numbers to sequentially specify a pixel of interest to undergo quantization processing in input image data.

After the start of threshold readout processing by the threshold readout unit 3001, first, the readout address calculation unit 3103 reads out a row number from the row number counter 3101 and calculates a remainder by dividing the readout row number by 5 (step S3101). Then, the readout address calculation unit 3103 reads out a column number from the column number counter 3102, and calculates a remainder by dividing the readout column number by 5 (step S3102). In this case, MOD(row number, 5) is a value obtained in step S3101, and MOD(column number, 5) is a value obtained in step S3102.

The readout address calculation unit 3103 calculates a threshold number table address indicating a storage area where the threshold number table 3010 is stored in the halftone table memory 3002 (step S3103). In FIG. 24D, the threshold number table address can be calculated by the following equation:

$$(\text{threshold number table address}) = \text{MOD}(\text{row number}, 5) \times 5 + \text{MOD}(\text{column number}, 5)$$

By using the threshold number table address calculated using the above equation, the readout address calculation unit 3103 reads out a threshold number from the threshold number table 3010 stored in the halftone table memory 3002 (step S3104). Based on the readout threshold number, the readout address calculation unit 3103 calculates a threshold table address indicating a storage area where the threshold table 3020 is stored in the halftone table memory 3002 (step S3105). In FIG. 24D, the threshold table address can be calculated by the following equation:

$$(\text{threshold table address}) = 100 + (\text{threshold number}) \times 4$$

The readout address calculation unit 3103 reads out thresholds Th1 to Th4 from the threshold table 3020 using the calculated threshold table address (step S3106). In the halftone table memory 3002, Th1, Th2, Th3, and Th4 are stored in order at addresses (threshold table address+0), (threshold table address+1), (threshold table address+2), and (threshold table address+3). The readout address calculation unit 3103 outputs the readout thresholds Th1 to Th4 to the threshold generation unit 3104.

The threshold generation unit 3104 outputs, as the threshold data 3004 to the quantization unit 3003, the thresholds Th1 to Th4 input from the readout address calculation unit 3103 (step S3107). The threshold readout unit 3001 determines whether processing of one row of the input image data has ended (step S3108). If the processing has ended, the threshold readout unit 3001 updates the row number counter 3101 by incrementing it (step S3109), and clears the column number counter to 0 (step S3110). If processing of one row of the input image data has not ended, the threshold readout unit 3001 updates the column number counter by incrementing it (step S3111).

Finally, the threshold readout unit 3001 determines whether processing of all pixels in the input image data has ended (step S3112). If the processing has ended, a series of processes ends. If the processing has not ended, the process returns to step S3101 to execute the processes in steps S3101 to S3112 again.

By the above processing, the same thresholds are applied to, for example, pixels on the fifth row and those on the 0th row out of pixels contained in input image data, and the same thresholds are applied to pixels on the sixth row and those on the first row. This also applies to columns. The same thresholds are applied to, for example, pixels on the fifth column and those on the 0th column out of pixels contained in input image data, and the same thresholds are applied to pixels on the sixth column and those on the first column. In this manner, the threshold number table 3010 shown in FIG. 24B is cyclically applied to pixels on respective rows and respective columns contained in input image data.

(Processing by Quantization Unit 3003)

Figure 26:
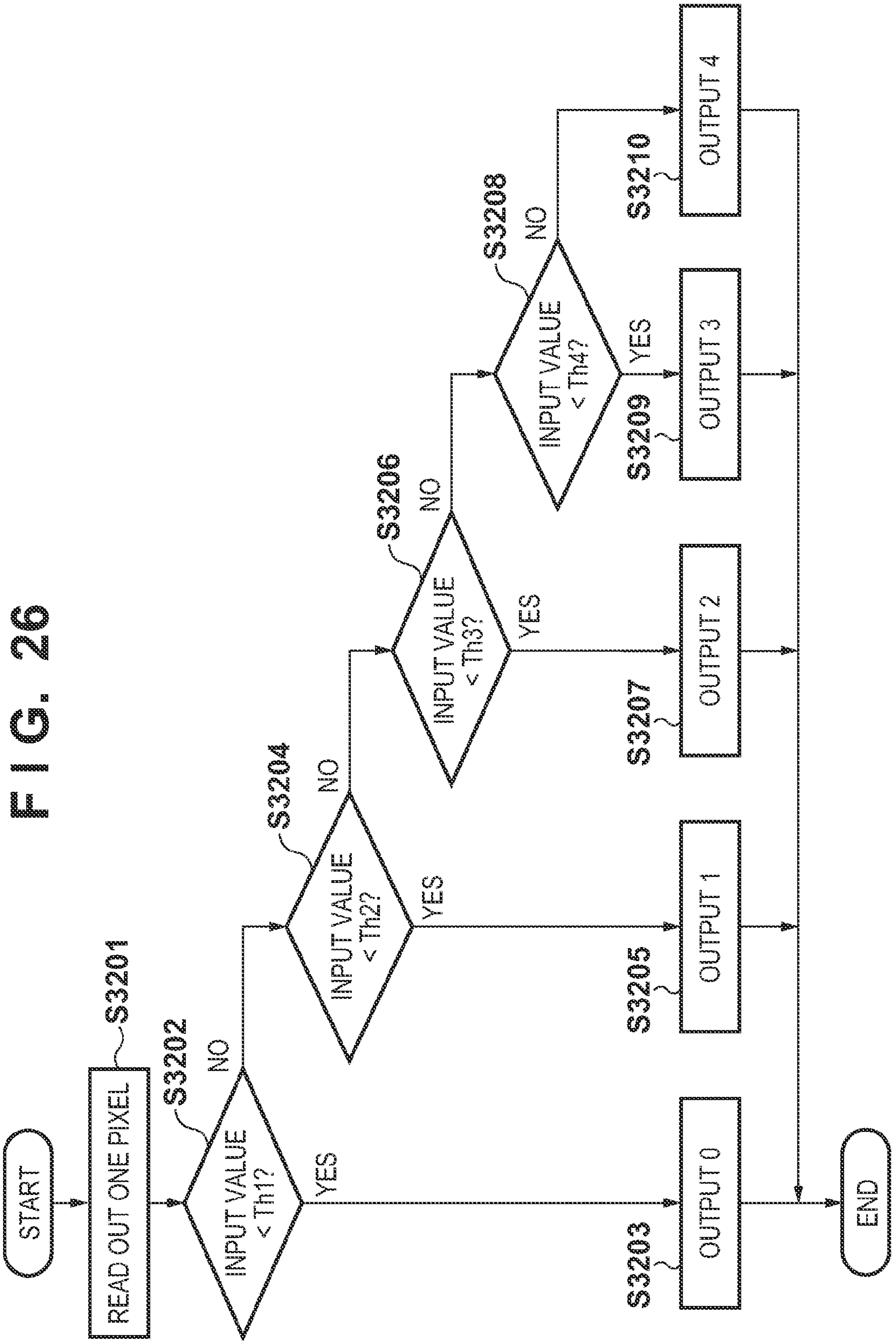
FIG. 26 is a flowchart showing a processing sequence to be executed by a quantization unit 3003 according to the fourth embodiment.

Processing to be executed by the quantization unit 3003 will be explained with reference to FIG. 26. After the start of quantization by the first quantization processing unit 5011, the quantization unit 3003 reads out the pixel value of one pixel of interest as an input value (step S3201), and compares the input value with the threshold Th1 (step S3202). If the input value is smaller than the threshold Th1, the quantization unit 3003 outputs "0" as the quantized value (step S3203). If the input value is equal to or larger than the threshold Th1, the quantization unit 3003 compares the input value with the threshold Th2 (step S3204). If the input value is smaller than the threshold Th2, the quantization unit 3003 outputs "1" as the quantized value (step S3205). If the input value is equal to or larger than the threshold Th2, the quantization unit 3003 compares the input value with the threshold Th3 (step S3206). If the input value is smaller than the threshold Th3, the quantization unit 3003 outputs "2" as the quantized value (step S3207). If the input value is equal to or larger than the threshold Th3, the quantization unit 3003 compares the input value with the threshold Th4 (step S3208). If the input value is smaller than the threshold Th4, the quantization unit 3003 outputs "3" as the quantized value (step S3209). If the input value is equal to or larger than the threshold Th4, the quantization unit 3003 outputs "4" as the quantized value (step S3210). The quantization unit 3003 then ends the process. By the above processing, the quantization unit 3003 quantizes each pixel value contained in input image data into one of five quantized values based on the four thresholds Th1 to Th4.

Figures 27A, 27B:
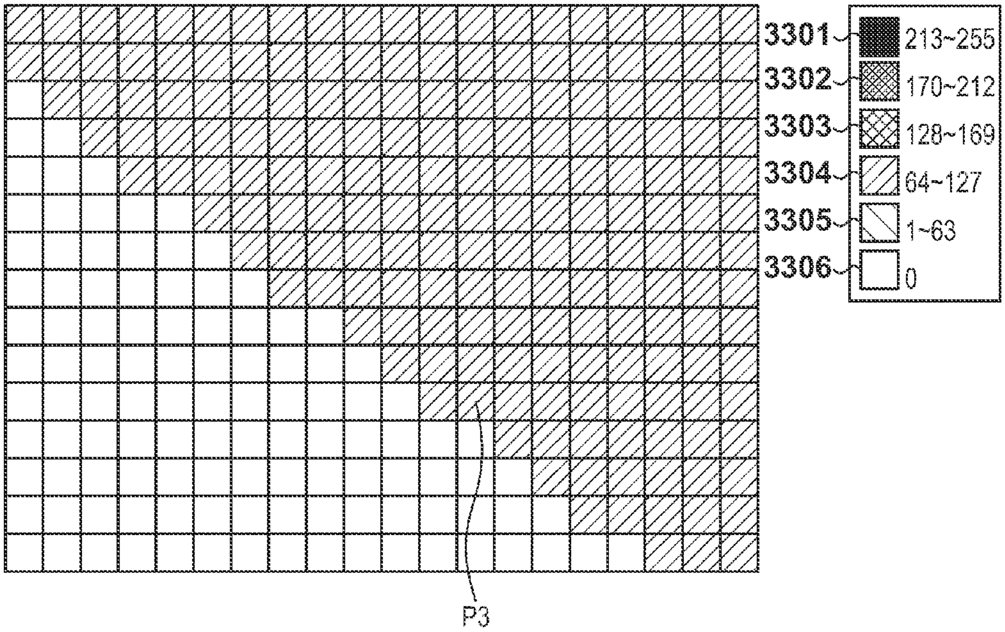
FIGS. 27A and 27B are views exemplifying input image data according to the fourth embodiment.

FIGS. 27A and 27B exemplify image data input to the first quantization processing unit 5011. The image data contains a flat portion and edge portion. FIG. 27A shows input image data, and FIG. 27B visually shows the input image data in FIG. 27A using pixel signs 3301 to 3306.

For example, since P1 on the first row and second column has a pixel value "87" in the input image data, MOD(row number,5)=1,MOD(column number,5)=2

The threshold readout unit 3001 obtains a threshold number "0" from address 7 in the halftone table memory 3002. By referring to addresses 100 to 103 in the halftone table memory 3002, the threshold readout unit 3001 obtains Th1=12, Th2=24, Th3=85, and Th4=97 as thresholds corresponding to the threshold number "0". The quantization unit 3003 compares the pixel value "87" in the input image data with the thresholds Th1 to Th4, obtaining "3" as the quantized value based on the processing in FIG. 26.

For example, a pixel P2 on the 0th row and seventh column has a pixel value "87" in the input image data, similar to the pixel P1. However, MOD(row number,5)=0,MOD(column number,5)=2

Thus, the threshold readout unit 3001 obtains the threshold number "4" from address 2 in the halftone table memory 3002. By referring to addresses 116 to 119 in the halftone table memory 3002, the threshold readout unit 3001 obtains Th1=194, Th2=200, Th3=219, and Th4=243 as the thresholds corresponding to the threshold number "4". The quantization unit 3003 compares the pixel value "87" in the input image data with the thresholds Th1 to Th4, obtaining "0" as the quantized value based on the processing in FIG. 26.

Figures 28A, 28B:
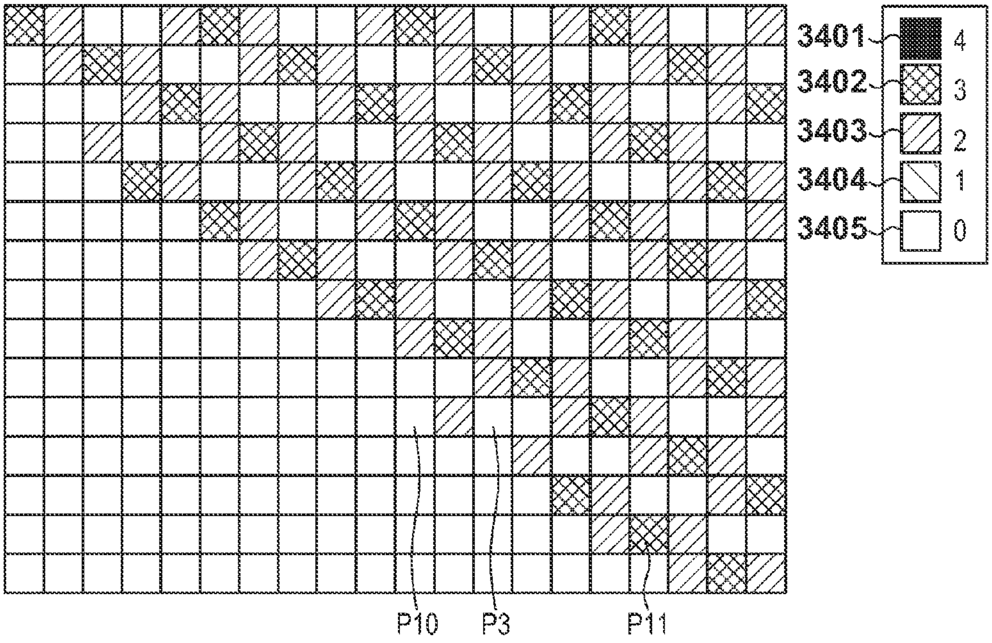
FIGS. 28A and 28B are views exemplifying the first halftone image data according to the fourth embodiment.

The first quantization processing unit 5011 generates the first halftone image data by repetitively applying halftone processing (quantization processing) based on dither processing to input image data using the block 3011 as a minimum unit. The first quantization processing unit 5011 performs halftone processing for all pixels contained in the input image data. As a result, the first halftone image data shown in FIGS. 28A and 28B is obtained from the input image data shown in FIGS. 27A and 27B. FIG. 28A shows the first halftone image data, and FIG. 28B visually shows the first halftone image data in FIG. 28A using pixel signs 3401 to 3405.

In the embodiment, halftone processing by the first quantization processing unit 5011 converts input image data of 256 gradations shown in FIGS. 27A and 27B into the first halftone image data expressed by five gradations (minimum value: 0, maximum value: 4) per pixel as shown in FIGS. 28A and 28B. A comparison between the input image data shown in FIGS. 27A and 27B and the first halftone image data shown in FIGS. 28A and 28B reveals that, for example, a jaggy is generated in the pixel P3. The quantization error processing unit 308 needs to correct the jaggy, similar to the second embodiment.

In the embodiment, dither processing is executed in a repetitive cycle defined by the block 3011, but may be performed in a different cycle. The number of gradations after conversion of image data by dither processing is not limited to five, and may be different.

<Processing by Quantization Error Calculation Unit 502>

Figure 18:
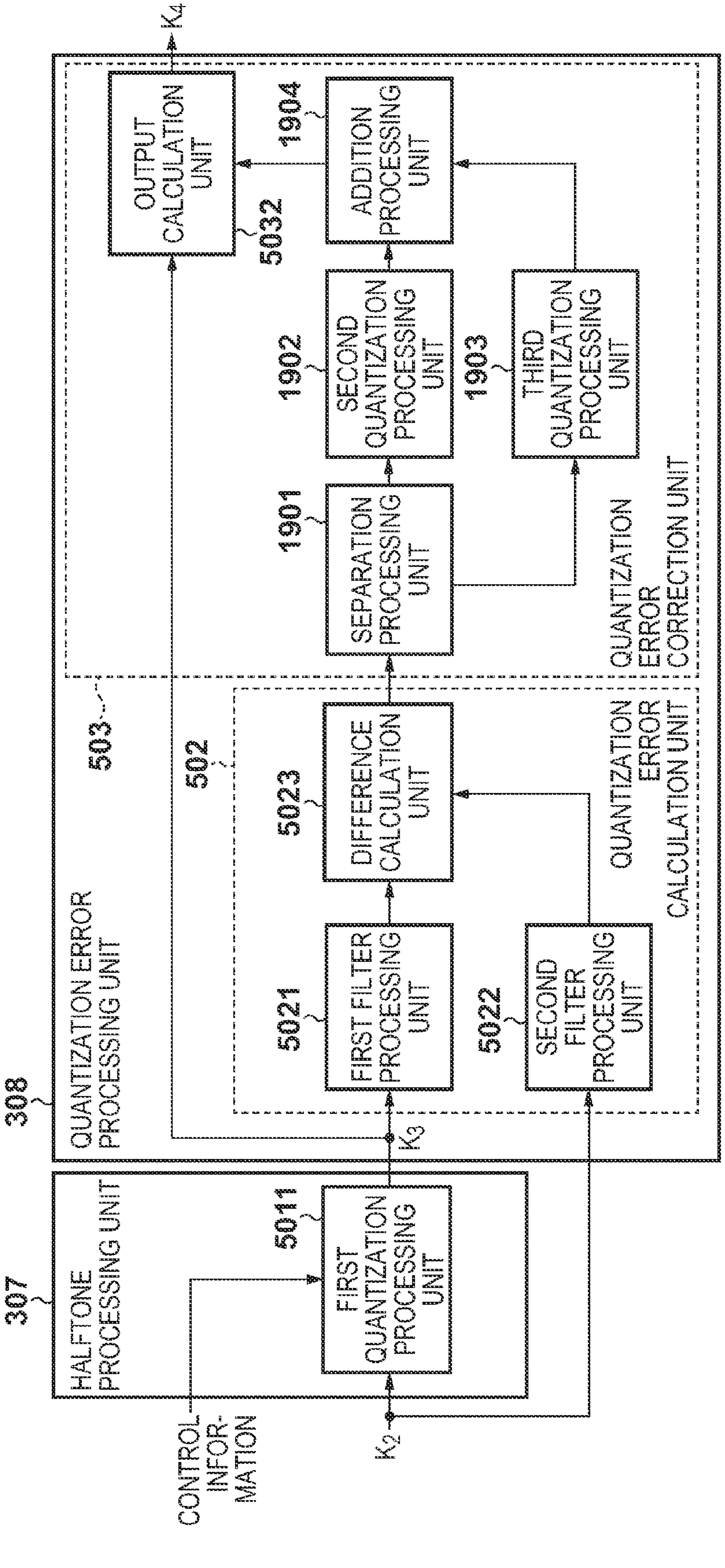
FIG. 18 is a block diagram exemplifying the arrangements of a halftone processing unit 307 and quantization error processing unit 308 according to the second embodiment.

Similar to the second embodiment, the first halftone image data (FIGS. 28A and 28B) output from the first quantization processing unit 5011 is input to the quantization error processing unit 308, and supplied to the quantization error calculation unit 502 and quantization error correction unit 503, as shown in FIG. 18. The input image data (FIGS. 27A and 27B) output from the gamma correction unit 306 is also input to the quantization error processing unit 308, and supplied to the quantization error calculation unit 502. The quantization error calculation unit 502 generates quantization error data by executing the same processing as that in the second embodiment based on the input image data (FIGS. 27A and 27B) and the first halftone image data (FIGS. 28A and 28B). Filter processes in first and second filter processing units 5021 and 5022 are executed in correspondence with the block 3011 of the halftone table used in the first quantization processing unit. Folding processing at the end of image data to be processed by the first and second filter processing units 5021 and 5022 is executed similarly to the second embodiment. Quantization error data generated as the result of the calculation by the quantization error calculation unit 502 is output to the quantization error correction unit 503.

<Processing by Quantization Error Correction Unit 503>

Quantization error data input to the quantization error correction unit 503 is supplied to a separation processing unit 1901, as shown in FIG. 18. Similar to the second embodiment, the separation processing unit 1901 separates positive data and negative data contained in the input quantization error data, and outputs the separated positive data and negative data to the second and third quantization processing units 1902 and 1903, respectively.

FIGS. 29A to 29D exemplify image data obtained by separating, by the separation processing unit 1901, positive data and negative data contained in quantization error data obtained based on the first halftone image data (FIGS. 28A and 28B). In FIGS. 29A and 29C show image data (first correction data) obtained by separating positive data, and FIGS. 29B and 29D show image data (second correction data) obtained by separating negative data. FIGS. 29C and 29D visually show the pixel values of the respective pixels shown in FIGS. 29A and 29B using pixel signs 3501 to 3505.

In the fourth embodiment, the second quantization processing unit 1902 out of the second and third quantization processing units 1902 and 1903 shown in FIG. 18 has the same arrangement as that of the first quantization processing unit 5011 (FIG. 24A), and executes the same processing. However, the second quantization processing unit 1902 is different from the first quantization processing unit 5011 only in that data to be processed is not input image data from the gamma correction unit 306, but image data (first correction data) corresponding to positive data of quantization error data. Further, the second quantization processing unit 1902 performs quantization processing for the first input correction data using the same halftone table as the halftone table (threshold number table 3010 and threshold table 3020) used in the first quantization processing unit 5011. The CPU 225 suffices to write, in the halftone table memory 3002 of the second quantization processing unit 1902, the same data as data (FIG. 24C) written in the halftone table memory 3002 of the first quantization processing unit 5011.

Figure 30:
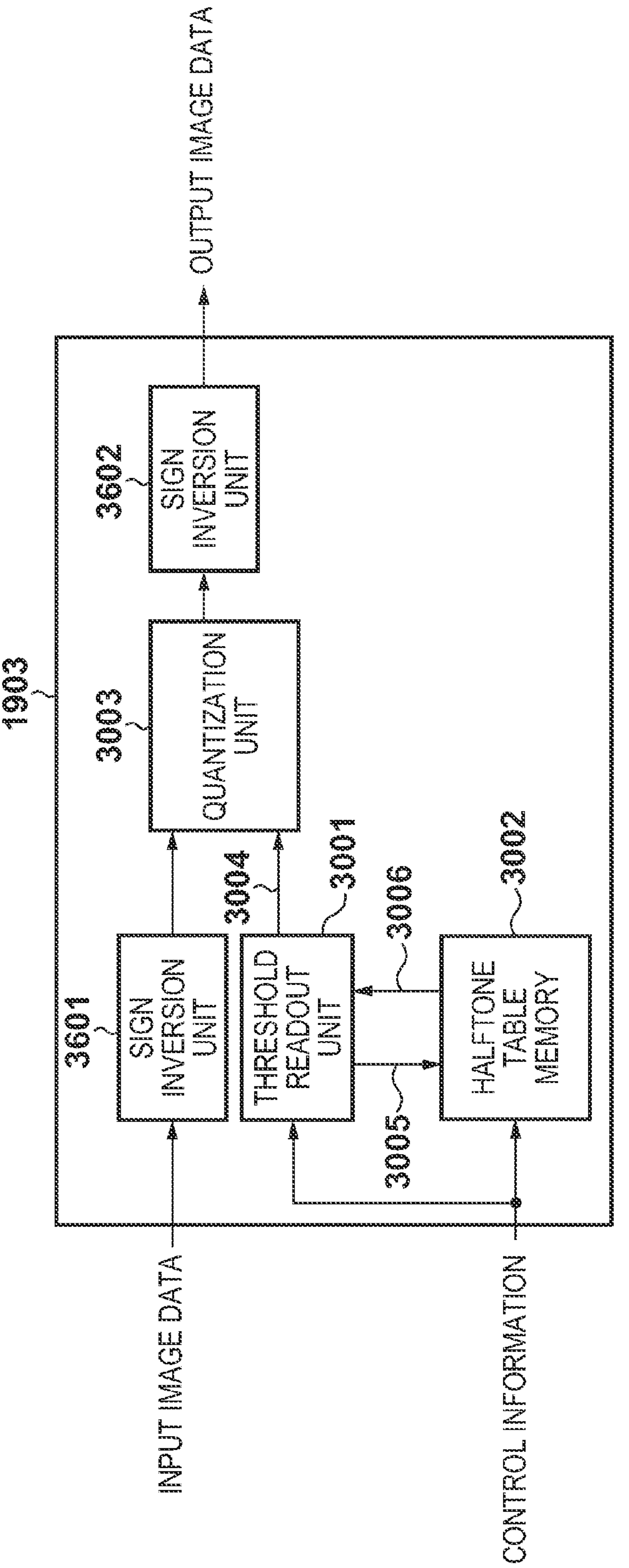
FIG. 30 is a block diagram exemplifying the arrangement of a third quantization processing unit 1903 according to the fourth embodiment.

In the fourth embodiment, the arrangement of the third quantization processing unit 1903 is slightly different from those of the first quantization processing unit 5011 and second quantization processing unit 1902. FIG. 30 shows the arrangement of the third quantization processing unit 1903. The third quantization processing unit 1903 is configured by adding first and second sign inversion units 3601 and 3602 to the arrangement of the first quantization processing unit 5011. The same reference numerals as those of the first quantization processing unit 5011 denote the same parts in FIG. 30, and a description thereof will not be repeated.

The third quantization processing unit 1903 performs quantization processing for the second data corresponding to negative data of quantization error data as data to be processed. More specifically, each pixel value in the first correction data input to the second quantization processing unit 1902 is 0 or a positive value. To the contrary, each pixel value in the second correction data input to the third quantization processing unit 1903 is 0 or a negative value. The first sign inversion unit 3601 converts a negative pixel value into a positive one by inverting the sign of each pixel value contained in the input second correction data. Note that the first sign inversion unit 3601 does not convert a pixel value of 0. The quantization unit 3003 can execute the same quantization processing as that executed by the first quantization processing unit 5011 and second quantization processing unit 1902.

The quantization unit 3003 outputs, to the second sign inversion unit 3602, data obtained by performing quantization processing for the second correction data. The quantization unit 3003 executes quantization processing for the second correction data using the same halftone table as the halftone table (threshold number table 3010 and threshold table 3020) used in the first quantization processing unit 5011. The CPU 225 suffices to write, in the halftone table memory 3002 of the third quantization processing unit 1903, the same data as data (FIG. 24C) written in the halftone table memory 3002 of the first quantization processing unit 5011. Finally, the second sign inversion unit 3602 inverts again the sign of each pixel value in the second correction data quantized by the quantization unit 3003, and outputs each pixel value as 0 or a negative pixel value.

Figure 31B:
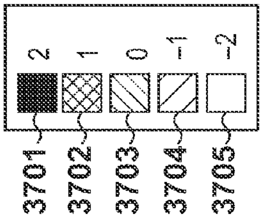
FIGS. 31A to 31D are views exemplifying data obtained by quantizing the positive components and negative components of quantization error data according to the fourth embodiment.
Figure 31B:
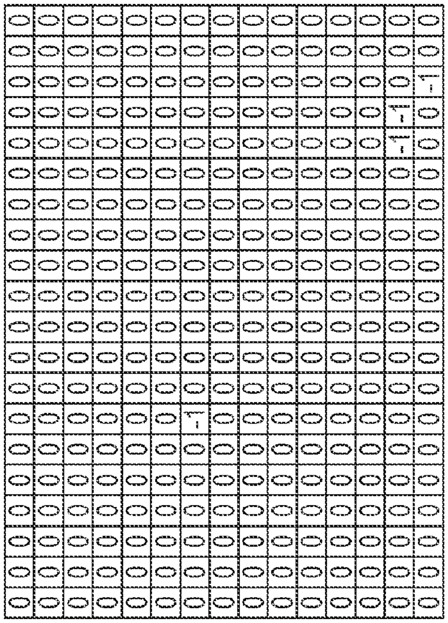
Figure 31D:
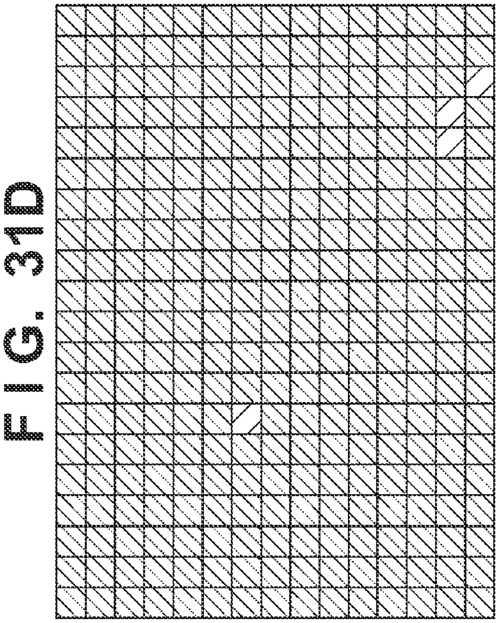
Figure 31A:
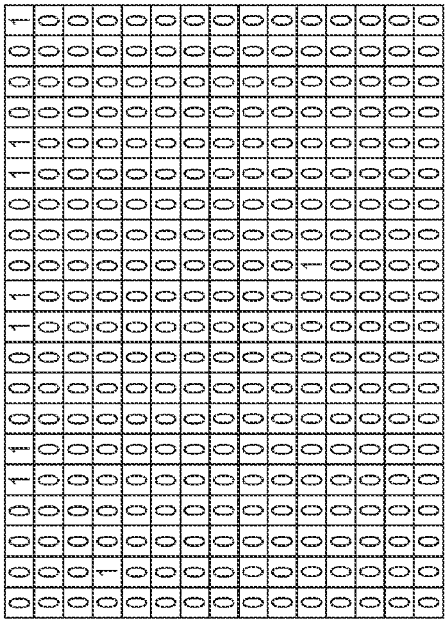
Figure 31C:
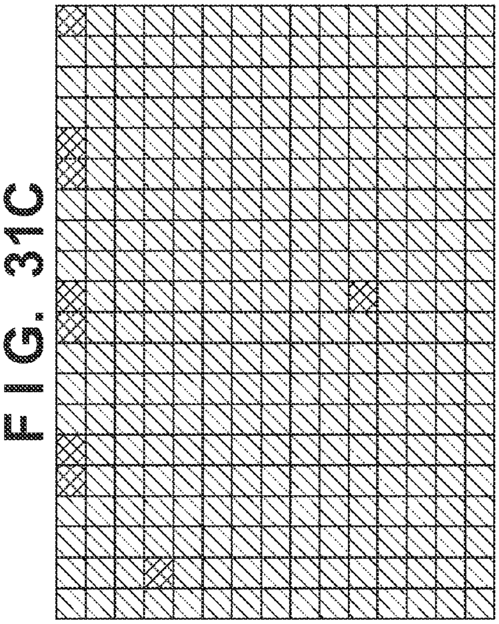

FIGS. 31A to 31D show image data obtained by performing quantization processing by the second and third quantization processing units 1902 and 1903 for image data (first and second correction data) corresponding to positive data and negative data of quantization error data shown in FIGS. 29A to 29D. FIGS. 31A and 31B show image data obtained by performing quantization processing by the second and third quantization processing units 1902 and 1903 for image data shown in FIG. 29A and image data shown in FIG. 29B. FIGS. 31C and 31D visually show the respective pixel values shown in FIGS. 31A and 31B using pixel signs 3701 to 3705.

As shown in FIG. 18, an addition processing unit 1904 receives the first and second correction data quantized by the second and third quantization processing units 1902 and 1903. Similar to the second embodiment, the addition processing unit 1904 adds an output value from the second quantization processing unit 1902 and that from the third quantization processing unit 1903 for each pixel, generating halftone correction data. The addition processing unit 1904 inputs the generated halftone correction data to an output calculation unit 5032.

Similar to the second embodiment, by using the input halftone correction data, the output calculation unit 5032 corrects the first halftone image data (FIGS. 28A and 28B) generated by the first quantization processing unit 5011. More specifically, the output calculation unit 5032 corrects the first halftone image data by adding halftone correction data to the first halftone image data for each pixel. The corrected image data is output as the second halftone image data.

FIG. 32A shows the second halftone image data obtained by adding the first halftone image data (FIGS. 28A and 28B) and the halftone correction data by the output calculation unit 5032 for each pixel. FIG. 32B visually shows the image data in FIG. 32A using pixel signs 3801 to 3805. For example, in a pixel P10, the pixel value (correction value) in the halftone correction data is a positive value (=1), and the pixel value (=1) in the second halftone image data is increased by addition processing by one from the pixel value (=0) in the first halftone image data. In a pixel P11, the pixel value (correction value) in the halftone correction data is a negative value (=−1), and the pixel value (=2) in the second halftone image data is decreased by addition processing by one from the pixel value (=3) in the first halftone image data.

A comparison between the first halftone image (FIGS. 28A and 28B) and the second halftone image (FIGS. 32A and 32B) obtained by correcting the first halftone image in the embodiment reveals that, for example, a jaggy is reduced in the pixel P10. In the embodiment, the first quantization processing unit 5011 and the second and third quantization processing units 1902 and 1903 perform quantization processing based on dither processing using the same halftone table. For this reason, halftone correction data used in correction by the quantization error correction unit 503 has the same cyclic characteristic as that of the first halftone image to be corrected. In the first halftone image data generated by the first quantization processing unit 5011, correction using halftone correction data adds positive pixel values near a pixel having a positive pixel value. That is, pixels having positive pixel values are formed collectively around a pixel to be corrected.

As described above, to form a toner image by a printer 10, an exposure unit 24K needs to continuously expose the surface of a photosensitive drum 22K. In other words, a sufficient region on the surface of the photosensitive drum 22K needs to be exposed continuously at a laser emission width to a certain degree. According to the embodiment, the first halftone image can be corrected so that pixels having positive pixel values are formed collectively around a pixel to be corrected. When forming the corrected second halftone image as a toner image on the surface of the photosensitive drum 22K, the surface of the photosensitive drum 22K can be exposed sufficiently enough to stably form the toner image.

As described above, according to the fourth embodiment, a pixel in which the image quality may degrade due to a quantization error arising from halftone processing can be detected at high accuracy. In the fourth embodiment, halftone correction data is generated by performing halftone processing (quantization processing) based on ordered dither processing for quantization error data. By using the generated halftone correction data, the correction value is converted into a value more suitable for image formation in the image forming apparatus. Hence, a quantization error generated in the first halftone image owing to halftone processing can be corrected more properly, and degradation of the quality of an output image in the image forming apparatus can be prevented.

Fifth Embodiment

In the fourth embodiment, the first, second, and third quantization processing units 5011, 1902, and 1903 include the halftone table memories 3002 individually. However, in the fourth embodiment, the halftone tables (that is, the storage contents of the halftone table memories 3002) used in the first, second, and third quantization processing units 5011, 1902, and 1903 are identical. In the fifth embodiment, therefore, halftone table memories 3002 individually arranged in the respective quantization processing units in the fourth embodiment are integrated, and the respective quantization processing units commonly refer to the single halftone table memory 3002.

Figure 33:
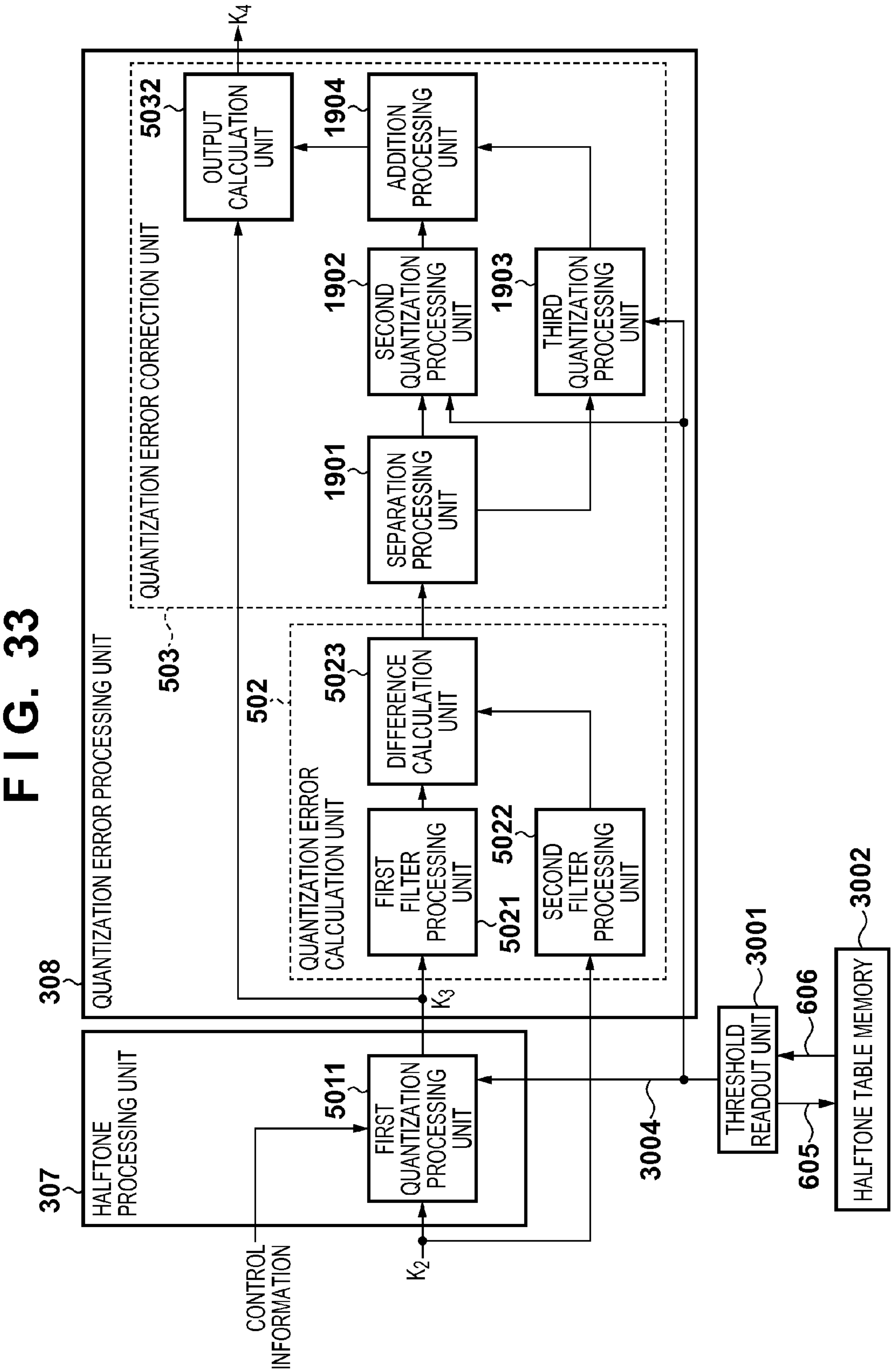
FIG. 33 is a block diagram exemplifying the arrangements of a halftone processing unit 307 and quantization error processing unit 308 according to the fifth embodiment.

The arrangements of a halftone processing unit 307 and quantization error processing unit 308 according to the fifth embodiment will be exemplified with reference to FIG. 33. In FIG. 33, the same reference numerals as those in the fourth embodiment (FIGS. 18, 24A to 24D, and 30) denote the same parts, and a description thereof will not be repeated. In the fourth embodiment, as shown in FIGS. 24A and 30, the threshold readout units 3001 and halftone table memories 3002 are individually arranged in the first, second, and third quantization processing units 5011, 1902, and 1903. In the fifth embodiment, a single threshold readout unit 3001 and the single halftone table memory 3002 are arranged outside the halftone processing unit 307 and quantization error processing unit 308. In the fifth embodiment, the threshold readout units 3001 and halftone table memories 3002 are omitted from first, second, and third quantization processing units 5011, 1902, and 1903, which will be described later.

Similar to the fourth embodiment, the threshold readout unit 3001 reads out a halftone table (threshold number table 3010 and threshold table 3020) from the halftone table memory 3002, and outputs the readout data as threshold data 3004. In the fifth embodiment, unlike the fourth embodiment, the threshold data 3004 output from the threshold readout unit 3001 is provided to the first, second, and third quantization processing units 5011, 1902, and 1903.

Figure 34A:
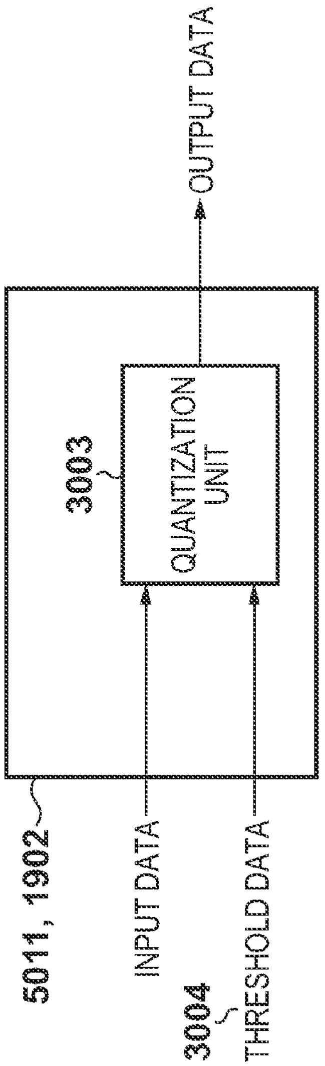
FIGS. 34A and 34B are block diagrams exemplifying the arrangements of first, second, and third quantization processing units 5011, 1902, and 1903 according to the fifth embodiment.
Figure 34B:
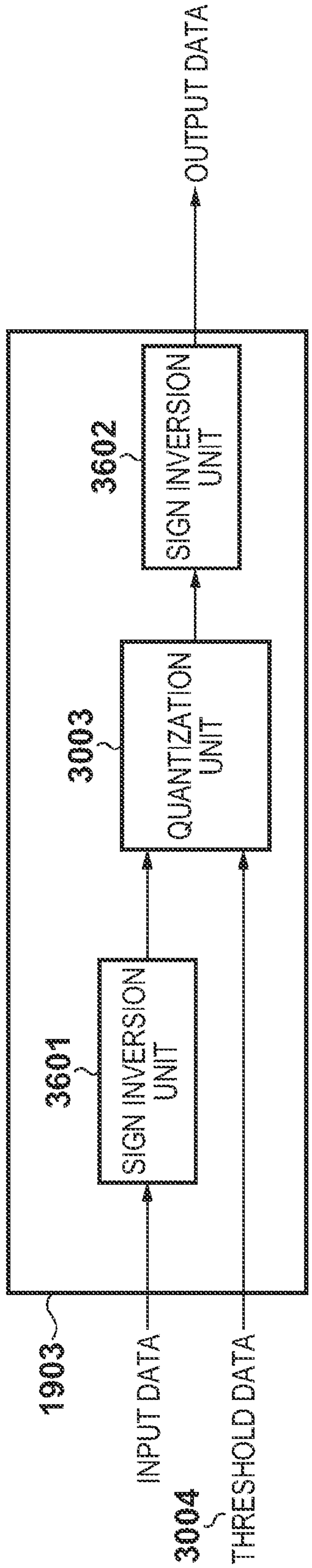

FIG. 34A exemplifies the arrangements of the first and second quantization processing units 5011 and 1902, and FIG. 34B exemplifies the arrangement of the third quantization processing unit 1903. Note that the first and second quantization processing units 5011 and 1902 have the same arrangement. In the fifth embodiment, unlike the fourth embodiment (FIGS. 24A to 24D and 30), the first, second, and third quantization processing units 5011, 1902, and 1903 are configured by omitting the threshold readout units 3001 and halftone table memories 3002. The quantization units 3003 of the first, second, and third quantization processing units 5011, 1902, and 1903 execute halftone processing (quantization processing) based on dither processing using the threshold data 3004 provided from the single threshold readout unit 3001 arranged outside. Note that the function of the quantization unit 3003 is the same as that in the fourth embodiment, and a description thereof will not be repeated.

In the fifth embodiment, the first, second, and third quantization processing units 5011, 1902, and 1903 have the same functions as those in the fourth embodiment except for arrangements regarding the threshold readout unit 3001 and halftone table memory 3002. The second halftone image data obtained in the fifth embodiment is also the same as that in the fourth embodiment.

As described above, according to the fifth embodiment, the single threshold readout unit 3001 provides threshold data to the first, second, and third quantization processing units 5011, 1902, and 1903. The halftone table memories 3002 need not be arranged individually in the first, second, and third quantization processing units 5011, 1902, and 1903, and it suffices to prepare the single halftone table memory 3002. In addition to the effects of the fourth embodiment, the fifth embodiment can reduce the apparatus cost by decreasing the number of halftone table memories 3002.

Sixth Embodiment

In the fourth and fifth embodiments, the first, second, and third quantization processing units 5011, 1902, and 1903 perform quantization processing based on dither processing using the same halftone table (threshold number table 3010 and threshold table 3020). In the sixth embodiment, a third quantization processing unit 1903 performs quantization processing using a halftone table different in phase from those used in first and second quantization processing units 5011 and 1902.

Figure 35:
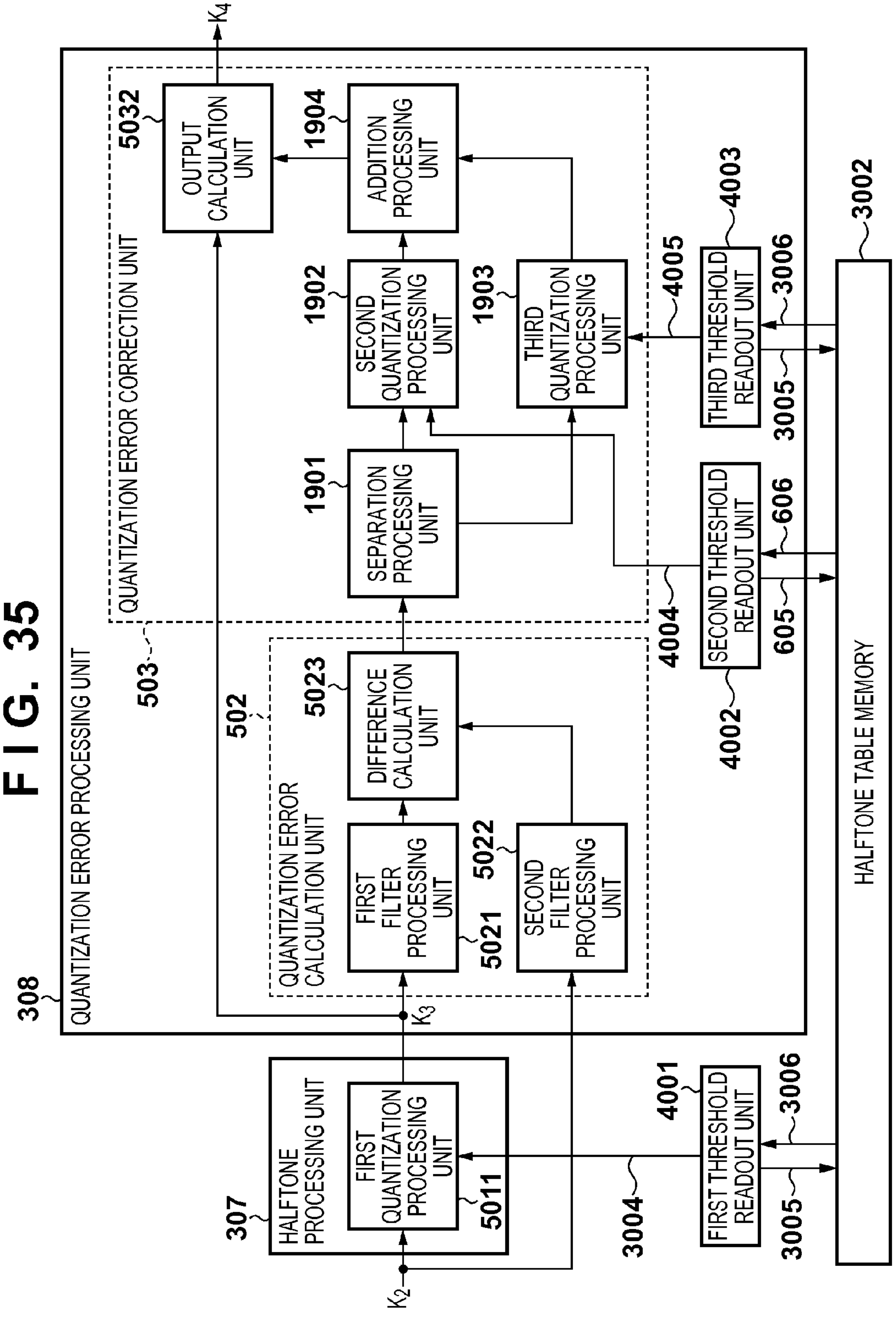
FIG. 35 is a block diagram exemplifying the arrangements of a halftone processing unit 307 and quantization error processing unit 308 according to the sixth embodiment.

The arrangements of a halftone processing unit 307 and quantization error processing unit 308 according to the sixth embodiment will be exemplified with reference to FIG. 35. In FIG. 35, the same reference numerals as those in the fifth embodiment (FIG. 33) denote the same parts, and a description thereof will not be repeated. In the sixth embodiment, as shown in FIG. 35, first, second, and third threshold readout units 4001, 4002, and 4003 are arranged individually in correspondence with the first, second, and third quantization processing units 5011, 1902, and 1903.

The first, second, and third threshold readout units 4001, 4002, and 4003 read out threshold data (threshold number table 3010 and threshold table 3020) from a single halftone table memory 3002. The first threshold readout unit 4001 has the same function as the threshold readout unit 3001 in the third and fourth embodiments. The first threshold readout unit 4001 outputs, as threshold data 3004, data read out from the halftone table memory 3002. The threshold data 3004 output from the first threshold readout unit 4001 is provided to the first quantization processing unit 5011 of the halftone processing unit 307.

The second and third threshold readout units 4002 and 4003 change the phase of a halftone table read out from the halftone table memory 3002 in the following way. The second and third threshold readout units 4002 and 4003 output the obtained data as threshold data 4004 and 4005, respectively. The threshold data 4004 and 4005 output from the second and third threshold readout units 4002 and 4003 are provided to the second and third quantization processing units 1902 and 1903, respectively.

<Processes by Halftone Processing Unit 307 and Quantization Error Processing Unit 308>

As for processes to be executed by the halftone processing unit 307 and quantization error processing unit 308 in the sixth embodiment, especially the difference from the fourth and fifth embodiments will be mainly described with reference to FIGS. 36A to 39B. In addition, the necessity to perform quantization processing by the third quantization processing unit 1903 using a halftone table different in phase from those used in the first and second quantization processing units 5011 and 1902 will be explained.

In the halftone processing unit 307, the first quantization processing unit 5011 performs halftone processing (quantization processing) for input image data from a gamma correction unit 306, similar to the fifth embodiment. This halftone processing employs dither processing to which the halftone table (threshold number table 3010 and threshold table 3020) shown in FIGS. 24B and 24C is applied.

Figure 36A:
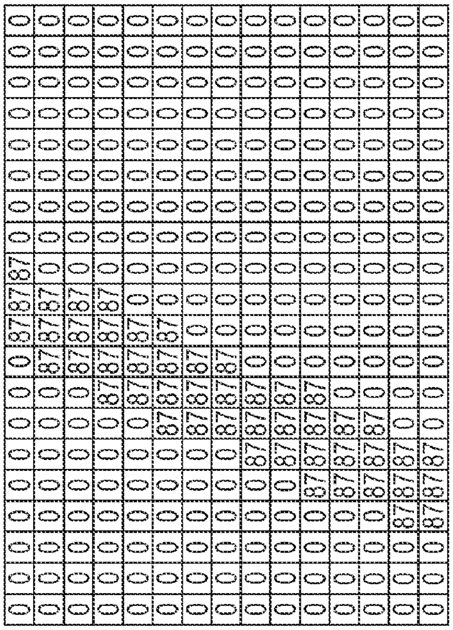
FIGS. 36A to 36D are views exemplifying input image data and the first halftone image data according to the sixth embodiment.
Figure 36B:
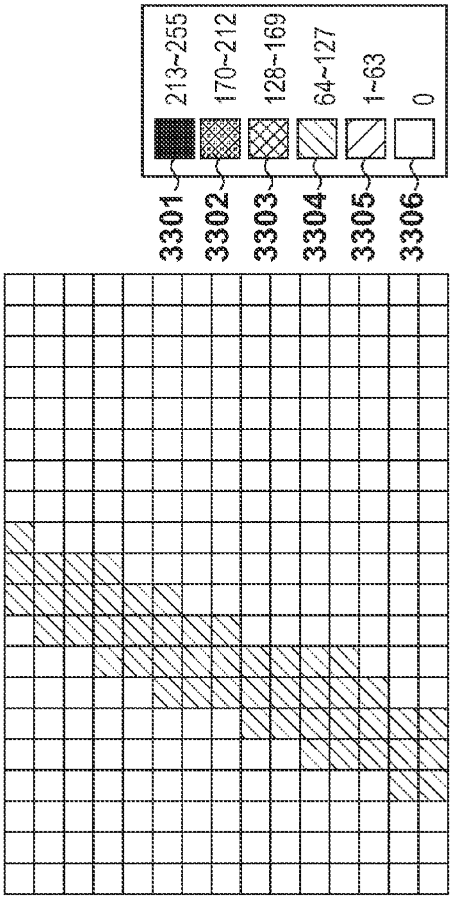
Figure 36C:
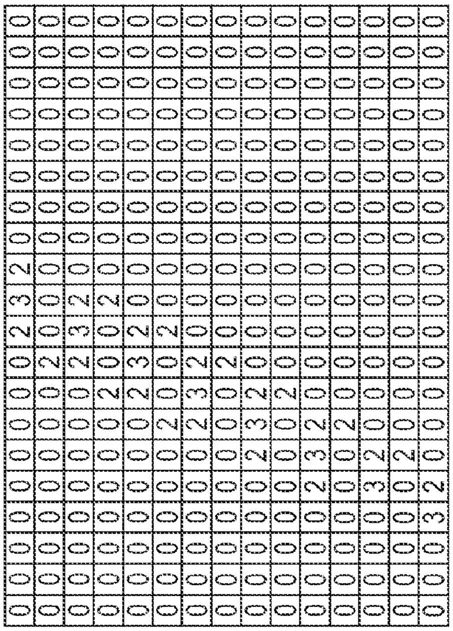

FIGS. 36A and 36B exemplify image data (input image data) input to the first quantization processing unit 5011. The image data contains a flat portion and edge portion. FIG. 36A shows input image data, and FIG. 36B visually shows the input image data in FIG. 36A using pixel signs 3301 to 3306. The first quantization processing unit 5011 performs halftone processing for the input image data shown in FIG. 36A, generating the first halftone image data shown in FIGS. 36C and 36D. FIG. 36C shows the respective pixel values in the first halftone image data, and FIG. 36D visually shows the first halftone image data in FIG. 36C using pixel signs 3401 to 3405.

Similar to the fourth and fifth embodiments, a quantization error calculation unit 502 generates quantization error data from the input image data and first halftone image data, and outputs it. FIGS. 37A and 37B exemplify quantization error data according to the sixth embodiment. FIG. 37A shows the pixel values of respective pixels in the quantization error data, and FIG. 37B visually shows the quantization error data shown in FIG. 37A using pixel signs 4201 to 4205.

When the quantization error correction unit 503 receives the quantization error data, a separation processing unit 1901 separates positive data and negative data contained in the data, and generates image data corresponding to the positive data and image data corresponding to the negative data, similar to the fourth and fifth embodiments. Then, the separation processing unit 1901 outputs the image data (first correction data) corresponding to the positive data to the second quantization processing unit 1902, and the image data (second correction data) corresponding to the negative data to the third quantization processing unit 1903, respectively. Similar to the fifth embodiment, the second and third quantization processing units 1902 and 1903 perform quantization processing for the input image data, respectively. The quantization processing employs dither processing to which the threshold data 4004 and 4005 respectively provided from the second and third threshold readout units 4002 and 4003 are applied.

FIGS. 38A and 38B show image data obtained by performing quantization processing by the second and third quantization processing units 1902 and 1903 for the first and second correction data obtained from the quantization error data shown in FIG. 37A. FIGS. 38C and 38D visually show the first and second correction data shown in FIGS. 38A and 38B using pixel signs 3701 to 3705.

Figures 39A, 39B:
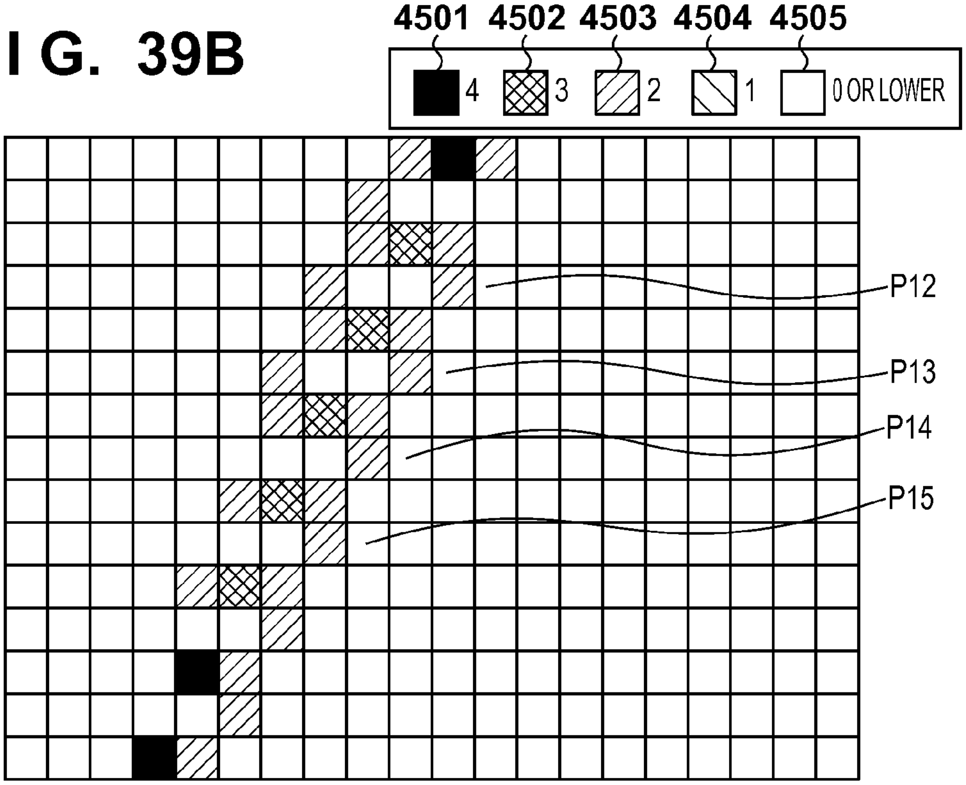
FIGS. 39A and 39B are views showing the first example of the second halftone image data according to the sixth embodiment.

An addition processing unit 1904 adds the first and second correction data quantized by the second and third quantization processing units 1902 and 1903, generating halftone correction data. An output calculation unit 5032 corrects the first halftone image data (FIGS. 36C and 36D) using the halftone correction data generated by the addition processing unit 1904, thereby generating the second halftone image data. FIG. 39A shows the second halftone image data, and FIG. 38B visually shows the second halftone image data in FIG. 39A using pixel signs 4501 to 4505.

Figure 36D:
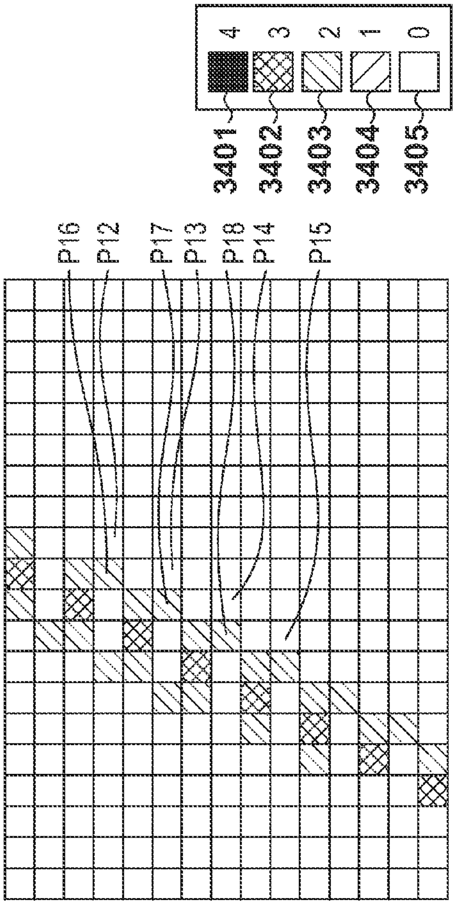

Attention is paid to pixels P12 to P15 shown in FIGS. 38B and 38D in image data obtained by quantizing image data (second correction data) corresponding to negative data of quantization error data by the third quantization processing unit 1903. As shown in FIGS. 38A to 38D, the pixel values (quantized values) of the pixels P12 to P15 in the image data are "−1". In contrast, the pixel values of the pixels P12 to P15 in the first halftone image data shown in FIGS. 36C and 36D are "0". Thus, the pixel values of the pixels P12 to P15 in the second halftone image data obtained by correcting the first halftone image data by the output calculation unit 5032 using halftone correction data formed from the first and second correction data become "−1" as shown in FIG. 39A.

However, the second halftone image data can take five pixel values (quantized values) of 0 to 4, and cannot take "−1", unlike the pixels P12 to P15. When correcting the first halftone image data, the output calculation unit 5032 outputs "0" as a corrected quantized value for a pixel having a pixel value of 0 or smaller in the image data. Although the pixel value (correction value) of halftone correction data is "−1", correction complying with this correction value is not executed for the first halftone image data, and the correction effect may become insufficient.

In the sixth embodiment, to obtain a sufficient correction effect even in this case, the third quantization processing unit 1903 performs quantization processing (dither processing) using a halftone table different in phase from that used in the first quantization processing unit 5011.

<Processing by Third Threshold Readout Unit 4003>

Figure 40A:
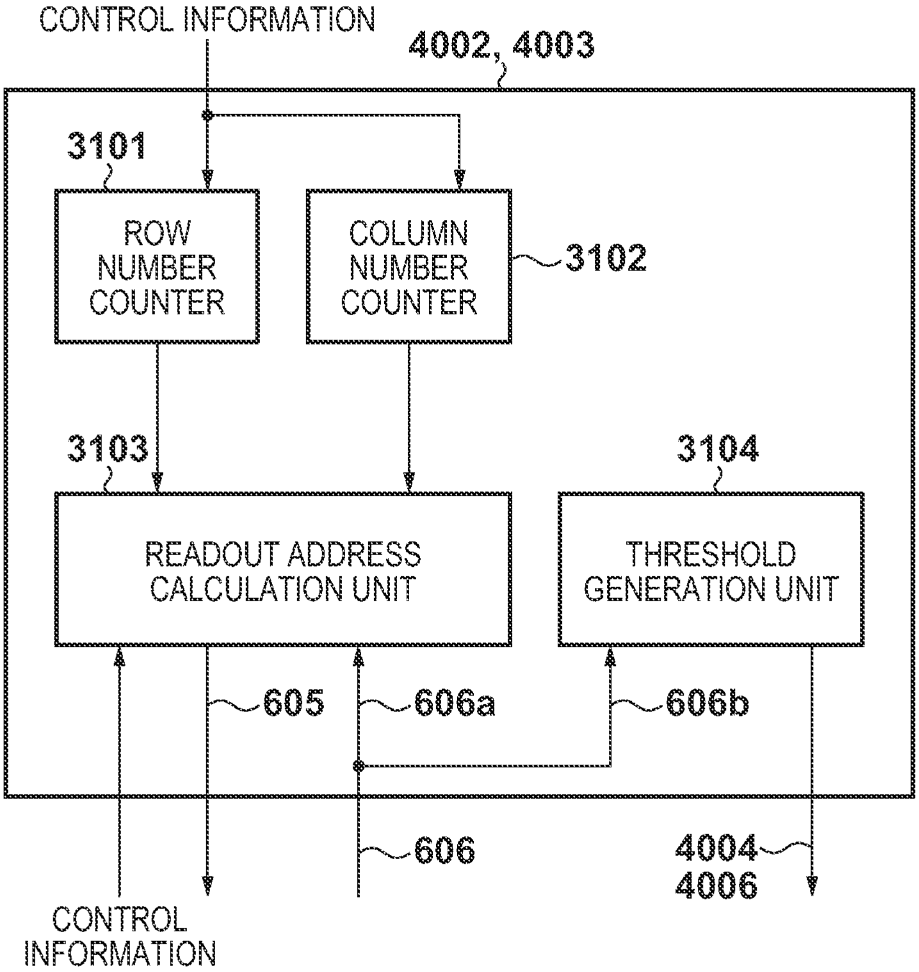
FIG. 40A is a block diagram exemplifying the arrangement of second and third threshold readout units 4002 and 4003 according to the sixth embodiment.
Figure 40B:
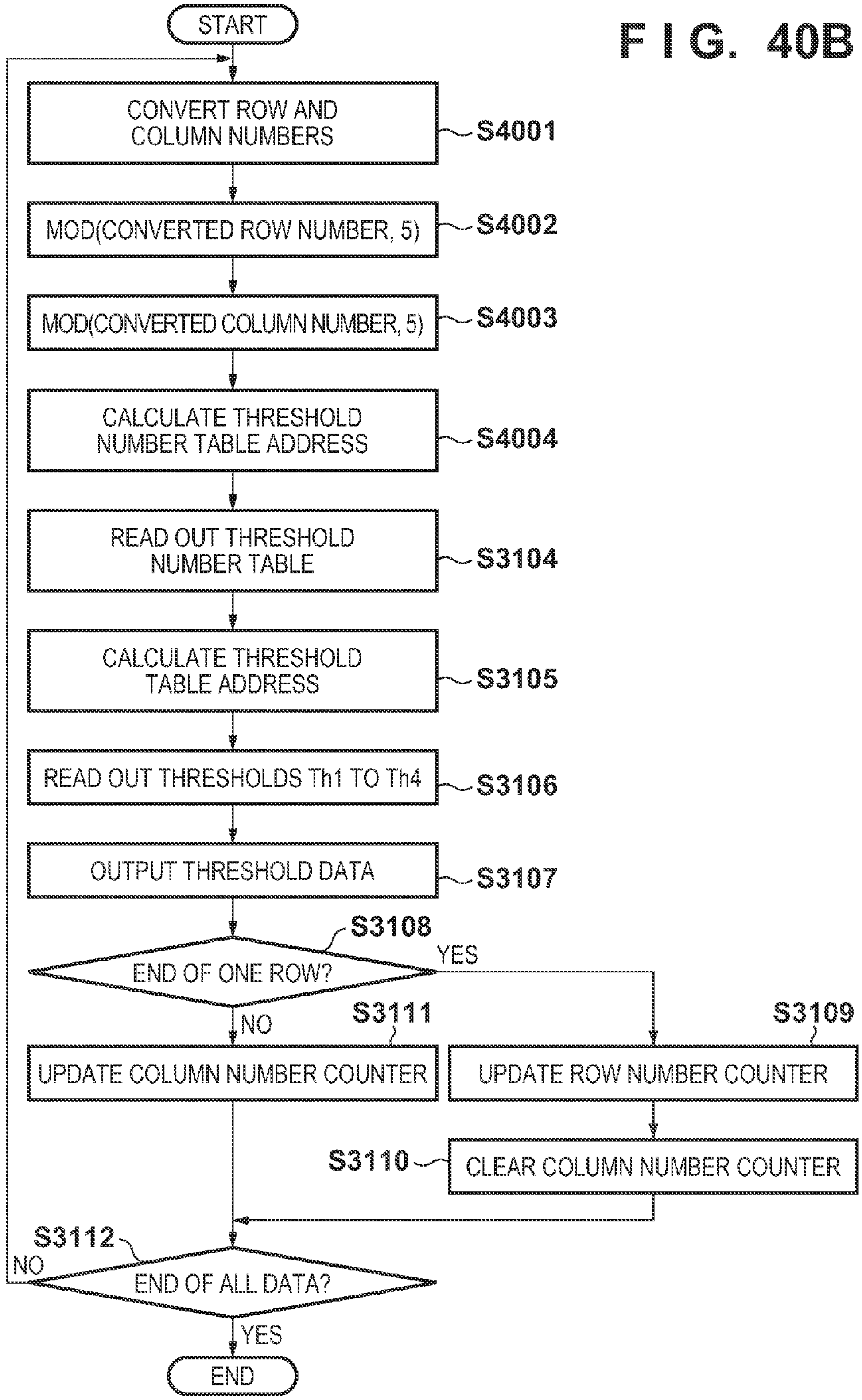
FIG. 40B is a flowchart showing a processing sequence to be executed by the third threshold readout unit 4003 according to the sixth embodiment.

Next, the third threshold readout unit 4003 will be explained with reference to FIGS. 40A and 40B. FIG. 40A shows the arrangement of the third threshold readout unit 4003. Although the third threshold readout unit 4003 has the same arrangement as that of the threshold readout unit 3001 in the fourth and fifth embodiments, processing to be executed by a readout address calculation unit 3103 is greatly different. The readout address calculation unit 3103 performs calculation to determine the address of data to be read out from the halftone table memory 3002 based on an address conversion table provided as control information from a CPU 225. Note that the second threshold readout unit 4002 also has the same arrangement as that of the third threshold readout unit 4003.

Processing by the third threshold readout unit 4003 will be explained with reference to the flowchart of FIG. 40B. In FIG. 40B, steps S3104 to S3112 are the same as those in the fourth and fifth embodiments (FIGS. 25A and 25B), and steps S4001 to S4004 replace steps S3101 to S3103 to be executed by the readout address calculation unit 3103. In this case, steps S4001 to S4004 different from the fourth and fifth embodiments will be mainly explained.

In step S4001, the readout address calculation unit 3103 converts a row number read out from a row number counter 3101 and a column number read out from a column number counter 3102 into different numbers based on a row/column number conversion table contained in control information.

FIG. 41 exemplifies a row/column number conversion table 4100. The row/column number conversion table 4100 stores row number conversion values and column number conversion values to be used in the second and third threshold readout units 4002 and 4003. The row number conversion value and column number conversion value are 0 for the second threshold readout unit 4002, and 0 and 4 respectively for the third threshold readout unit 4003.

The readout address calculation unit 3103 adds respective conversion values stored in the row/column number conversion table 4100 to the row number read out from the row number counter 3101 and the column number read out from the column number counter 3102 in accordance with the following equations:

(converted row number)=(row number)+(row number conversion value)

(converted column number)=(column number)+(column number conversion value)

Accordingly, the readout address calculation unit 3103 obtains a converted row number and converted column number.

When calculating a threshold number table address in steps S4002 to S4004, the readout address calculation unit 3103 uses the converted row number and converted column number instead of a row number and column number obtained from the row number counter 3101 and column number counter 3102. The threshold number table address can be calculated according to the following equation:

(threshold number table address)=MOD(converted row number,5)×5+MOD(converted column number,5)

For example, a case in which the value of the row number counter 3101 is "1" and that of the column number counter 3102 is "4" will be considered. If neither the row number nor column number is converted in step S4001, MOD(row number, 5)=1, MOD(column number, 5)=4 The threshold number table address is 9. The readout address calculation unit 3103 reads out a threshold number "4" defined for an element 3012 from the threshold number table 3010 (FIG. 24B) stored in the halftone table memory 3002.

In the embodiment, as shown in FIG. 41, the row number conversion value and column number conversion value corresponding to the third threshold readout unit 4003 are 0 and 4, respectively. The converted row number is 1, and the converted column number is 8. From this, MOD(converted row number,5)=1,MOD(converted column number,5)=3

The threshold number table address becomes 8. The readout address calculation unit 3103 reads out a threshold number "2" defined for an element 3013 from the threshold number table 3010 stored in the halftone table memory 3002. This means that the threshold number of the element 3012 corresponding to row number 1 and column number 4 in the threshold number table 3010 is converted into the threshold number of the element 3013 moved from the element 3012 to an adjacent left column.

The first threshold readout unit 4001 does not execute row/column number conversion, and the threshold readout unit 3001 directly reads out the threshold number of the element 3012 from the halftone table memory 3002. That is, the first quantization processing unit 5011 performs quantization processing using a threshold corresponding to the threshold number of the element 3012. In contrast, the third quantization processing unit 1903 performs quantization processing using a threshold corresponding to the threshold number of the element 3013.

The third quantization processing unit 1903 executes the above processing for all pixels in the second correction data. As a result, the phase of the halftone table used is shifted left by one pixel from that of the halftone table used in the first quantization processing unit 5011. In the sixth embodiment, the third quantization processing unit 1903 performs quantization processing (dither processing) using the halftone table different in phase from that used in the first quantization processing unit 5011.

<Result of Processing by Quantization Error Correction Unit 503>

A result obtained when the third quantization processing unit 1903 uses a halftone table different in phase from that used in the first quantization processing unit 5011 will be explained with reference to FIGS. 42A to 42D, 43A and 43B. FIGS. 42A and 42B show image data obtained by performing quantization processing by the second and third quantization processing units 1902 and 1903 respectively for the first and second correction data obtained from the quantization error data shown in FIG. 37A. Additionally, FIGS. 42C and 42D visually show the first and second correction data shown in 42*a* and 42*b* using pixel signs 3701 to 3705.

The first correction data quantized by the second quantization processing unit 1902 shown in FIGS. 42A and 42C is the same as the quantized first correction data shown in of FIGS. 38A and 38C. This is because the row number conversion value and column number conversion value corresponding to the second quantization processing unit 1902 are set to 0 in the row/column number conversion table 4100 (FIG. 41). In other words, the second quantization processing unit 1902 performs quantization processing for the first correction data using the same halftone table as that in the fourth and fifth embodiments without converting row and column numbers. In contrast, the second correction data quantized by the third quantization processing unit 1903 shown in of FIGS. 42B and 42D is different from the quantized second correction data shown in FIGS. 38B and 38D. This is because the third quantization processing unit 1903 performs quantization processing for the second correction data using a halftone table whose phase has been changed by converting row and column numbers based on the row/column number conversion table 4100.

Figures 43A, 43B:
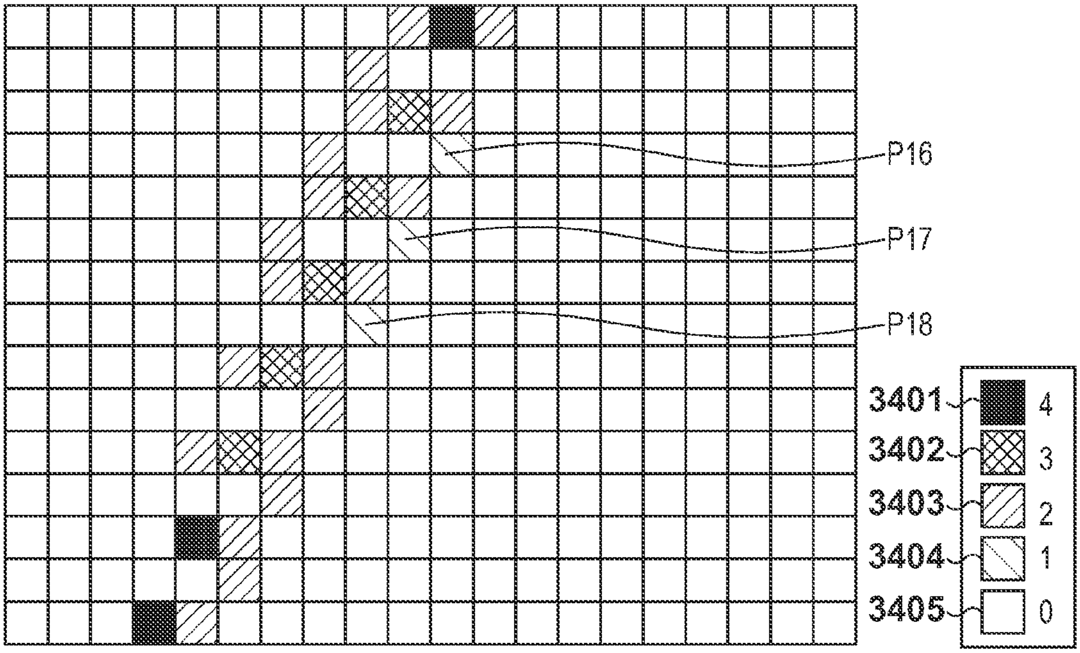
FIGS. 43A and 43B are views showing the second example of the second halftone image data according to the sixth embodiment.

FIG. 43A shows the second halftone image data generated by the output calculation unit 5032 in the embodiment, and FIG. 43B visually shows the image data in FIG. 43A using pixel signs 3401 to 3405.

Attention is paid to pixels P16 to P18 shown in FIGS. 42B and 42D in image data obtained by quantizing image data (second correction data) corresponding to negative data of quantization error data by the third quantization processing unit 1903. As shown in FIGS. 42A to 42D, the pixel values (quantized values) of the pixels P16 to P18 in the image data are "−1". To the contrary, the pixel values of the pixels P16 to P18 in the first halftone image data shown in FIGS. 36C and 36D are "2". Thus, the pixel values of the pixels P16 to P18 in the second halftone image data obtained by correcting the first halftone image data by the output calculation unit 5032 using halftone correction data formed from the first and second correction data become "1" as shown in FIG. 43A.

The quantized values of the pixels P16 to P18 in the first halftone image data are "2". Even if these quantized values are corrected using the pixel values (correction values) of corresponding pixels in the quantized second correction data, the corrected quantized values does not become smaller than 0. That is, when the output calculation unit 5032 corrects the pixel values of the pixels P16 to P18 in the first halftone image data, the corrected quantized values are not forcibly output as 0. These pixels can receive a satisfactory correction effect by the quantization error correction unit 503 for the first halftone image data.

As described above, in the embodiment, a halftone table different in phase from that applied to the first quantization processing unit is applied to at least either the second quantization processing unit or the third quantization processing unit to quantize quantization error data. Halftone image data is corrected using halftone correction data obtained by the quantization processing, similar to the fourth and fifth embodiments. In addition to the effects of the fourth and fifth embodiments, halftone image data can be corrected satisfactorily.

In the embodiment, both the row number conversion value and column number conversion value corresponding to the second quantization processing unit 1902 that are contained in the row/column number conversion table are set to 0. Thus, the first and second quantization processing units 5011 and 1902 use the same halftone table. However, at least either the row number conversion value or the column number conversion value corresponding to the second quantization processing unit 1902 may be set to a non-zero value. In this case, even the second quantization processing unit 1902 can execute quantization processing using a halftone table different in phase from that used in the first quantization processing unit 5011. This processing is effective when a quantized value contained in the second halftone image data obtained by correcting the first halftone image data becomes equal to or larger than 6.

In the embodiment, a single halftone table memory is used to convert row and column numbers when reading out a threshold from the memory. However, a plurality of halftone table memories may be prepared so that the first, second, and third quantization processing units 5011, 1902, and 1903 use individual halftone table memories, similar to the fourth embodiment. In this case, halftone tables different in phase from each other are stored in advance in the individual halftone table memories.

Other Embodiments

Correction processing for a quantization error generated by halftone processing in each of the above-described embodiments can be executed not only by a printer 10 which receives drawing data from a host PC 210, but also by a copying apparatus including an image reading apparatus. In this case, drawing data for image formation can be obtained by reading it from a document by the image reading apparatus. Table data of the color conversion table, gamma correction table, halftone table, filter table, address conversion table, and the like may not be stored in advance in a ROM 221, but may be provided from the host PC 210 to the printer 10. Even in this case, the printer 10 can use table data received from the host PC 210 to implement the functions in each of the above-described embodiments and obtain the effects.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-167441, filed Jul. 29, 2011, which is hereby incorporated by reference herein in its entirety.

What is claimed is:

1. An image processing apparatus comprising:

a halftone processing unit configured to perform first halftone processing for input image data having a first number of gradations, generating halftone image data having a second number of gradations smaller than the first number of gradations;

a calculation unit configured to calculate quantization error data representing a quantization error generated in the halftone image data owing to the first halftone processing based on the difference between the input image data and the halftone image data;

a generation unit configured to perform second halftone processing for the quantization error data calculated by said calculation unit, generating correction data having the second number of gradations for correcting the quantization error generated by the first halftone processing; and a correction unit configured to correct the halftone image data using the correction data generated by said generation unit.

2. The apparatus according to claim 1, wherein said calculation unit makes the number of gradations of the input image data and the number of gradations of the halftone image data equal to each other, and then evaluates the pixel value difference between the input image data and the halftone image data.

3. The apparatus according to claim 1, wherein said calculation unit includes:

a first filter processing unit configured to smooth the halftone image data by performing filter processing for a region of interest in the halftone image data while changing the region of interest;

a second filter processing unit configured to smooth the input image data by performing filter processing for the region of interest in the input image data while changing the region of interest; and a difference evaluation unit configured to calculate the quantization error data based on a difference between a pixel value of the halftone image data smoothed by said first filter processing unit and a pixel value of the input image data smoothed by said second filter processing unit.

4. The apparatus according to claim 3, wherein said difference evaluation unit makes the number of gradations of the halftone image data smoothed by said first filter processing unit and the number of gradations of the input image data smoothed by said second filter processing unit equal to each other, and calculates the quantization error data.

5. The apparatus according to claim 3, wherein said difference evaluation unit converts the number of gradations of each pixel value of the halftone image data smoothed by said first filter processing unit from the second number of gradations into the first number of gradations, and calculates the quantization error data based on a difference between a pixel value of the smoothed halftone image data and a pixel value of the input image data smoothed by said second filter processing unit.

6. The apparatus according to claim 3, wherein when a filter region does not contain the halftone image data, said first filter processing unit adds a virtual pixel outside the halftone image data.

7. The apparatus according to claim 3, wherein said first filter processing unit sets all pixels in the halftone image data as a pixel of interest individually, and calculates a sum of pixel values contained in a filter region.

8. The apparatus according to claim 3, wherein when a filter region does not contain the input image data, said second filter processing unit adds a virtual pixel outside the input image data.

9. The apparatus according to claim 3, wherein said second filter processing unit sets all pixels in the input image data as a pixel of interest individually, and calculates a sum of pixel values contained in a filter region.

10. The apparatus according to claim 2, wherein said halftone processing unit performs halftone processing based on ordered dither processing as the first halftone processing for a pixel of interest while changing the pixel of interest.

11. The apparatus according to claim 2, wherein said halftone processing unit performs the first halftone processing by comparing a pixel value of a pixel of interest with a first threshold and second threshold selected in accordance with a position of the pixel of interest.

12. The apparatus according to claim 1, wherein said correction unit corrects the halftone image data by adding the correction data to the halftone image data for each pixel.

13. The apparatus according to claim 1, wherein said correction unit performs normalization to make a possible maximum value of the correction data generated by said generation unit coincide with a possible maximum value of the halftone image data, and corrects the halftone image data.

14. The apparatus according to claim 1, wherein said generation unit includes:

a separation unit configured to separate a positive pixel value and negative pixel value contained in the quantization error data, generating first quantization error data containing the positive pixel value and second quantization error data containing the negative pixel value;

a first quantization processing unit configured to perform the second halftone processing for the first quantization error data, generating first correction data having the second number of gradations;

a second quantization processing unit configured to perform the second halftone processing for the second quantization error data, generating second correction data having the second number of gradations; and an addition unit configured to add the first correction data and the second correction data, generating the correction data.

15. The apparatus according to claim 1, wherein said generation unit performs halftone processing based on error diffusion processing as the second halftone processing for the quantization error data.

16. The apparatus according to claim 14, wherein said generation unit performs halftone processing based on ordered dither processing as the second halftone processing for the quantization error data.

17. The apparatus according to claim 16, further comprising a storage unit configured to store a halftone table containing a plurality of thresholds used to quantize a pixel value contained in data to be processed in the second halftone processing, wherein said halftone processing unit, said first quantization processing unit, and said second quantization processing unit execute the first halftone processing or the second halftone processing using the halftone table stored in said storage unit.

18. The apparatus according to claim 17, wherein said halftone processing unit, said first quantization processing unit, and said second quantization processing unit execute the first halftone processing or the second halftone processing using a common halftone table.

19. The apparatus according to claim 17, wherein at least one of said first quantization processing unit and said second quantization processing unit executes the second halftone processing using a halftone table different from a halftone table used by said halftone processing unit.

20. The apparatus according to claim 1, wherein before performing the second halftone processing, said generation unit replaces, with 0, a pixel value having an absolute value not larger than a predetermined value, out of pixel values contained in the quantization error data.

21. An image processing apparatus comprising:

a first halftone processing unit configured to perform first halftone processing for input image data having a first number of gradations, generating first halftone image data having a second number of gradations smaller than the first number of gradations;

a calculation unit configured to calculate quantization error data representing a quantization error generated in the first halftone image data owing to the first halftone processing based on the difference between the input image data and the halftone image data;

a correction unit configured to correct the first halftone image data using the quantization error data calculated by said calculation unit as correction data for correcting the quantization error generated by the first halftone processing; and a second halftone processing unit configured to perform second halftone processing for the first halftone image data corrected by said correction unit, generating second halftone image data having the second number of gradations.

22. A non-transitory computer-readable storage medium storing a program for causing a computer to function as each unit of an image processing apparatus defined in claim 1.

23. A non-transitory computer-readable storage medium storing a program for causing a computer to function as each unit of an image processing apparatus defined in claim 21.

24. A image processing method comprising:

performing first halftone processing for input image data having a first number of gradations to generate halftone image data having a second number of gradations smaller than the first number of gradations;

calculating quantization error data representing a quantization error generated in the halftone image data owing to the first halftone processing based on difference between the input image data and the halftone image data;

performing second halftone processing for the calculated quantization error data to generate correction data having the second number of gradations for correcting the quantization error generated by the first halftone processing; and correcting the halftone image data using the generated correction data.

25. A image processing method comprising:

performing first halftone processing for input image data having a first number of gradations to generate first halftone image data having a second number of gradations smaller than the first number of gradations;

calculating quantization error data representing a quantization error generated in the first halftone image data owing to the first halftone processing based on difference between the input image data and the halftone image data;

correcting the first halftone image data using the calculated quantization error data as correction data for correcting the quantization error generated by the first halftone processing; and performing second halftone processing for the corrected first halftone image data to generate second halftone image data having the second number of gradations.

* * * * *